United States Patent
Flynn et al.

(10) Patent No.: US 9,442,844 B2
(45) Date of Patent: *Sep. 13, 2016

(54) APPARATUS, SYSTEM, AND METHOD FOR A STORAGE LAYER

(71) Applicant: Longitude Enterprise Flash S.a.r.l., Luxembourg (LU)

(72) Inventors: David Flynn, Sandy, UT (US); Jonathan Thatcher, Liberty Lake, WA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,323

(22) Filed: Aug. 31, 2015

(65) Prior Publication Data

US 2016/0011972 A1 Jan. 14, 2016

Related U.S. Application Data

(63) Continuation of application No. 12/986,117, filed on Jan. 6, 2011, now Pat. No. 9,122,579, and a continuation-in-part of application No. 12/879,004, filed on Sep. 9, 2010, now Pat. No. 8,578,127.

(60) Provisional application No. 61/292,555, filed on Jan. 6, 2010, provisional application No. 61/373,271, filed on Aug. 12, 2010, provisional application No. 61/368,564, filed on Jul. 28, 2010, provisional application No. 61/240,966, filed on Sep. 9, 2009.

(51) Int. Cl.
*G06F 12/00* (2006.01)
*G06F 12/02* (2006.01)
*G06F 12/06* (2006.01)
*G06F 17/30* (2006.01)

(52) U.S. Cl.
CPC ......... *G06F 12/0246* (2013.01); *G06F 12/023* (2013.01); *G06F 12/0292* (2013.01); *G06F 12/0623* (2013.01); *G06F 17/30067* (2013.01); *G06F 2212/1044* (2013.01); *G06F 2212/2022* (2013.01); *G06F 2212/7201* (2013.01); *G06F 2212/7202* (2013.01); *G06F 2212/7204* (2013.01); *G06F 2212/7207* (2013.01); *G06F 2212/7209* (2013.01)

(58) Field of Classification Search
CPC ................... G06F 12/0246; G06F 2212/7201; G06F 2212/7202; G06F 2212/7207; G06F 2212/7209; G06F 12/023; G06F 12/0292
See application file for complete search history.

(56) References Cited

U.S. PATENT DOCUMENTS

2005/0144418 A1* 6/2005 Kita ..................... G06F 12/0246 711/103
2011/0131231 A1* 6/2011 Haas ....................... G06F 11/14 707/769

* cited by examiner

*Primary Examiner* — Shawn X Gu
(74) *Attorney, Agent, or Firm* — Stoel Rives LLP

(57) ABSTRACT

A storage layer for a non-volatile storage device presents a large, logical address space having a logical capacity that may exceed the storage capacity of the non-volatile storage device. The storage layer implements persistent storage operations within the logical address space; storage operations performed within the logical address space may be persisted on the non-volatile storage device. The storage layer maintains storage metadata to allocate ranges of the logical address space to storage entities. The storage layer provides for allocation of contiguous logical address ranges, which may be implemented by segmenting logical identifiers into a first portion referencing storage entities, and a second portion referencing storage entity offsets. The storage layer persists data on the non-volatile storage device in a sequential, log-based format. Accordingly, storage clients, such as file systems, databases, and other applications, may delegate logical allocations, physical storage bindings, and/ or crash-recovery to the storage layer.

20 Claims, 27 Drawing Sheets

APPARATUS, SYSTEM, AND METHOD FOR A STORAGE LAYER

CROSS REFERENCE TO RELATED APPLICATIONS

This application is a continuation of, and claims priority to, U.S. patent application Ser. No. 12/986,117 filed on Jan. 6, 2011, which issued as U.S. Pat. No. 9,122,579 on Sep. 1, 2015, and which claims priority to U.S. Provisional Patent Application No. 61/292,555 filed on Jan. 6, 2010, and is a continuation-in-part, and claims priority to, U.S. patent application Ser. No. 12/879,004 filed on Sep. 9, 2010, which issued as U.S. Pat. No. 8,578,127 on Nov. 5, 2011, and which claims priority to U.S. Provisional Patent Application Ser. No. 61/373,271 filed Aug. 12, 2010, U.S. Provisional Patent Application Ser. No. 61/368,564 filed Jul. 28, 2010, and U.S. Provisional Patent Application Ser. No. 61/240,966 filed Sep. 9, 2009, each of the above-referenced applications are hereby incorporated by reference.

TECHNICAL FIELD

This invention relates to data storage and more particularly to providing a storage layer for a non-volatile storage device, such as a solid-state storage device.

BACKGROUND

Typical data storage devices are block storage devices where there is a near one-to-one mapping between logical block addresses ("LBAs") and physical block addresses ("PBAs"). Usually a single exception to the one-to-one mapping between LBAs and PBAs is that the data storage device may have a small quantity of extra blocks that can be remapped to blocks that are determined to be bad. Based on this one-to-one mapping between LBAs and PBAs, higher level mapping between LBAs and object names, file names, and other logical identifiers is done in a file server or file system. Typically, the data storage device where this one-to-one mapping between LBAs and PBAs is used is a random access storage device. The file server or file system may use Small Computer System Interface ("SCSI") commands to send blocks of data associated with to specific LBAs to the data storage device. For typical storage devices, LBAs are allocated when the data storage device is initialized. In this case, allocation of LBAs is a binding of a range or list of LBAs that are available on the data storage device to a client or computer connected to the file server or file system connected to the data storage device.

In a system where a server or other computer has access to more than one data storage device, if the data storage devices are random access devices, the file server or file system typically includes an additional identifier with each LBA to identify the particular data storage device being accessed. The identifier may be a drive name, a unique identifier assigned at the manufacturer of the storage device, a logical name, or other identifier that can be used to distinguish between the various data storage devices accessible in the system. In this system, clients may access the data storage device through one or more servers. Each client may be allocated storage space. The allocated storage space may be an entire storage device, may be a portion of a storage device, or may be all or part of two or more storage devices. Typically, for a system where two or more storage devices are accessible to a server or client in the system, allocation of storage space and corresponding addresses will be done in a file server or file system connected to the storage devices. Typically, a file system manages the LBAs allocation (both in the logical and physical address space). LBAs that are not in use are placed in a free LBA pool. When a new file is created, LBAs are removed from the free LBA pool and associated with the file. When the file is deleted, the LBAs are returned to the free LBA pool.

In a data storage device where there is not a one-to-one correspondence between LBAs and PBAs, such as a sequential storage device or a log structured storage device, there is typically another level of logical-to-physical mapping that is similar to the logical-to-logical mapping that is present in a file system or file server connected to a random access storage device. These devices manage their own LBA usage, redundantly to any file system accessing the device. This duplication makes it advantageous for the file system to implement a "trim command" to provide a hint to the device that the file system is moving an LBA into the free LBA pool so that the device can do likewise. Additional logical-to-logical mappings may exist to support other intermediate transformations such as in support of a thin provisioning layer. In a sequential storage device, log structured file system, or other similar device, the logical-to-logical mapping in the file system/file server plus the additional logical-to-logical and/or logical-to-physical mappings are inefficient, add complexity, and in some cases are redundant.

SUMMARY

A non-volatile storage device may present a logical address space to clients. The logical address space may comprise a plurality of logical identifiers (LIDs), which may be independent of the physical storage locations (or "storage locations" generally) of the storage device. Accordingly, there may be no pre-defined and/or pre-set mappings between the logical address space and particular storage locations. The device (or other entity) may maintain an index to associate LIDs in the logical address space with respective storage locations of the storage device. The associations between LIDs and storage locations may be arbitrary. The LID to storage location associations may be used to determine available logical capacity and/or available physical storage capacity.

A client request may comprise a request for logical capacity in the logical address space. The request may be satisfied if there is sufficient logical capacity in the logical address space. The logical capacity of the logical address space may comprise identifying LIDs that are allocated, unallocated, LIDs that are bound to physical storage locations, and so on.

As used herein, an allocated LID may refer to a LID in the logical address space that has been allocated to a particular client. The allocation may comprise reserving the LID, a range of LIDs, a set of sequentially ordered LIDS, a set of contiguous LIDS, a set of contiguous and noncontiguous LIDS, and/or logical capacity in the logical address space, for use by the client. An allocated LID may or may not correspond to physical storage capacity on the storage device. An unallocated LID may refer to a LID in the logical address space that is not allocated to a client and/or associated with data stored on the non-volatile storage device.

As used herein, a bound LID may refer to an allocated LID that is associated with (or bound to) data stored on a physical storage location of the non-volatile storage device. Accordingly, a bound LID may refer to a LID that is associated with one or more physical storage locations of the storage device. An unbound LID may refer to a LID that is not associated with data stored on the non-volatile storage device. As discussed above, an allocated LID may be unbound. Similarly, an unallocated LID may be unbound.

An apparatus to allocate data storage space may be configured to functionally execute the necessary steps of receiving an allocation request, determining if a logical space of a data storage device has sufficient unbound and/or unallocated logical space, and provide a reply.

An allocation request module may receive from a requesting device an allocation request to allocate logical capacity in the logical address space. The allocation request is received at a data storage device. The logical capacity is for storing data on the data storage device. The logical capacity module determines if a logical address space comprises sufficient unbound and/or unallocated logical space to satisfy the allocation request. The determination may include a search of an index maintaining logical capacity allocations, such as a logical-to-physical map comprising bound logical identifiers ("LIDs") of the logical space mapped to one or more physical locations where data corresponding to the bound LIDs is stored on the data storage device. However, other datastructures, indexes, and/or maps may be used. An allocation reply module may provide a reply to the requesting device in response to the logical capacity module determining if the logical space has sufficient logical space. The reply may include an indication of whether the allocation request can be satisfied.

As used herein a logical identifier ("LID") may refer to one or more of a logical block address ("LBA"), a range of LBAs, a set of noncontiguous LBAs, an index, a file name, an inode, or other logical identifier. A LID may refer to logical identifiers other than an object identifier.

In some embodiments, a data storage device comprises a storage device and a storage controller and/or a driver where the storage controller and/or the driver include a logical-to-physical map that includes physical addresses in the storage device. In another embodiment, a storage capacity corresponding to the logical space ("logical space capacity") is substantially larger than a physical storage capacity of the data storage device. The logical space capacity includes the unbound and/or unallocated logical space combined with allocated logical space. The allocated logical space includes the bound LIDs and unbound LIDs within the allocated logical space (includes LIDs that are allocated regardless of whether the LIDs correspond to valid data on the non-volatile storage device).

In some embodiments, the apparatus includes a physical capacity request module, a physical capacity allocation module, and a physical capacity reply module. The physical capacity request module receives from a requesting device a physical capacity request where the physical capacity request is received at the data storage device. The physical capacity request includes a request of an amount of available physical storage capacity in the data storage device. The physical capacity allocation module determines the amount of available physical storage capacity on the data storage device. The amount of available physical storage capacity includes a physical storage capacity of unbound storage locations in the data storage device. In a further embodiment, the physical capacity allocation module tracks bindings between LIDs and physical storage locations, unbound physical storage locations (physical storage locations that do not comprise valid data of a LID), bound physical storage capacity, and/or unbound physical storage capacity.

In another embodiment, receiving an allocation request includes receiving a logical allocation request or receiving a request to store data. In another embodiment, determining if a logical space comprises sufficient unallocated logical space to satisfy the allocation request includes receiving a list of requested LIDs to allocate and verifying that these LIDs are available for allocation or identifying unallocated LIDs that meet criteria received in conjunction with the request.

In one embodiment, the apparatus includes an allocation module that allocates the unallocated logical space sufficient to satisfy the allocation request to the a requesting device in response to the logical capacity module determining that the logical space comprises sufficient unallocated logical space to satisfy the allocation request. In a further embodiment, the allocation module allocates the one or more LIDs in conjunction with a request to store data and allocates the one or more LIDs in conjunction with storing data associated with the request to store data.

In one embodiment, communicating a reply to the requesting device includes communicating allocated LIDs to the requesting device where the allocated LIDs satisfy the allocation request. In another embodiment, communicating a reply to the requesting device includes communicating a reply to the requesting device that indicates that the data storage device comprises sufficient unallocated logical space to satisfy the allocation request. In another embodiment, communicating a reply to the requesting device includes communicating a reply to the requesting device that indicates that the data storage device has insufficient unallocated logical space to satisfy the allocation request. In another embodiment, communicating a reply to the requesting device includes communicating an acknowledgement to the requesting device that requested LIDs were allocated, where the allocation request includes a request to allocate LIDs.

In one embodiment, the apparatus includes an allocation query request module, an allocation query determination module, and an allocation query reply module. The allocation query request module receives an allocation query at the data storage device. The allocation query determination module that identifies one or more LIDs that meet criteria specified in the allocation query. The identified LIDs include allocated LIDs that are bound, allocated LIDs that are unbound, and/or unallocated LIDs. The allocation query reply module communicates the results of the allocation query where the results include a list of the identified LIDs, an acknowledgement that LIDs meeting the criteria were found, and/or an acknowledgement that LIDs meeting the criteria in the allocation query were not found.

In another embodiment, the apparatus includes a logical space management module that manages the logical space of the data storage device from within the data storage device. Managing the logical space may include receiving a deallocation request from a requesting device where the deallocation request returns one or more allocated LIDs to an unallocated state and communicating to the requesting the successful deallocation.

Managing the logical space may include receiving a LID group command request from a requesting device and communicating to the requesting device a reply indicating a response to the LID group command request. The LID group command request includes an action to take on two or more LIDs ("LID group"), metadata associated with the LID group, and/or the data associated with the LID group. The action includes modifying the metadata, backing up the data, backing up the metadata, changing control parameters, changing access parameters, deleting data, copying the data, encrypting the data, deduplicating the data, compressing the data, and/or decompressing the data.

In one embodiment, the apparatus includes a physical space reservation request module, a physical space reservation module, and a physical space reservation return module. The physical space reservation request module receives a request from a requesting device to reserve available physical storage capacity on the data storage device ("physical space reservation request"). The physical space reservation request is received at the data storage device and includes an indication of an amount of physical storage capacity requested.

The physical space reservation module determines if the data storage device has an amount of available physical storage capacity to satisfy the physical storage space request and reserves an amount of available physical storage capacity on the data storage device to satisfy the physical storage space request ("reserved physical capacity") in response to determining that the amount of available physical storage capacity is adequate to satisfy the physical space reservation request. The physical space reservation return module transmits to the requesting device an indication of availability or unavailability of the requested amount of physical storage capacity in response to the physical space reservation module determining if the data storage device has an amount of available physical storage space that satisfies the physical space reservation request.

The physical space reservation request, in one embodiment, includes an amount of logical space wherein the indication of an amount of physical storage capacity requested is derived from the requested logical space. The physical space reservation request, in another embodiment, includes one or more LIDs where the indication of an amount of physical storage capacity requested is derived from an amount of data associated with the LIDs. The data associated with the LIDs includes data stored at physical storage locations bound to the LIDs and/or a data capacity allocated to each LID. The physical space reservation request, in another embodiment, includes a request to store data where the indication of an amount of physical storage capacity requested is derived from the data and/or metadata associated with the data.

The physical space reservation request, in another embodiment, includes a physical space reservation request associated with a request to store data where the indication of an amount of physical storage capacity requested is indicated in the physical space reservation request and is correlated to the data of the request to store data. The physical space reservation request, in another embodiment, includes a request to reserve an amount of physical storage capacity. The physical space reservation request, in another embodiment, includes a request to reserve an amount physical storage capacity and to allocate the reserved physical storage capacity to a logical entity.

In one embodiment, the apparatus includes a physical space reservation cancellation module that cancels all or a portion of reserved physical storage space in response to a cancellation-triggering event. The cancellation-triggering event may include determining that data to be written to the data storage device and associated with available space reserved by the physical space reservation module has been previously stored in the storage system. The cancellation-triggering event may include a timeout. The cancellation-triggering event may include writing data associated with the reserved storage space to the data storage device where the written data is stored in less than associated reserved physical capacity.

In another embodiment, the physical space reservation module changes the reserved available physical storage capacity in response to receiving a write request associated with the physical space reservation request and writing data to the data storage device in response to the write request, receiving a request to cancel reservation of all or a portion of physical storage capacity of the previously received physical space reservation request, and/or receiving a request for additional physical storage capacity, where the additional physical storage capacity is associated with the physical storage capacity of the physical space reservation request.

In one embodiment, the mapping of one or more LIDs to one or more physical addresses changes when the data stored at the one or more physical addresses is moved to one or more different physical addresses, the data stored at the one or more physical addresses is stored at a first location and is identical to data stored at a second location and the mapping of the one or more LIDs is changed to correspond to the second location, and/or the one or more physical locations mapped to the one or more LIDs ("first LIDs") are remapped to one or more different LIDs ("second LIDs").

Another apparatus for allocating data storage space includes a storage device driver. The storage device driver coupled to a file system or file server via a storage interface wherein the storage interface includes a command interface operational to communicate from the file system/file server an allocation request to allocate logical capacity of a data storage device, where the logical capacity is for storing data on the data storage device, and to communicate to the file system/file server an allocation reply.

The storage device driver and/or the data storage device determine if a logical space includes sufficient unallocated logical space to satisfy the allocation request where the determination includes search of a logical-to-physical map. In some embodiments, the logical-to-physical map includes bindings between LIDs of the logical space and physical storage locations of the data storage device, where a LID differs from the physical storage location bound to the LID. The allocation reply is in response to the allocation request and includes an indication of whether the logical space comprises sufficient logical space to satisfy the allocation request.

In one embodiment, the apparatus includes a storage device interface operable to couple the storage device driver to the data storage device sufficient to cause the data storage device to cooperate with the storage device driver to determine if the logical space comprises sufficient logical capacity to satisfy the allocation request. In a further embodiment, the storage device interface includes one or more of peripheral component interconnect express ("PCI Express" or "PCIe"), a serial Advanced Technology Attachment ("ATA") bus, parallel ATA bus, small computer system interface ("SCSI"), FireWire, Fibre Channel, Universal Serial Bus ("USB"), and PCIe Advanced Switching ("PCIe-AS"). In another embodiment, the command interface is implemented as a new input-output control ("IO-CTL") command or an extension of an existing IO-CTL command.

A system of the present invention is also presented to allocate storage space. The system may be embodied by a storage device with non-volatile storage, an allocation request module, a logical capacity module, and an allocation reply module. The allocation request module receives from a requesting device an allocation request to allocate logical capacity. The allocation request is received at the data storage device and the logical capacity is for storing data on the data storage device.

The logical capacity module determines if a logical space has sufficient unallocated logical space to satisfy the allocation request where the determination includes search of a logical-to-physical map. The logical-to-physical map binds logical identifiers ("LIDs") of the logical space with physical storage locations where data corresponding to the LIDs is stored on the data storage device, where a LID differs from the one or more physical storage locations addresses bound to the LID. The allocation reply module communicates a reply to the requesting device in response to the logical capacity module determining if the logical space has sufficient logical space, where the reply includes an indication of whether the logical space comprises sufficient logical space to satisfy the allocation request.

A method of the present invention is also presented for allocating storage space. The method in the disclosed embodiments substantially includes the steps necessary to carry out the functions presented above with respect to the operation of the described apparatus and system. In one embodiment, the method includes receiving from a requesting device an allocation request to allocate logical capacity where the allocation request is received at a data storage device. The logical capacity is for storing data on the data storage device.

The method also includes determining if a logical space includes sufficient unallocated logical space to satisfy the allocation request, where the determination includes search of a logical-to-physical map. The logical-to-physical map binds logical identifiers ("LIDs") of the logical space with physical storage locations where data corresponding to the LIDs is stored on the data storage device, where a LID differs from the one or more physical storage locations mapped to the LID. The method includes communicating a reply to the requesting device in response to determining if the logical space has sufficient logical space, where the reply includes an indication of whether the logical space comprises sufficient logical space to satisfy the allocation request.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
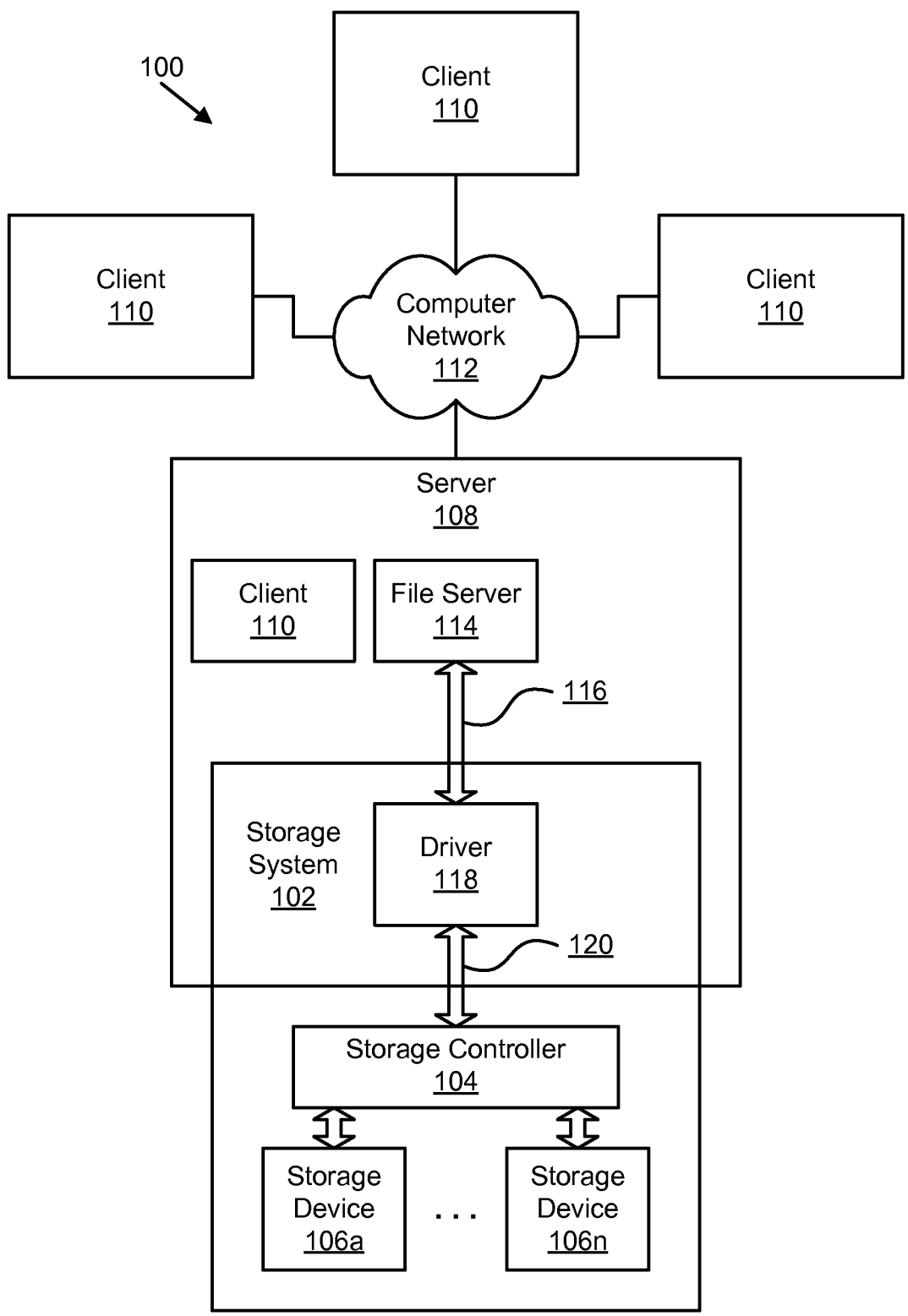
FIG. 1A is a schematic block diagram illustrating one embodiment of a system to allocate data storage space in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1A is a schematic block diagram illustrating one embodiment of a system 100 to allocate data storage space in accordance with the present invention. The system 100 includes a storage system 102 with a storage controller 104 and storage devices 106a-n and a storage device driver 118 (hereinafter "storage device driver 118" may be used interchangeably with "driver 118"). The system 100 includes a server 108 connected to one or more clients 110 over a computer network 112. The server 108 may also include one or more clients 110. The server 108 includes a file server 114 connected to the driver 118 of the storage system 102 through a storage interface 116. The components of the system 100 are described below in more detail.

The system 100 includes a storage system 102. The storage system 102 may be a single data storage device, may be a storage area network ("SAN"), just a bunch of disks/drives ("JBOD"), network attached storage ("NAS") or other storage system known to those of skill in the art. The storage system 102, in the embodiment the system 100 depicted in FIG. 1A, is connected to a file server 114 comprising a file system, and includes a driver 118 located in the server 108. Hereinafter file server and file system may be used interchangeably. In one embodiment, the file server 114 includes a file system. In other embodiments, one or more clients 110, a combination of a file server 114 and one or more clients 110, or other component or system that handles data units, such as objects, files, logical blocks, etc., and stores data units on a storage device 106 and interfaces with a data storage device through a storage interface 116.

In a preferred embodiment, a storage device 106 and a storage controller 104 controlling the storage device 106 comprise a data storage device. The data storage device may also include a driver 118 coupled to the storage controller 104. A driver 118 may be shared between multiple storage controllers 104 and a storage controller 104 may be shared by multiple storage devices 106a-n. A storage system 102 may include multiple data storage devices, each including a storage device 106. However, the multiple data storage devices may have shared storage controllers 104 and/or drivers 118. Some of the multiple data storage devices may have a separate storage controller 104 and/or a separate driver 118. A data storage device, as it relates to allocation, is discussed in more detail below with respect to the apparatus 400 of FIG. 4.

In other embodiments, the storage system 102 may not require a specific driver 118, but may be connected directly to the file server 114 where the file server 114 is able to communicate directly to the storage controller 104 of the storage system 102. In the depicted embodiment, the driver 118 is located in the server 108, but in other embodiments, the driver 118 may be partially or wholly external to the server 108. In the present invention, allocation of logical addresses and logical address management occurs in the storage system 102, as will be explained further below.

The storage controller 104 is connected to one or more storage devices 106a-n and controls data storage in the storage devices 106. The storage controller 104 communicates with one or more file servers 114/file systems and typically communicates with the file servers 114/file systems through a driver 118. In one embodiment, the driver 118 may be an extension of the storage controller 104. In one particular embodiment, the storage controller 104 is a solid-state storage device controller 202 as will be described in more detail in the apparatus 201 of FIG. 2. Typically, the storage controller 104 maps logical identifiers to physical addresses of the storage devices 106 and can allocate and manage logical identifiers, as will be described in more detail below. All or part of the allocation and management of logical identifiers may be included in the storage controller 104 and driver 118. However, global allocation of logical addresses may be external to the storage system 102, as will be described in more detail in the description of the system 103 in FIG. 1C.

In some embodiments, the driver 118, or alternatively the storage interface 116, is an application program interface ("API") and acts to translate commands and other data to a form suitable to be sent to a storage controller 104. In another embodiment, the driver 118 includes one or more functions of the storage controller 104. For example, the driver 118 may include all or a portion of the modules described below and may include one or more indexes or maps for the storage devices 106. The driver 118, one or more storage controllers 104, and one or more storage devices 106 comprising the storage system 102 have a storage interface 116 connection to a file system/file server and allocation traditionally done in a file system/file server is advantageously pushed down (i.e., offloaded) to the storage system 102.

A logical identifier, as used in this application, is an identifier of a data unit that differs from a physical address where data of the data unit is stored. A data unit, as used in this application, is any set of data that is logically grouped together. A data unit may be a file, an object, a data segment of a redundant array of inexpensive/independent disks/drives ("RAID") data stripe, or other data set used in data storage. The data unit may be executable code, data, metadata, directories, indexes, any other type of data that may be stored in a memory device, or a combination thereof. The data unit may be identified by a name, by a logical address, a physical address, an address range, or other convention for identifying data units. A logical identifier ("LID") includes data unit identifiers, such as a file name, an object identifier, an inode, Universally Unique Identifier ("UUID"), Globally Unique Identifier ("GUID"), or other data unit label, and may also include a logical block address ("LBA"), cylinder/head/sector ("CHS"), or other lower level logical identifier. A logical identifier generally includes any logical label that can be mapped to a physical location.

The storage system 102 depicted includes one storage controller 104, but may also include other storage controllers 104. In one embodiment, each storage controller 104 controls a unique set of storage devices 106. In another embodiment, two or more storage controllers 104 may connect to a storage device (e.g. 106a) and may communicate with each other to store data on the storage device 106a. For example, one storage controller 104 may be a master and another storage controller 104 may be a slave. One of skill in the art will recognize other ways that two or more storage controllers 104 may control two or more storage devices 106 in a storage system 102.

The storage system 102 includes one or more storage devices 106a-n. A storage device 106 stores data of a data unit as directed by the storage controller 104. In one embodiment, the storage device 106 stores at least some data sequentially or in a log structure or something similar. Typically, in such a storage device 106, data is not stored as in a random access device. For example, when a data unit is modified, data of the data unit is read from one location, modified, and then written to a different location. The order and sequence of writing data to the data storage device 106 becomes a log and by replaying the sequence, an index can be constructed or reconstructed.

The modified data may be stored where data is currently being sequentially stored. The data storage device 106 may include one or more append points indicating the next location to store the sequentially stored data. In such a data storage device 106, logical identifiers are mapped to one or more physical addresses. For example, a logical identifier may be mapped to current data as well as to older versions of the same data. Sequential storage and logical-to-physical mapping are described in more detail below.

In one embodiment, a storage device 106 may be a solid-state storage device or storage class memory, such as flash memory, nano random access memory ("nano RAM or NRAM"), magneto-resistive RAM ("MRAM"), dynamic RAM ("DRAM"), phase change RAM ("PRAM"), etc. In other embodiments, a storage device may be a hard disk drive, an optical drive, tape storage, etc. that is organized to store data as a log structured file system where data is stored sequentially.

In another embodiment, a storage device 106 includes a high-performance storage device, such as flash memory, that operates as cache for a lower performance, long-term storage device, such as a hard disk drive. An example of solid-state storage operating as cache for a high-capacity, non-volatile storage device is described in U.S. patent application Ser. No. 11/952,123, titled Apparatus, System, and Method for Solid-State Storage as Cache for High-Capacity, Non-Volatile Storage, to David Flynn, et al., and filed Dec. 6, 2007, which is incorporated herein by reference.

In yet another embodiment, the storage device 106, along with a storage controller 104, may be part of an in-server storage area network ("SAN") and may communicate with one or more clients 110, storage controllers 104, or servers 108 located external to the server 108 in which the storage device 106 and storage controller 104 resides. An example of in-server SAN is described in U.S. patent application Ser. No. 11/952,106, titled Apparatus, System, and Method for an In-Server Storage Area Network, to David Flynn, et al., and filed Dec. 6, 2007, which is incorporated herein by reference. One of skill in the art will recognize other storage devices 106 where allocating and managing logical identifiers in the storage system 102 is beneficial.

The system 100 includes a server 108. The server 108 may be embodied with in a computer such as a workstation, a mainframe computer, a personal computer, a laptop computer, or other computing device that has access to a storage device 106. The server 108, in one embodiment, is a partition within a computer. The server 108 may include a physical enclosure. The storage system 102 may be located in a physical enclosure of a server 108, for example as a peripheral component interconnect express ("PCI Express" or "PCI-e") card plugged into a motherboard of the server 108. The storage system 102 may be partially within the physical enclosure of the server 108. For example, if the storage system has a driver 118 running on a processor running the server 108, the storage controller and/or storage devices 106 may be in an enclosure plugged into the computer or connected through a cable. One of skill in the art will recognize the many ways that a storage system 102 may be connected to a server 108 or part of a computer associated with the server 108.

The server 108, in the depicted embodiment, includes a file server 114/file system that is connected to the storage system 102 via a storage interface 116. The file system, in one embodiment, is a component of a file server 114 that is accessed by one or more clients 110. A client 110 and/or a file system/file server 114 access the storage system 102 through the storage interface 116.

Typically the file system/file server 114 is connected to a driver 118 of the storage system 102 and the driver 118 interfaces with a storage controller 104 and one or more storage devices 106 through a storage device interface 120. The storage device interface 116 may be a PCI-e bus, a Serial Advanced Technology Attachment ("serial ATA") bus, parallel ATA, or the like. In another embodiment, the storage device interface 116 is an external bus such as small computer system interface ("SCSI"), FireWire, Fibre Channel, Universal Serial Bus ("USB"), PCIe Advanced Switching ("PCIe-AS"), or the like. The file server 114/file system typically manages files for one or more clients 110 that access the storage system 102. In one embodiment, the driver 118 is not present and the file server 114/file system communicates directly with the storage controller 104 via the storage device interface 120. For example, the storage controller 104 may emulate a device that can be connected directly to the file server 114/file system, either temporarily while a driver 118 is loaded, or for a longer period of time.

The system 100 includes one or more clients 110. In one embodiment, one or more clients 110 communicate with the server 108 and file server 114 over one or more computer networks 112. In another embodiment, the server 108 includes one or more clients 110. A client 110 may be an application running on the server 108 or other computer. From the perspective of the storage system 102, the file server 114 may be a client 110 and hereinafter a "client" 110 may include a file server 114. The computer network 112 may include the Internet, a wide area network ("WAN"), a metropolitan area network ("MAN"), a local area network ("LAN"), a token ring, a wireless network, a Fibre Channel network, a SAN, network attached storage ("NAS"), ESCON, or the like, or any combination of networks. The computer network 112 may also include a network from the IEEE 802 family of network technologies, such Ethernet, token ring, WiFi, WiMax, and the like and includes cabling and components to facilitate communication.

A client 110 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, a file server 114, or the like. A client 110 may run on a computer or server in communication with the server 108 over a computer network 112. A client 110 may direct a file system to read, write, delete, modify, etc. a file, object, logical block, or other data unit stored in the storage system 102. One of skill in the art will recognize that an object may have a very broad definition. While the term object may not always include all data units, in this application the "object" is to be interpreted in a broad sense and may include files or other data structures.

The file server 114/file system may then access the data unit using a mapping between a logical name for the data unit and a logical identifier that the file server 114/file system associated with the data unit. In a typical embodiment, the file server 114/file system organizes data of the data unit into logical blocks and binds a logical block address with each logical block. A logical block address may be a location where the file server 114/file system intends to store the logical blocks in the storage system 102. The file server 114/file system may then direct the storage system 102 through a SCSI command read request, write request, etc.

In the present invention, management and allocation of logical identifiers, such as logical block addresses, occurs in the storage system 102, as will be discussed in more detail below. In one embodiment, the file server 114/file system treats storage in the storage system 102 as a random access device even when the storage system 102 is not random access. In a typical random access device, logical identifiers have almost a one-to-one correspondence to physical addresses of the random access device.

This one-to-one mapping in a typical random access device (excluding a small number of physical addresses on the random access device reserved for bad block mapping) also correlates to a near one-to-one relationship between storage capacity associated with logical identifiers and physical capacity associated with physical addresses. For example, if a logical identifier is a logical block address ("LBA"), each logical block associated with an LBA has a fixed size. A corresponding physical block on the random access device is typically the same size as a logical block. This enables a typical file server 114/file system to manage physical capacity on the random access device by managing logical identifiers, such as LBAs. This continuity of LBA to PBA mapping is generally depended upon and utilized by file systems to defragment the data stored on the data storage device. Similarly, some systems may use this continuity to locate the data on specific physical tracks to improve performance as is the case of a technique called "short stroking" the disk drive. The highly predictable LBA to PBA mapping is essential in certain applications to indirectly manage the storage of the data in the physical address space through direct management of the logical address space.

However, the storage system 102 may be a log structured file system such that there is no "fixed" relationship or algorithm to determine the mapping of the LBA to the PBA, or in another embodiment, may be random access, but may be accessed by more than one client 110 or file server 114/file system such that the logical identifiers allocated to each client 110 or file server 114/file system represent a storage capacity much larger than the one-to-one relationship of logical to physical identifiers of typical systems. The storage system 102 may also be thinly provisioned such that one or more clients 110 each has an allocated logical address range that is much larger than the storage capacity of the storage devices 106 in the storage system 102. In the system 100, the storage system 102 manages and allocates logical identifiers such that there is no one-to-one or near one-to-one relationship between logical identifiers and physical identifiers.

The system 100 is advantageous because it allows more efficient management of storage capacity than typical storage systems. For example, for typical random access devices accessible by a number of clients 110, if each client is allocated a certain amount storage space, the storage space typically will exist and be tied up in the allocations even if the actual amount of storage space occupied is much less. The system 100 is also advantageous because the system 100 reduces complexity of standard thin provisioning systems connected to storage devices 106. A standard thin provisioning system has a thin provisioning layer that has a logical-to-logical mapping in addition to the storage devices' 106 logical-to-physical mapping, such as a log structured file system or solid-state storage where data is stored sequentially. The system 100 is more efficient because multiple layers of mapping are eliminated and thin provisioning (logical-to-physical mapping) is done at the lowest level.

Figure 1B:
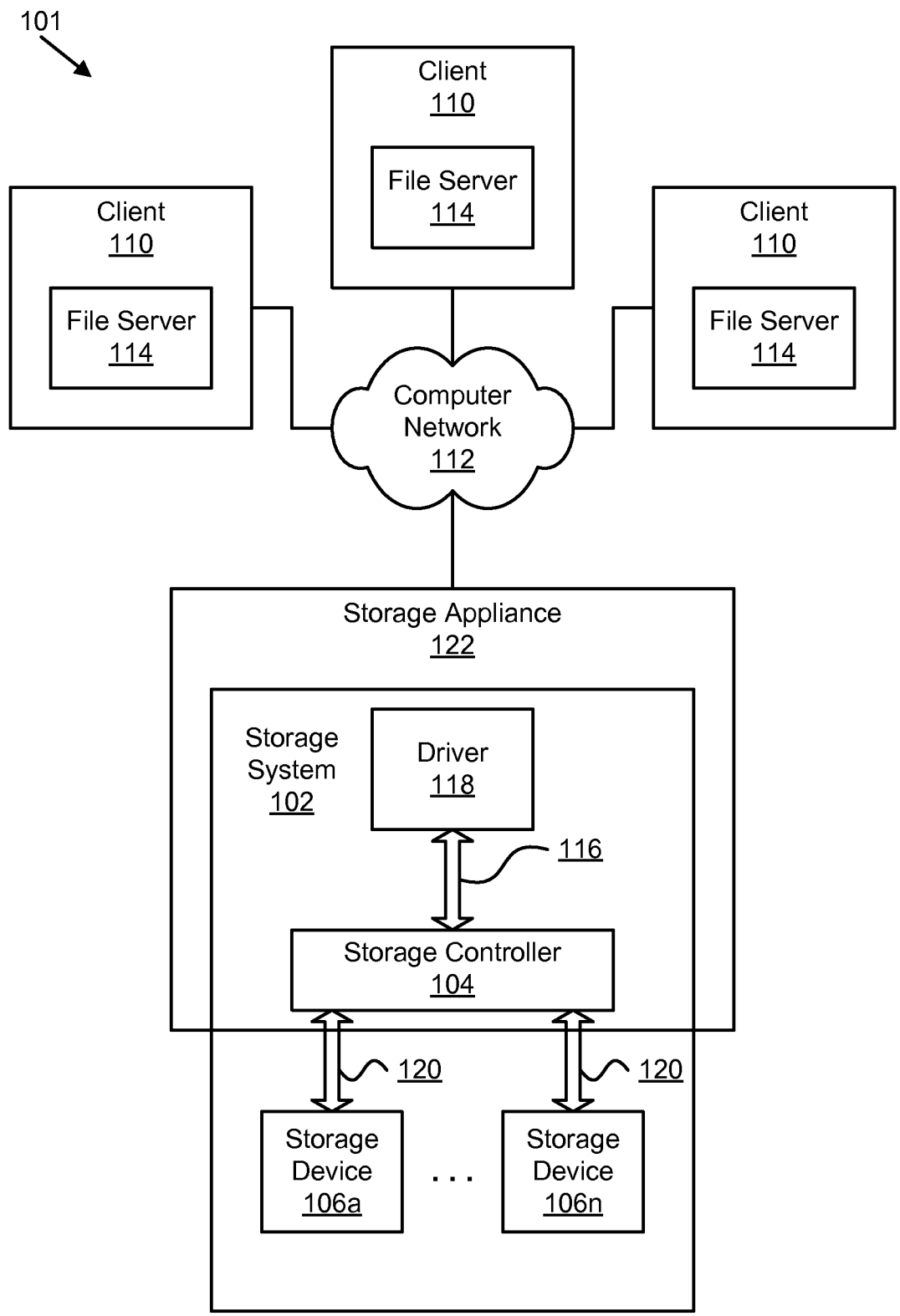
FIG. 1B is a schematic block diagram illustrating another embodiment of a system to allocate data storage space in accordance with the present invention.

FIG. 1B is a schematic block diagram illustrating another embodiment of a system 101 to allocate data storage space in accordance with the present invention. The system 101 depicted in FIG. 1B is a variation of the system 100 depicted in FIG. 1A. The system 101 includes a storage system 102 connected via a storage interface 116 to a driver 118, the driver 118 connected to each storage controller 104 via a storage device interface 120, and storage devices 106*a-n* which are substantially similar to those described above in relation to the system 100 of FIG. 1A. The system 101 also includes one or more clients 110 connected to a computer network 112, which are again substantially similar to those described above with respect to the system 100 of FIG. 1A.

In the system 101 of FIG. 1B, the clients 110 each have a file server 114/file system and access the storage system 102 through a storage appliance 122. The file server 114/file system may be a distributed file server/file system such as IBM's GPFS or the Lustre Clustering File System The storage appliance 122 may be a SAN controller, a RAID controller, or the like and each file server 114/file system may connect independently to the storage devices 106 of the storage system 102. The storage appliance 122 may be a client 110 to the storage system 102. In this case, the system 101 is advantageous because, in one embodiment, each file server 114/file system may treat the attached storage of the storage system 102 as a SCSI device using standard SCSI protocol, or an extension to standard SCSI protocols. Each client 110 and its file server 114/file system may operate as if it has full access to storage space allocated to the client 110 by the storage system 102 even if the actual storage space of the storage system 102 is much less than the storage space allocated to the various clients 110.

The storage system 102 can efficiently manage and allocate logical identifiers for the clients 110 while allowing the file servers 114/file system to use standard protocol to connect to the storage system 102. In another embodiment, the storage system 102 manages and allocates logical identifiers for the clients 110 within a virtual server or guest on a virtualization operating system such as VMware. In another embodiment, the file servers 114/file system are configured to offload allocation management to the storage system 102 and communicate with the storage device driver 118 with allocation requests, allocation queries, etc., and receive replies to the requests, as will be explained below in greater detail.

The storage devices 106 may be in the storage appliance 122 or external to the storage appliance 122. In one embodiment, one or more storage devices 106 are located in the storage appliance 122 and one or more storage devices 106 are located external to the storage appliance 122. The storage devices 106 may be collocated with the storage appliance 122 or may be remote from the storage appliance 122. One of skill in the art will recognize other storage appliances 122 and other configurations of the storage appliance 122 and storage devices 106.

In one embodiment, one or more of the clients 110 include a driver 118 (not shown) in addition to the driver 118 shown in the storage system 102. In another embodiment, the storage system 102 does not include a driver 118, but each client 110 includes a driver 118. A driver 118 typically acts as to interpret commands and other communication between the storage system 102 and the file server 114/file system or the storage appliance 122. In one embodiment, the storage system 102 emulates a standard storage device until a driver 118 is loaded. The driver 118 may then allow additional features and commands not available without the driver 118.

Figure 1C:
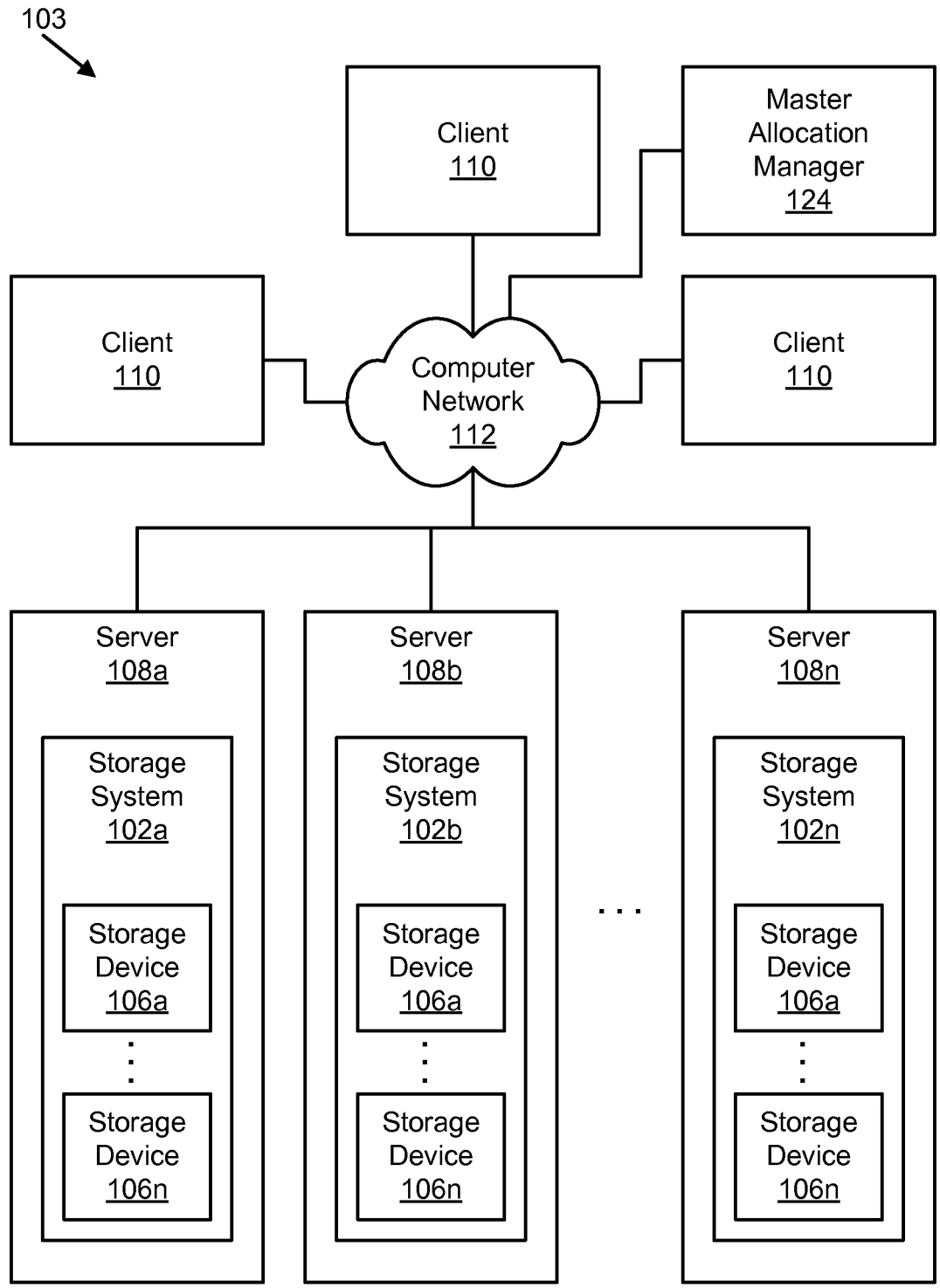
FIG. 1C is a schematic block diagram illustrating yet another embodiment of a system to allocate data storage space in accordance with the present invention.

FIG. 1C is a schematic block diagram illustrating yet another embodiment of a system 103 to allocate data storage space in accordance with the present invention. The system 103 includes two or more storage systems 102*a-n* with storage devices 106*a-n*, each in a server 108*a-n* connected to clients 110 through one or more computer networks 112. The system 103 also includes a master allocation manager 124 that communicates to each server 108 and can communicate with the clients 110. The storage devices 106, storage systems 102, servers 108, clients 110, and computer network 112 are substantially similar to those described above in relation to the systems 100, 101 of FIGS. 1A and 1B. In addition, the system 103 includes storage controllers 104, storage interfaces 116, file servers 114/file system, and may include drivers 118, and other components and features described above. The embodiment depicted in the system 103 of FIG. 1C is intended to show that the number of servers 108 with storage systems 102 is not limited and may include more than one storage system 103.

The system 103, in one embodiment, includes a master allocation manager 124. In one embodiment, the master allocation manager 124 manages storage space allocation at a high level. For example, the master allocation manager 124 may allocate a storage capacity to each client 110. The master allocation manager 124 may then coordinate with each storage system 102*a-n* to allocate and manage logical identifiers for each of the clients 110. In one embodiment, the master allocation manager 124 manages storage space at a high level, allocating storage capacities, placing limits on storage capacity, assigning storage systems 102 or storage devices 106 to clients 110, etc. while the storage systems 102 manage and allocate at a lower level by tracking and allocating logical identifiers and mapping logical identifiers to physical locations. The master allocation manager 124 sends allocation requests, physical capacity requests, allocation queries, etc. to the storage systems 102a-n and receives replies that enable the master allocation manager 124 to manage logical space. One of skill in the art will recognize other ways for a master allocation manager 124 to integrate with storage systems 102 that allocate and manage logical identifiers.

In one embodiment, the master allocation manager 124, unlike a thin provisioning layer, which also manages the logical and or physical allocation, does not need to do a logical to logical remapping. The master allocation manager 124 may do other allocation functions common to a thin provisioning system, but off-load the primary allocation (logical and physical) to the storage system 102.

Figure 2:
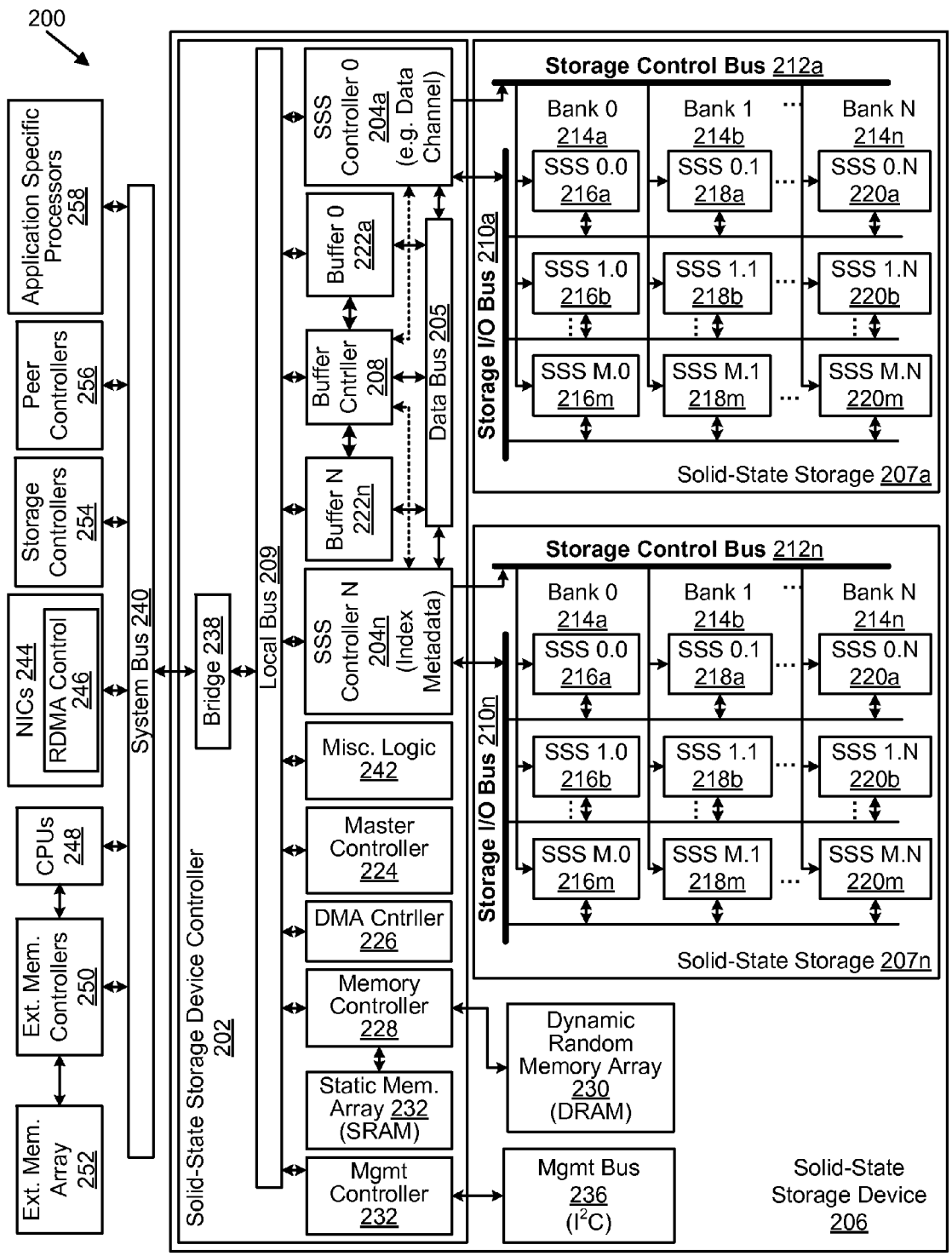
FIG. 2 is a schematic block diagram illustrating a particular embodiment of a solid-state storage device that may include an apparatus to allocate data storage space in accordance with the present invention.

FIG. 2 is a schematic block diagram illustrating a particular embodiment 200 of a solid-state storage device controller 202 that may include an apparatus to allocate data storage space in accordance with the present invention. The solid-state storage device 206 includes a write data pipeline 301 and a read data pipeline 303, which are described below in more detail in the discussion related to FIG. 3. The solid-state storage device controller 202 may include a number of solid-state storage controllers 0-N 204a-n, each controlling solid-state storage 207. In the depicted embodiment, two solid-state controllers are shown: solid-state controller 0 204a and solid-state storage controller N 204n, and each controls solid-state storage 207a-n.

In the depicted embodiment, solid-state storage controller 0 204a controls a data channel so that the attached solid-state storage 207a stores data. Solid-state storage controller N 204n controls an index metadata channel associated with the stored data and the associated solid-state storage 207n stores index metadata. In an alternate embodiment, the solid-state storage device controller 202 includes a single solid-state controller 204a with a single solid-state storage 207a. In another embodiment, there are a plurality of solid-state storage controllers 204a-n and associated solid-state storage 207a-n. In one embodiment, one or more solid state controllers 204a-204n-1, coupled to their associated solid-state storage 207a-207n-1, control data while at least one solid-state storage controller 204n, coupled to its associated solid-state storage 207n, controls index metadata.

In one embodiment, at least one solid-state controller 204 is field-programmable gate array ("FPGA") and controller functions are programmed into the FPGA. In a particular embodiment, the FPGA is a Xilinx® FPGA. In another embodiment, the solid-state storage controller 204 comprises components specifically designed as a solid-state storage controller 204, such as an application-specific integrated circuit ("ASIC") or custom logic solution. In another embodiment, at least one solid-state storage controller 204 is made up of a combination FPGA, ASIC, and custom logic components.

The solid state storage 206 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage 207, data cannot be read from the solid-state storage 207. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus. Data is written and read on a bit-level over the storage I/O bus 210 as control lines and address lines within the control bus 212 are asserted.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a column of solid-state storage elements 216, 218, 220 is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage 207. In one embodiment, a solid-state storage 207a includes twenty solid-state storage elements 216, 218, 220 per bank 214 with eight banks 214 and a solid-state storage 207n includes 2 solid-state storage elements 216, 218 per bank 214 with one bank 214. In one embodiment, each solid-state storage element 216, 218, 220 is comprised of a single-level cell ("SLC") devices. In another embodiment, each solid-state storage element 216, 218, 220 is comprised of multi-level cell ("MLC") devices.

In one embodiment, solid-state storage elements for multiple banks that share a common storage I/O bus 210a row (e.g. 216b, 218b, 220b) are packaged together. In another embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 0.8) 216a-220a, each in a separate bank 214a-n. In another embodiment, 20 storage elements (e.g. SSS 0.0-SSS 20.0) 216 form a virtual bank 214a (or logical bank) so that each of the eight virtual banks has 20 storage elements (e.g. SSS0.0-SSS 20.8) 216, 218, 220. Data is sent to the solid-state storage 207 over the storage I/O bus 210 to all storage elements of a particular group of storage elements (SSS 0.0-SSS 0.8) 216a, 218a, 220a. The storage control bus 212a is used to select a particular bank (e.g. Bank-0 214a) so that the data received over the storage I/O bus 210 connected to all banks 214 is written just to the selected bank 214a.

In a preferred embodiment, the storage I/O bus 210 is comprised of one or more independent I/O buses ("IIOBa-m" comprising 210a.a-m, 210n.a-m) wherein the solid-state storage elements within each row share one of the independent I/O buses accesses each solid-state storage element 216, 218, 220 in parallel so that all banks 214 are accessed simultaneously. For example, one channel of the storage I/O bus 210 may access a first solid-state storage element 216a, 218*a*, 220*a* of each bank 214*a-n* simultaneously. A second channel of the storage I/O bus 210 may access a second solid-state storage element 216*b*, 218*b*, 220*b* of each bank 214*a-n* simultaneously. Each row of solid-state storage element 216, 218, 220 is accessed simultaneously.

In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a-n* are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. A typical page is 2000 bytes ("2 kB"). In one example, a solid-state storage element (e.g. SSS0.0) includes two registers and can program two pages so that a two-register solid-state storage element 216, 218, 220 has a capacity of 4 kB. A bank 214 of 20 solid-state storage elements 216, 218, 220 would then have an 80 kB capacity of pages accessed with the same address going out the channels of the storage I/O bus 210.

This group of pages in a bank 214 of solid-state storage elements 216, 218, 220 of 80 kB may be called a virtual or logical page. Similarly, an erase block of each storage element 216*a-m* of a bank 214*a* may be grouped to form a virtual or logical erase block. In a preferred embodiment, an erase block of pages within a solid-state storage element 216, 218, 220 is erased when an erase command is received within a solid-state storage element 216, 218, 220. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, 218, 220, where the packet is intended to be written to a location within a particular page which is specific to a of a particular erase block of a particular element of a particular bank, a physical address is sent on the storage I/O bus 210 and followed by the packet. The physical address contains enough information for the solid-state storage element 216, 218, 220 to direct the packet to the designated location within the page. Since all storage elements in a row of storage elements (e.g. SSS 0.0-SSS 0.N 216*a*, 218*a*, 220*a*) are accessed simultaneously by the appropriate bus within the storage I/O bus 210*a*.a, to reach the proper page and to avoid writing the data packet to similarly addressed pages in the row of storage elements (SSS 0.0-SSS 0.N 216*a*, 218*a*, 220*a*), the bank 214*a* that includes the solid-state storage element SSS 0.0 216*a* with the correct page where the data packet is to be written is simultaneously selected by the storage control bus 212.

Similarly, a read command traveling on the storage I/O bus 212 requires a simultaneous command on the storage control bus 212 to select a single bank 214*a* and the appropriate page within that bank 214*a*. In a preferred embodiment, a read command reads an entire page, and because there are multiple solid-state storage elements 216, 218, 220 in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g. bank-0 214*a*) is selected over the storage control bus 212 to prevent erasure of similarly addressed erase blocks in all of the banks (banks 1-N 214*b-n*). Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, data packets are written sequentially to the solid-state storage 207. For example, data packets are streamed to the storage write buffers of a bank 214*a* of storage elements 216 and when the buffers are full, the data packets are programmed to a designated logical page. Data packets then refill the storage write buffers and, when full, the packets are written to the same logical page if space exists or to the next logical page. The next logical page may be in the same bank 214*a* or another bank (e.g. 214*b*). This process continues, logical page after logical page, typically until a logical erase block is filled. In another embodiment, the streaming may continue across logical erase block boundaries with the process continuing, logical erase block after logical erase block.

In one embodiment, each solid-state storage element in a logical page (e.g. 216*a-n*) includes one or more append points. An append point may be located where data from the write buffers will next be written. Once data is written at an append point, the append point moves to the end of the data. This process typically continues until a logical erase block is full. The append point is then moved to a different logical erase block. The sequence of writing to logical erase blocks is maintained so that if an index comprising a mapping between logical and physical addresses is corrupted or lost, the sequence of storing data can be replayed to rebuild the index.

This type of sequential storage may be called log structured array and the storage system 102 with this type of sequential storage may be a type of log structured system. In this sequential storage system or log structured file system, when data is modified in a read-modify-write operation, data is read from one location, modified, and then written to an append point rather than over top of the location where the data is read. The index maps a logical identifier associated with the data to each location where data corresponding to the logical identifier is stored. If invalid data is not needed, the data may be erased in a garbage collection operation and the index will be updated to reflect that the invalid data is gone. Older versions of the data may also be tracked in the index to keep track of each version. If the index is corrupted, the sequence is replayed to rebuild the index and each time data for a particular logical identifier is encountered, the index is updated. Once the entire sequence has been replayed, the most recent version of data of a particular logical identifier is typically mapped to the logical identifier.

In one embodiment, each solid-state storage element 216, 218, 220 includes more than one append point. For example, hot data, e.g. new data or data used frequently, can be sequentially stored at an append point at one logical erase block while cold data e.g. data used infrequently, can be stored at a different append point in another logical erase block. In various embodiments, the solid-state storage elements 216, 218, 220 can have more than two append points.

In a read, modify, write operation, data packets associated with a data unit are located and read in a read operation. Data segments of the modified data unit that have been modified are not written to the location from which they are read. Instead, the modified data segments are again converted to data packets and then written to the next available location in the logical page currently being written. The index entries for the respective data packets are modified to point to the packets that contain the modified data segments. The entry or entries in the index for data packets associated with the same data unit that have not been modified will include pointers to the original location of the unmodified data packets. Thus, if the original data unit is maintained, for example to maintain a previous version of the data unit, the original data unit will have pointers in the index to all data packets as originally written. The new data unit will have pointers in the index to some of the original data packets and pointers to the modified data packets in the logical page that is currently being written.

In a copy operation, the index includes an entry for the original data unit mapped to a number of packets stored in the solid-state storage 207. When a copy is made, in one embodiment a new data unit is created and a new entry is created in the index mapping the new data unit to the original packets. The new data unit is also written to the solid-state storage 207 with its location mapped to the new entry in the index. The new data unit packets may be used to identify the packets within the original data unit that are referenced in case changes have been made in the original data unit that have not been propagated to the copy and the index is lost or corrupted.

Typically for sequential storage, a physical address of where data is written is not known before the data is stored on the storage device 106 but is determined at the time of storing the data. Typically available physical storage capacity in the data storage device is not mapped to a LID until data corresponding to the LID is stored on the data storage device or at least until a location of an append point where the data is stored is determined.

Beneficially, sequentially writing packets facilitates a more even use of the solid-state storage 207 and allows the solid-storage device controller 202 to monitor storage hot spots and level usage of the various logical pages in the solid-state storage 207. Sequentially writing packets also facilitates a powerful, efficient garbage collection system, which is described in detail below. One of skill in the art will recognize other benefits of sequential storage of data packets.

In various embodiments, the solid-state storage device controller 202 also includes a data bus 205, a local bus 209, a buffer controller 208, buffers 0-N 222*a-n*, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the server 108 or may be other devices.

Typically the solid-state storage controller(s) 204 communicate data to the solid-state storage 207 over a storage I/O bus 210. In a typical embodiment where the solid-state storage is arranged in banks 214 and each bank 214 includes multiple storage elements 216, 218, 220 accessed in parallel, the storage I/O bus 210 is an array of busses, one for each row of storage elements 216, 218, 220 spanning the banks 214. As used herein, the term "storage I/O bus" may refer to one storage I/O bus 210 or an array of data independent busses (not shown). In a preferred embodiment, each storage I/O bus 210 accessing a row of storage elements (e.g. 216*a*, 218*a*, 220*a*) may include a logical-to-physical mapping for storage divisions (e.g. erase blocks) accessed in a row of storage elements 216*a*, 218*a*, 220*a*. This mapping may also allow a logical address mapped to a physical address of a storage division to be remapped to a different storage division if the first storage division fails, partially fails, is inaccessible, or has some other problem.

Data may also be communicated to the solid-state storage controller(s) 204 from a requesting device, such as a client 110 or file server 114/file system, through the system bus 240, bridge 238, local bus 209, buffer(s) 222, and finally over a data bus 205. The data bus 205 typically is connected to one or more buffers 222*a-n* controlled with a buffer controller 208. The buffer controller 208 typically controls transfer of data from the local bus 209 to the buffers 222 and through the data bus 205 to the pipeline input buffer 306 and output buffer 330 (see FIG. 3). The buffer controller 208 typically controls how data arriving from a requesting device can be temporarily stored in a buffer 222 and then transferred onto a data bus 205, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 209 through a bridge 238.

Typically the data is transferred from the local bus 209 to one or more data buffers 222 as directed by the master controller 224 and the buffer controller 208. The data then flows out of the buffer(s) 222 to the data bus 205, through a solid-state controller 204, and on to the solid-state storage 207 such as NAND flash or other storage media. In a preferred embodiment, data and associated out-of-band metadata ("data unit metadata") arriving with the data is communicated using one or more data channels comprising one or more solid-state storage controllers 204*a*-204*n*-1 and associated solid-state storage 207*a*-207*n*-1 while at least one channel (solid-state storage controller 204*n*, solid-state storage 207*n*) is dedicated to in-band metadata, such as index information and other metadata generated internally to the solid-state storage device 206.

The local bus 209 is typically a bidirectional bus or set of busses that allows for communication of data and commands between devices internal to the solid-state storage device controller 202 and between devices internal to the solid-state storage device 206 and devices 244-258 connected to the system bus 240. The bridge 238 facilitates communication between the local bus 209 and system bus 240. One of skill in the art will recognize other embodiments such as ring structures or switched star configurations and functions of buses 240, 209, 205, 210 and bridges 238.

The system bus 240 is typically a bus of a computer, server 108, or other device in which the solid-state storage device 206 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fibre Channel, USB, PCIe-AS, or the like. The solid-state storage device 206 may be packaged to fit internally to a device or as an externally connected device.

The solid-state storage device controller 202 includes a master controller 224 that controls higher-level functions within the solid-state storage device 206. The master controller 224, in various embodiments, controls data flow by interpreting storage requests and other requests, directs creation of indexes to map identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 323 (static random access memory "SRAM"), etc. In one embodiment, the local memory is controlled using the master controller 224. In another embodiment, the master controller accesses the local memory via a memory controller 228. In another embodiment, the master controller runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage controller 104/solid-state storage device controller 202 manages multiple data storage devices 106/solid-state storage 207a-n, the master controller 224 divides the work load among internal controllers, such as the solid-state storage controllers 204a-n. For example, the master controller 224 may divide an data to be written to the data storage devices (e.g. solid-state storage 207a-n) so that a portion of the data is stored on each of the attached data storage devices 106/solid-state storage 207. This feature is a performance enhancement allowing quicker storage and access to an data. In one embodiment, the master controller 224 is implemented using an FPGA. The solid-state storage device controller 202 may also be implemented using an FPGA. In another embodiment, the firmware within the master controller 224 may be updated through the management bus 236, the system bus 240 over a network connected to a network interface card ("NIC") 244 or other device connected to the system bus 240.

In one embodiment, the master controller 224, which manages objects, files, another data units, emulates block storage such that a computer or server 108 or other device connected to the storage device 106/solid-state storage device 206 views the storage device 106/solid-state storage device 206 as a block storage device and sends data divided into logical blocks to specific logical block addresses in the storage device 106/solid-state storage device 206. The master controller 224 then divides up the logical blocks and stores data from the logical blocks as it would any other data unit, such as an object. The master controller 224 then maps the logical blocks and logical block addresses sent with the logical blocks to the actual physical locations where the data is stored. The mapping is stored in the index. Typically, for logical block emulation, a block device application program interface ("API") is provided in a driver 118 in the server 108, client 110, or other device wishing to use the storage device 106/solid-state storage device 206 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client 110 may have access to the computer network 118 through an I/O memory driver using a standard stack API and operating in conjunction with NICs 244.

In one embodiment, the master controller 224 is also a RAID controller. Where the data storage device/solid-state storage device 206 is networked with one or more other data storage devices 106/solid-state storage devices 206, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 209) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 118) and associated driver software. In another embodiment, the master controller 224 coordinates with the local bus 209 or external bus attached hard disk drive ("HDD") storage controller. The controller 202 may make the storage controllers 254 invisible to the client.

In one embodiment, the master controller 224 communicates with one or more storage controllers 254 where the storage device 106/solid-state storage device 206 may appear as a storage device connected through a SCSI bus, Internet SCSI ("iSCSI"), Fibre Channel, etc. Meanwhile the storage device 106/solid-state storage device 206 may autonomously manage objects, files, and other data units and may appear as an object file system, distributed object file system, file system, etc. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling, refreshing of storage cells, and the like.

In another embodiment, the master controller 224 allows the data storage device/solid-state storage device 206 to be partitioned into multiple virtual devices and allows partition-based media encryption. In yet another embodiment, the master controller 224 supports a solid-state storage controller 204 with advanced, multi-bit ECC correction. One of skill in the art will recognize other features and functions of a master controller 224 in a storage controller 104, or more specifically in a solid-state storage device 206.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the index is stored in memory 230, 232 and then periodically off-loaded to a channel of the solid-state storage 207n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 206 and one or more external memory controllers 250 and associated external memory arrays 252 and CPUs 248. Note that the external memory controllers 250 and external memory arrays 252 are called external because they are external to the storage device/solid-state storage device 206. In addition the DMA controller 226 may also control RDMA operations with requesting devices through a NIC 244 and associated RDMA controller 246. DMA and RDMA are explained in more detail below.

In one embodiment, the solid-state storage device controller 202 includes a management controller 234 connected to a management bus 236. Typically the management controller 234 manages environmental metrics and status of the storage device/solid-state storage device 206. The management controller 234 may monitor device temperature, fan speed, power supply settings, etc. over the management bus 236. The management controller may support the reading and programming of erasable programmable read only memory ("EEPROM") for storage of FPGA code and controller software.

Typically the management bus 236 is connected to the various components within the storage device/solid-state storage device 206. The management controller 234 may communicate alerts, interrupts, etc. over the local bus 209 or may include a separate connection to a system bus 240 or other bus. In one embodiment the management bus 236 is an Inter-Integrated Circuit ("I²C") bus. One of skill in the art will recognize other related functions and uses of a management controller 234 connected to components of the storage device/solid-state storage device 206 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Figure 3:
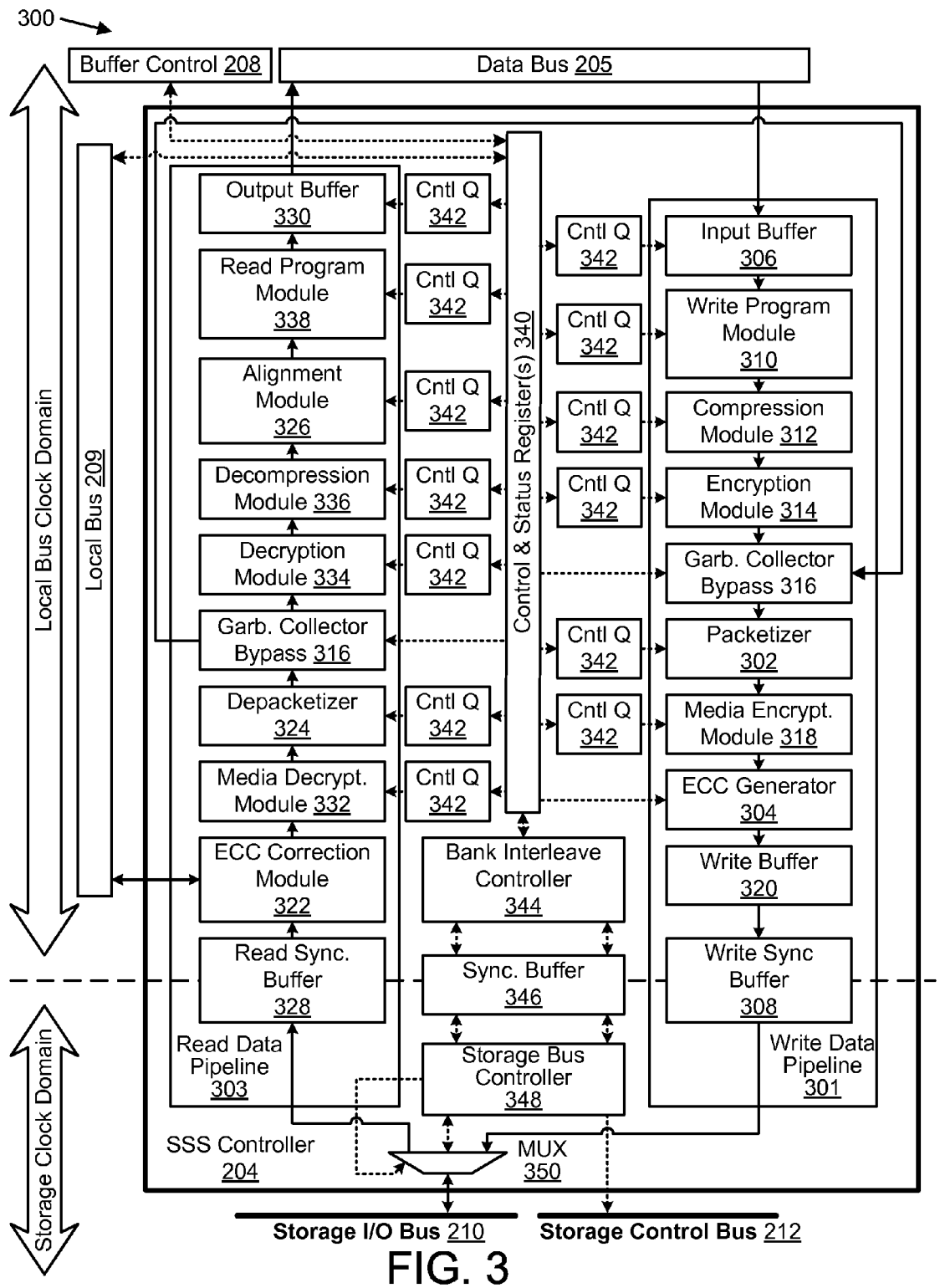
FIG. 3 is a schematic block diagram illustrating a write data pipeline and a read data pipeline in a solid-state storage device that may include an apparatus to allocate data storage space in accordance with the present invention.

FIG. 3 is a schematic block diagram illustrating one embodiment 300 of a solid-state storage controller 204 with a write data pipeline 301 and a read data pipeline 303 in a solid-state storage device 206 in accordance with the present invention. The embodiment 300 includes a data bus 205, a local bus 209, and buffer control 208, which are substantially similar to those described in relation to the solid-state storage device controller 202 of FIG. 2. The write data pipeline includes a packetizer 302 and an error-correcting code ("ECC") generator 304. In other embodiments, the write data pipeline includes an input buffer 306, a write synchronization buffer 308, a write program module 310, a compression module 312, an encryption module 314, a garbage collector bypass 316 (with a portion within the read data pipeline), a media encryption module 318, and a write buffer 320.

The read data pipeline 303 includes a read synchronization buffer 328, an ECC correction module 322, a depacketizer 324, an alignment module 326, and an output buffer 330. In other embodiments, the read data pipeline 303 may include a media decryption module 332, a portion of the garbage collector bypass 316, a decryption module 334, a decompression module 336, and a read program module 338. The solid-state storage controller 204 may also include control and status registers 340 and control queues 342, a bank interleave controller 344, a synchronization buffer 346, a storage bus controller 348, and a multiplexer ("MUX") 350. The components of the solid-state controller 204 and associated write data pipeline 301 and read data pipeline 303 are described below. In other embodiments, synchronous solid-state storage 207 may be used and synchronization buffers 308 328 may be eliminated.

The write data pipeline 301 includes a packetizer 302 that receives a data or metadata segment to be written to the solid-state storage, either directly or indirectly through another write data pipeline 301 stage, and creates one or more packets sized for the solid-state storage 207. The data or metadata segment is typically part of an object, file, inode, or other data unit, but may also include an entire object, file, inode, etc. In another embodiment, the data segment is part of a logical block of data, but may also include an entire logical block. Typically, a data unit or portion of a data unit is received from a server 108, client 110, or other computer or device and is transmitted to the solid-state storage device 206 in data segments streamed to the solid-state storage device 206 or server 108. A data segment may be of fixed length or variable and may also be known by another name, such as data parcel, but as referenced herein includes all or a portion of a data unit, such as a file, object, logical block, etc.

Each data unit is stored as one or more packets. Each data unit may have one or more container packets. Each packet contains a header. The header may include a header type field. Type fields may include data, attribute such as an object attribute, metadata, data segment delimiters (multi-packet), object or other structures, linkages, and the like. The header may also include information regarding the size of the packet, such as the number of bytes of data included in the packet. The length of the packet may be established by the packet type. The header may include information that establishes the relationship of the packet to the data unit, such as a logical identifier. An example might be a logical block address and offset using of an offset in a data packet header to identify the location of the data segment within the data unit. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data unit to which the packet belongs. For example, the header may include an object identifier and offset that indicates the data segment, object, logical block, or other data unit from which the data packet was formed. The header may also include a logical identifier used by the storage bus controller 348 to store the packet. The header may also include information regarding the size of the packet, such as the number of bytes included in the packet. The header may also include a sequence number that identifies where the data segment belongs with respect to other packets within the data unit when reconstructing the data segment or data unit. The header may include a header type field. Type fields may include data, object attributes, metadata, data segment delimiters (multi-packet), object structures, object linkages, and the like. One of skill in the art will recognize other information that may be included in a header added to data or metadata by a packetizer 302 and other information that may be added to a packet.

The write data pipeline 301 includes an ECC generator 304 that generates one or more error-correcting codes ("ECC") for the one or more packets received from the packetizer 302. The ECC generator 304 typically uses an error correcting algorithm to generate ECC which is stored with data packets. The ECC stored with the packets is typically used to detect and correct errors introduced into the data through transmission and storage. In one embodiment, packets are streamed into the ECC generator 304 as un-encoded blocks of length N ("ECC block"). An ECC block typically has several packets, but may be a single packet. A packet may span multiple ECC blocks. An ECC block is typically smaller than a logical page, but in other embodiments may be larger than a single logical page. ECC blocks, packets, logical pages, logical erase blocks, and the like may be aligned or unaligned.

A syndrome of length S is calculated for the ECC block, appended and output as an encoded ECC chunk of length N+S. In a preferred embodiment, the syndrome S is for an ECC block that spans multiple physical pages such that one or more ECC blocks are stored in a logical page. The value of N and S are dependent upon the characteristics of the algorithm which is selected to achieve specific performance, efficiency, and robustness metrics. In the preferred embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In the preferred embodiment, ECC algorithms are not dynamically modified. In a preferred embodiment, the ECC stored with the data packets is robust enough to correct errors in more than two bits.

Beneficially, using a robust ECC algorithm allowing more than single bit correction or even double bit correction allows the life of the solid-state storage 207 to be extended. For example, if flash memory is used as the storage medium in the solid-state storage 207, the flash memory may be written approximately 100,000 times without error per erase cycle. This usage limit may be extended using a robust ECC algorithm. Having the ECC generator 304 and corresponding ECC correction module 322 onboard the solid-state storage device 206, the solid-state storage device 206 can internally correct errors and has a longer useful life than if a less robust ECC algorithm is used, such as single bit correction. One example of using an ECC chunk spread across storage elements for reducing wear in a storage device 106 is described in more detail in U.S. patent application Ser. No. 12/468,041, titled Apparatus, System, and Method to Increase Data Integrity in a Redundant Storage System, to Jonathan Thatcher, et al., filed May 18, 2009 and in U.S. patent application Ser. No. 12/468,040, titled Apparatus, System, and Method for Reconfiguring an Array to Operate with Less Storage Elements, to Jonathan Thatcher, et al., filed May 18, 2009. The applications describe using both ECC protection and parity information to effectively detect errors and then to reconfigure an array if a storage element is found to be in error.

However, in other embodiments the ECC generator 304 may use a less robust algorithm and may correct single-bit or double-bit errors. In another embodiment, the solid-state storage device 206 may comprise less reliable storage such as multi-level cell ("MLC") flash in order to increase capacity, which storage may not be sufficiently reliable without more robust ECC algorithms.

In one embodiment, the write data pipeline 301 includes an input buffer 306 that receives data segments to be written to the solid-state storage 207 and stores the incoming data segments until the next stage of the write data pipeline 301, such as the packetizer 302 (or other stage for a more complex write data pipeline 301) is ready to process the next data segment. The input buffer 306 typically allows for discrepancies between the rate data segments are received and processed by the write data pipeline 301 using an appropriately sized data buffer. The input buffer 306 also allows the data bus 205 to transfer data to the write data pipeline 301 at rates greater than can be sustained by the write data pipeline 301 in order to improve efficiency of operation of the data bus 205. Typically when the write data pipeline 301 does not include an input buffer 306, a buffering function is performed elsewhere, such as in the solid-state storage device 206 but outside the write data pipeline 301, in the server 108, such as within a network interface card ("NIC"), or at another device, for example when using remote direct memory access ("RDMA").

Data may stream into the input buffer 306 from one or more clients 110 or file servers 114/file system. Typically the data is input into the input buffer 306 in an order of arrival from the clients 110 and/or file servers 114/file system. The data may then be stored in order of arrival, sequentially rather than separated out by client 110 or file server 114/file system. In a sequential storage device, the data from various sources can be interspersed because the index and metadata can be used to track the source of the data.

In another embodiment, the write data pipeline 301 also includes a write synchronization buffer 308 that buffers packets received from the ECC generator 304 prior to writing the packets to the solid-state storage 207. The write synch buffer 308 is located at a boundary between a local clock domain and a solid-state storage clock domain and provides buffering to account for the clock domain differences. In other embodiments, synchronous solid-state storage 207 may be used and synchronization buffers 308 328 may be eliminated.

In one embodiment, the write data pipeline 301 also includes a media encryption module 318 that receives the one or more packets from the packetizer 302, either directly or indirectly, and encrypts the one or more packets using an encryption key unique to the solid-state storage device 206 prior to sending the packets to the ECC generator 304. Typically, the entire packet is encrypted, including the headers. In another embodiment, headers are not encrypted. In this document, encryption key is understood to mean a secret encryption key that is managed externally from an embodiment that integrates the solid-state storage 207 and where the embodiment requires encryption protection.

The media encryption module 318 and corresponding media decryption module 332 provide a level of security for data stored in the solid-state storage 207. For example, where data is encrypted with the media encryption module 318, if the solid-state storage 207 is connected to a different solid-state storage controller 204, solid-state storage device 206, or server 108, the contents of the solid-state storage 207 typically could not be read without use of the same encryption key used during the write of the data to the solid-state storage 207 without significant effort.

In a typical embodiment, the solid-state storage device 206 does not store the encryption key in non-volatile storage and allows no external access to the encryption key. The encryption key is provided to the solid-state storage controller 204 during initialization. The solid-state storage device 206 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a client 110, a server 108, key manager, or other device that manages the encryption key to be used by the solid-state storage controller 204. In another embodiment, the solid-state storage 207 may have two or more partitions and the solid-state storage controller 204 behaves as though it were two or more solid-state storage controllers 204, each operating on a single partition within the solid-state storage 207. In this embodiment, a unique media encryption key may be used with each partition.

In another embodiment, the write data pipeline 301 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption module 314 differs from the media encryption module 318 in that the encryption keys used by the encryption module 318 to encrypt data may not be common to all data stored within the solid-state storage device 206 but may vary on a data unit basis and received in conjunction with receiving data segments as described below.

For example, an encryption key for a data segment to be encrypted by the encryption module 318 may be received with the data segment or may be received as part of a command to write a data unit to which the data segment belongs. The solid-state storage device 206 may use and store a non-secret cryptographic nonce in each data packet that is used in conjunction with the encryption key. A different nonce may be stored with every packet. Data segments may be split between multiple packets with unique nonces for the purpose of improving protection by the encryption algorithm. In one embodiment, the nonce used by the media encryption module 318 is the same as that used by the encryption module 314.

The encryption key may be received from a client 110, a server 108, key manager, or other device that holds the encryption key to be used to encrypt the data segment. In one embodiment, encryption keys are transferred to the solid-state storage controller 204 from one of a solid-state storage device 206, server 108, client 110, or other external agent which has the ability to execute industry standard methods to securely transfer and protect private and public keys.

In one embodiment, the encryption module 318 encrypts a first packet with a first encryption key received in conjunction with the packet and encrypts a second packet with a second encryption key received in conjunction with the second packet. In another embodiment, the encryption module 318 encrypts a first packet with a first encryption key received in conjunction with the packet and passes a second data packet on to the next stage without encryption. Beneficially, the encryption module 318 included in the write data pipeline 301 of the solid-state storage device 206 allows data unit-by-data unit or segment-by-segment data encryption without a single file server 114/file system or other external system to keep track of the different encryption keys used to store corresponding data units or data segments. Each requesting device 155 or related key manager independently manages encryption keys used to encrypt only the data units or data segments sent by the requesting device 155.

In another embodiment, the write data pipeline 301 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 206 is beneficial so that clients 110 or other devices writing data to the solid-state storage device 206 may each specify a compression routine or so that one can specify a compression routine while another specifies no compression. Selection of compression routines may also be selected according to default settings on a per data unit type or data unit class basis. For example, a first data unit of a specific data unit may be able to override default compression routine settings and a second data unit of the same data unit class and data unit type may use the default compression routine and a third data unit of the same data unit class and data unit type may use no compression.

In one embodiment, the write data pipeline 301 includes a garbage collector bypass 316 that receives data segments from the read data pipeline 303 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage, such as a logical erase block, may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 303 and then transferred directly to the write data pipeline 301 without being routed out of the solid-state storage controller 204. In a preferred embodiment, the garbage collector bypass 316 is part of an autonomous garbage collector system that operates within the solid-state storage device 206. This allows the solid-state storage device 206 to manage data so that data is systematically spread throughout the solid-state storage 207 to improve performance, data reliability and to avoid overuse and underuse of any one location or area of the solid-state storage 207 and to lengthen the useful life of the solid-state storage 207.

The garbage collector bypass 316 coordinates insertion of segments into the write data pipeline 301 with other segments being written by one or more clients 110 or other devices. In the depicted embodiment, the garbage collector bypass 316 is before the packetizer 302 in the write data pipeline 301 and after the depacketizer 324 in the read data pipeline 303, but may also be located elsewhere in the read and write data pipelines 303, 301. The garbage collector bypass 316 may be used during a flush of the write data pipeline 301 to fill the remainder of the logical page in order to improve the efficiency of storage within the Solid-state storage 207 and thereby reduce the frequency of garbage collection.

In one embodiment, the write data pipeline 301 includes a write buffer 320 that buffers data for efficient write operations. Typically, the write buffer 320 includes enough capacity for packets to fill at least one logical page in the solid-state storage 207. This allows a write operation to send an entire page of data to the solid-state storage 207 without interruption. The logical page may include more than one ECC chunk. By sizing the write buffer 320 of the write data pipeline 301 and buffers within the read data pipeline 303 to be the same capacity or larger than a storage write buffer within the solid-state storage 207, writing and reading data is more efficient since a single write command may be crafted to send a full logical page of data to the solid-state storage 207 instead of multiple commands. In another embodiment, contents of the write buffer 302 with less than a logical page are written to the solid-state storage 207.

While the write buffer 320 is being filled, the solid-state storage 207 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiments with a write buffer 320 sized larger than a logical page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the solid-state storage 207.

In another embodiment, the write buffer 320 is sized smaller than a logical page so that less than a page of information could be written to a storage write buffer in the solid-state storage 207. In the embodiment, to prevent a stall in the write data pipeline 301 from holding up read operations, data is queued using the garbage collection system that needs to be moved from one location to another as part of the garbage collection process. In case of a data stall in the write data pipeline 301, the data can be fed through the garbage collector bypass 316 to the write buffer 320 and then on to the storage write buffer in the solid-state storage 207 to fill the pages of a logical page prior to programming the data. In this way a data stall in the write data pipeline 301 would not stall reading from the solid-state storage device 106.

In another embodiment, the write data pipeline 301 includes a write program module 310 with one or more user-definable functions within the write data pipeline 301. The write program module 310 allows a user to customize the write data pipeline 301. A user may customize the write data pipeline 301 based on a particular data requirement or application. Where the solid-state storage controller 204 is an FPGA, the user may program the write data pipeline 301 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 301. In another embodiment, the write program module 310 may include a processor core that can be programmed through software.

Note that the write program module 310 is shown between the input buffer 306 and the compression module 312, however, the write program module 310 could be anywhere in the write data pipeline 301 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 303 includes an ECC correction module 322 that determines if a data error exists in ECC blocks a requested packet received from the solid-state storage 207 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage 207 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In the preferred embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 303. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 303. The requesting device 155 may use header information in the requested packet in error to identify data required to replace the corrupted requested packet or to replace the data unit to which the packet belongs.

In another preferred embodiment, the solid-state storage controller 204 stores data using some type of RAID and is able to recover the corrupted data. In another embodiment, the ECC correction module 322 sends and interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors, even after a retry of the operation.

The read data pipeline 303 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 303 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required to rebuild the index. Further examples include the transfer of packets of various types destined for use within the solid-state storage device 206. In another embodiment, the depacketizer 324 operation may be packet type dependent.

The read data pipeline 303 includes an alignment module 326 that receives data from the depacketizer 324 and removes unwanted data. In one embodiment, a read command sent to the solid-state storage 207 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data unit in a form compatible with a device requesting the data segment prior to forwarding the data segment to the next stage. Typically, as data is processed by the read data pipeline 303, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device, the alignment module 326 may discard the unwanted data.

In one embodiment, the read data pipeline 303 includes a read synchronization buffer 328 that buffers one or more requested packets read from the solid-state storage 207 prior to processing by the read data pipeline 303. The read synchronization buffer 328 is at the boundary between the solid-state storage clock domain and the local bus clock domain and provides buffering to account for the clock domain differences.

In another embodiment, the read data pipeline 303 includes an output buffer 330 that receives requested packets from the alignment module 326 and stores the packets prior to transmission to the requesting device. The output buffer 330 accounts for differences between when data segments are received from stages of the read data pipeline 303 and when the data segments are transmitted to other parts of the solid-state storage controller 204 or to a requesting device, client 110, file server 114, etc. The output buffer 330 also allows the data bus 205 to receive data from the read data pipeline 303 at rates greater than can be sustained by the read data pipeline 303 in order to improve efficiency of operation of the data bus 205.

In one embodiment, the read data pipeline 303 includes a media decryption module 332 that receives one or more encrypted requested packets from the ECC correction module 322 and decrypts the one or more requested packets using the encryption key unique to the solid-state storage device 206 prior to sending the one or more requested packets to the depacketizer 324. Typically the encryption key used to decrypt data by the media decryption module 332 is identical to the encryption key used by the media encryption module 318. In another embodiment, the solid-state storage 207 may have two or more partitions and the solid-state storage controller 204 behaves as though it were two or more solid-state storage controllers 204 each operating on a single partition within the solid-state storage 207. In this embodiment, a unique media encryption key may be used with each partition.

In another embodiment, the read data pipeline 303 includes a decryption module 334 that decrypts a data segment formatted by the depacketizer 324 prior to sending the data segment to the output buffer 330. The data segment decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 303 without decryption. Typically, the decryption module 334 uses a different encryption key to decrypt a data segment than the media decryption module 332 uses to decrypt requested packets. When the packet was stored with a non-secret cryptographic nonce, the nonce is used in conjunction with an encryption key to decrypt the data packet. The encryption key may be received from a client 110, a server 108, key manager, or other device that manages the encryption key to be used by the solid-state storage controller 204.

In another embodiment, the read data pipeline 303 includes a decompression module 336 that decompresses a data segment formatted by the depacketizer 324. In the preferred embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data unit type or data unit class basis. A first packet of a first data unit may be able to override a default decompression routine and a second packet of a second data unit of the same data unit class and data unit type may use the default decompression routine and a third packet of a third data unit of the same data unit class and data unit type may use no decompression.

In another embodiment, the read data pipeline 303 includes a read program module 338 that includes one or more user-definable functions within the read data pipeline 303. The read program module 338 has similar characteristics to the write program module 310 and allows a user to provide custom functions to the read data pipeline 303. The read program module 338 may be located as shown in FIG. 3, may be located in another position within the read data pipeline 303, or may include multiple parts in multiple locations within the read data pipeline 303. Additionally, there may be multiple read program modules 338 within multiple locations within the read data pipeline 303 that operate independently. One of skill in the art will recognize other forms of a read program module 338 within a read data pipeline 303. As with the write data pipeline 301, the stages of the read data pipeline 303 may be rearranged and one of skill in the art will recognize other orders of stages within the read data pipeline 303.

The solid-state storage controller 204 includes control and status registers 340 and corresponding control queues 342. The control and status registers 340 and control queues 342 facilitate control and sequencing commands and subcommands associated with data processed in the write and read data pipelines 301, 303. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 301 with each pipeline stage pulling the appropriate command or instruction as the respective packet is executed by that stage. Similarly, commands or instructions may be simultaneously loaded into the control queues 342 for a packet being requested from the read data pipeline 303 with each pipeline stage pulling the appropriate command or instruction as the respective packet is executed by that stage. One of skill in the art will recognize other features and functions of control and status registers 340 and control queues 342.

The solid-state storage controller 204 and or solid-state storage device 206 may also include a bank interleave controller 344. The bank interleave controller 344 coordinates writing, reading, erasing, etc. between banks. Typically, erasing a logical erase block takes longer than writing a logical page and reading takes less time than writing a logical page. By coordinating commands between banks, the bank interleave controller 344 increases efficiency in the solid-state storage device 202. A more detailed description of the bank interleave controller 344 is described in U.S. application Ser. No. 11/952,095, titled Apparatus, System, and Method for Managing Commands of Solid-State Storage Using Bank Interleave, to David Flynn, et al., filed Dec. 6, 2007.

The solid-state storage controller 204 includes a synchronization buffer 346 that buffers commands and status messages sent and received from the solid-state storage 207. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In the preferred embodiment, the synchronization buffer 346 is located where there are the fewest number of signals crossing the clock domains. One skilled in the art will recognize that synchronization between clock domains may be arbitrarily moved to other locations within the solid-state storage device 202 in order to optimize some aspect of design implementation.

The solid-state storage controller 204 includes a storage bus controller 348 that interprets and translates commands for data sent to and read from the solid-state storage 110 and status messages received from the solid-state storage 207 based on the type of solid-state storage 207. For example, the storage bus controller 348 may have different timing requirements for different types of storage, storage with different performance characteristics, storage from different manufacturers, etc. The storage bus controller 348 also sends control commands to the storage control bus 212.

In the preferred embodiment, the solid-state storage controller 204 includes a MUX 350 that comprises an array of multiplexers 350a-n where each multiplexer is dedicated to a row in the solid-state storage array 207. For example, multiplexer 350a is associated with solid-state storage elements 216a, 218a, 220a. MUX 350 routes the data from the write data pipeline 301 and commands from the storage bus controller 348 to the solid-state storage 207 via the storage I/O bus 210 and routes data and status messages from the solid-state storage 207 via the storage I/O bus 210 to the read data pipeline 303 and the control and status registers 340 through the storage bus controller 348, synchronization buffer 346, and bank interleave controller 344.

In the preferred embodiment, the solid-state storage controller 204 includes a MUX 350 for each row of solid-state storage elements (e.g. SSS 0.1 216a, SSS 0.2 218a, SSS 0.N 220a). A MUX 350 combines data from the write data pipeline 301 and commands sent to the solid-state storage 207 via the storage I/O bus 210 and separates data to be processed by the read data pipeline 303 from commands. Packets stored in the write buffer 320 are directed on busses out of the write buffer 320 through a write synchronization buffer 308 for each row of solid-state storage elements (SSS x.0 to SSS x.N 216, 218, 220) to the MUX 350 for each row of solid-state storage elements (SSS x.0 to SSS x.N 216, 218, 220). The commands and read data are received by the MUXes 350 from the storage I/O bus 210. The MUXes 350 also direct status messages to the storage bus controller 348.

Figure 4:
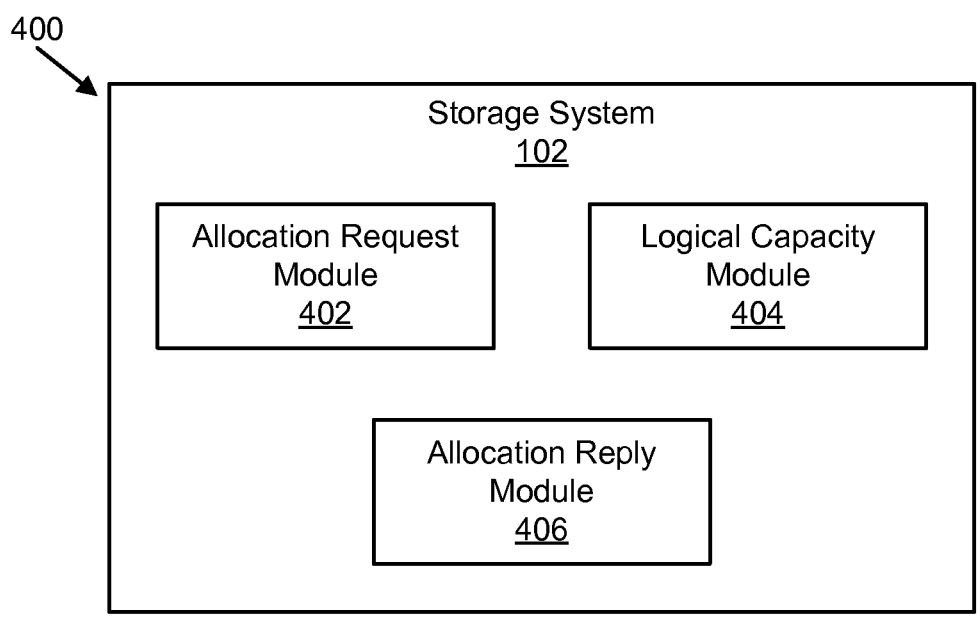
FIG. 4 is a schematic block diagram illustrating one embodiment of an apparatus to allocate data storage space in accordance with the present invention.

FIG. 4 is a schematic block diagram illustrating an embodiment of an apparatus 400 to allocate data storage space in accordance with the present invention. The apparatus 400 includes an allocation request module 402, a logical capacity module 404, and an allocation reply module 406, which are described below. The allocation request module 402, the logical capacity module 404, and the allocation reply module 406 are depicted in the storage system 102 in general, but all or part of the allocation request module 402, the logical capacity module 404, and the allocation reply module 406 may be in a storage controller 104, driver 118, or other location in the storage system 102.

The apparatus 400 includes an allocation request module 402 that receives from a requesting device an allocation request to allocate logical capacity. The requesting device may be a file server 114/file system, a client 110, a master allocation manager 124, or any other device or component capable of sending an allocation request. The allocation request is received at a data storage device. In one embodiment, the data storage device includes a storage device 106 as shown and at least a storage controller 104 controlling the storage device 106 and may include a driver 118 coupled to the storage controller 104. The logical capacity associated with the allocation request is for storing data specifically on the data storage device that is the target of the allocation request.

The allocation request may include a logical allocation request or may include a request to store data. In the case of a logical allocation request, the request is typically a request for LIDs to be allocated to a client 110. In the case of a request to store data, one or more LIDs are allocated to a client 110 or file server 114/file system, and are bound to physical storage locations, which may comprise associating the LIDs with physical storage locations comprising the data. In one embodiment, the LIDs are bound to physical storage locations at the time of allocation (e.g., the allocation request may comprise a request to store data). In another embodiment, where the allocation request is separate from a request to store data, allocating LIDs to the data may be in a separate step from binding the LIDs to the physical storage locations. In certain embodiments, the request comes from a plurality of clients, consequently a client identifier may be associated with the request, the apparatus 400 may use the client identifier to implement an access control with respect to allocations for that client and/or with respect to the LIDS available to allocate to the client. In addition, the client identifier may be used to manage how much physical capacity is allocated to a particular client or set of clients.

The apparatus 400 includes a logical capacity module 404 that determines if a logical space of the data storage device includes sufficient unallocated logical space to satisfy the allocation request. The logical capacity module 404 may determines if the logical space has sufficient unbound and/or unallocated logical capacity using an index (or other datastructure) maintaining LID bindings and/or allocations. In some embodiments, the logical capacity module 404 may search a logical-to-physical map or index maintained on the non-volatile storage device. The logical-to-physical map includes associations between logical identifiers ("LIDs") in the logical space and corresponding physical storage locations. However, other datastructures and/or techniques for determining logical capacity may be used under the teachings of this disclosure. Accordingly, the disclosure should not be read as limited in this regard. Additional examples of determining available logical capacity (e.g., unallocated and/or unbound logical capacity) and/or available physical storage capacity are disclosed below.

As discussed above, unbound LIDs may refer to LIDs that do not correspond to valid data stored on the non-volatile storage device (e.g. are not in the logical-to-physical map). An unbound LID may be allocated to a client 110 or may be unallocated. In some embodiments, the logical-to-physical map is configured such that there are no other logical-to-logical mappings between the LIDs in the map and physical addresses associated with the LIDs.

The LIDs in the logical-to-physical map, managed at the data storage device, may include any type of logical address, such as an LBA, an index, a file name, and an inode, and may include objects. Specifically, the logical-to-physical map is not limited to objects or any specific logical address type but may include objects as well as file names, LBAs, etc. In another embodiment, a LID includes logical identifiers other than an object identifier and objects are not managed directly by the data storage device. The apparatus 400 is advantageous because the logical-to-physical map of the data storage device as well as the modules 402-406 of the apparatus 400 are not limited to objects, but the LIDs can also be LBAs and other data unit labels, which expands the scope and flexibility of the apparatus 400.

In some embodiments, the logical capacity module 404 searches the logical-to-physical map to identify unbound LIDs and, by knowing the logical space of the data storage device, the logical capacity module 404 determines unallocated logical space. For example, if a logical space includes a range of logical addresses from 0000 to FFFF and logical-to-physical map indicates that the logical addresses 0000 to F000 are allocated and bound, the logical capacity module 404 may determine that the unallocated logical space may include addresses F001 to FFFF. If the logical addresses F001 to FFFF are not allocated to another client 110, they may be available for allocation to satisfy the allocation request.

In some embodiments, the non-volatile storage device may maintain separate logical storage spaces for different respective clients. Accordingly, each client may operate its own, separate logical storage space. The non-volatile storage device may, therefore, maintain separate metadata (e.g., indexes, capacity indicators, and so on), for each client. Clients may be distinguished by address (e.g., network address), a credential, or other identifier. The identifiers may be provided in client requests and/or may be associated with a communication channel or protocol used by the client to access the non-volatile storage device.

In some embodiments, the logical-to-physical map (or other datastructure) may comprise an allocation index or allocation entries configured to track logical capacity allocations that have not yet been bound to physical storage locations. For example, a LID (or other portion of logical capacity) may be allocated to a client, but may not be associated with data stored on the storage device 106. Accordingly, although the logical capacity maybe allocated, it may be "unbound," and as such, may not be included in the logical-to-physical map. Accordingly, when determining the unallocated logical space, the logical capacity module 404 may consult additional data structures (e.g., allocation index or allocation entries) in addition to other indexing information (e.g., the logical to physical map). Alternatively, the allocation entry may be included in the logical-to-physical map, and may comprise an indicator showing that the entry is not bound to any particular physical storage locations.

Alternatively, or in addition, the non-volatile storage device may maintain an "unallocated index" which may identify LIDs (or other portions of logical capacity) that are unallocated. Examples of an availability index are described below in conjunction with FIG. 12.

If, for example, the allocation request includes a request for a certain number of LIDs, the logical capacity module 404 can determine if the available logical space (e.g. unbound and/or unallocated logical capacity) is sufficient to meet or exceed the requested amount of logical addresses. In another example, if the allocation request includes a list or range of LIDs, the logical capacity module 404 can determine if the LIDs for all or a portion of the LIDs requested are unallocated or unbound.

In a typical random access device, typically LIDs are LBAs and LBAs match physical block addresses ("PBAs") according to a pre-determined mapping. By contrast, in a sequential storage device, a log structured device, or the like, a bound LID differs from the one or more physical addresses mapped to the LID (e.g., there may be no pre-set or pre-determined mapping from LID to storage location). In such a data storage device data may be moved by a garbage collection process or other space recovery process and data is tracked in the logical-to-physical map. Typically a bound LID in a sequential or log-based storage device is related to physical storage locations to which it is bound by only the index (e.g., logical-to-physical mapping).

For a sequential storage device, log structured device, and the like, the logical-to-physical mapping may change for various reasons. In one embodiment, the mapping of one or more LIDs to one or more physical addresses changes when the data stored at the one or more physical addresses is moved to one or more different physical addresses. In another embodiment, the mapping of one or more LIDs to one or more physical addresses changes in a deduplication process. For example when the data stored at the one or more physical addresses is stored at a first physical location and is identical to data stored at a second physical location and the mapping of the one or more LIDs is changed to correspond to the second physical location.

In another embodiment, the mapping of one or more LIDs to one or more physical addresses changes when the one or more physical locations mapped to the one or more LIDs ("first LIDs") are remapped to one or more different LIDs ("second LIDs"). This may occur if a file or object name changes, for example. In a storage device where there are no pre-determined and/or pre-set associations between LID and physical storage locations and/or data may be moved and the associations between LIDs and the physical storage locations may change, a logical-to-physical indexing may be used. Since the storage device already maintains associations between logical addresses and storage locations on the storage device, client address translations may be obviated; there is no need for the client to maintain a separate, redundant set of mappings. Accordingly, one or more mapping and/or address translation layers between the client and the storage device may be eliminated, reducing the processing load of the client.

The apparatus 400 includes an allocation reply module 406 that communicates a reply to the requesting device in response to the logical capacity module 404 determining if the logical space has sufficient logical space. The reply includes an indication of whether the logical space has sufficient logical space to satisfy the allocation request. For example, if the logical capacity module 404 determines that the unallocated logical space is insufficient to satisfy the allocation request, the allocation reply module 406 may include in the reply that the allocation request failed.

If for example, the logical capacity module 404 determines that the unallocated logical space is sufficient to satisfy the allocation request, the allocation reply module 406 may include in the reply an affirmative response, a list of LIDs, a range of LIDs, etc. depending upon the nature of the allocation request. If, for example, the logical capacity module 404 determines that the unallocated logical space is sufficient to satisfy the allocation request and the allocation request includes a request to allocate specific LIDs, the reply module 406 may communicate an acknowledgement to the requesting device that requested LIDs were allocated. If the allocation request includes a request for LIDs, the allocation reply module 406 may communicate the requested LIDs. If the allocation request includes a request for LIDs that meet criteria, the allocation reply module 406 may communicate LIDs that meet the criteria.

In one embodiment, the allocation request is for a specific group of LIDs and the allocation reply module 406 may reply with the requested LIDs. In another embodiment, the allocation request is part of a write request. In one case the write request includes specific LIDs and the allocation reply module 406 may reply with the requested LIDs. In another case the write request only includes data or an indication of an amount of data and the allocation reply module 406 may reply by allocating LIDS sufficient for the write request and returning the allocated LIDS. Alternatively, if an indication of an amount of data is provided the reply may include LIDs that are unallocated. The allocation reply module 406 may reply before or after the data is written. If the allocation reply module 406 sends a reply after the data is written, the reply may be part of a confirmation of writing the data. One of skill in the art will recognize other ways that the allocation reply module 406 may reply in response to the logical capacity module 404 determining if the logical space of the data storage device has sufficient unallocated logical space to satisfy an allocation request.

In one embodiment, a storage capacity corresponding to the logical space ("logical space capacity") is substantially larger than a physical storage capacity of the data storage device. The logical space capacity includes the unallocated logical space combined with allocated logical space; the allocated logical space comprising the bound LIDs and unbound LIDs in the logical address space. In other words, the data storage device and the associated logical-to-physical mapping support thin provisioning. In the case where a logical identifier is an LBA, each LBA typically has a defined data size. In certain embodiments, an LBA is bound to a logical block and often a logical block is the same size as a physical block on the storage device 106.

In one embodiment, a subset of the LIDs of the logical space of the data storage device has a one-to-one correspondence to physical blocks within the data storage device. For example, if a portion of the logical space is allocated to a client 110 and the client 110 stores logical blocks so for the client 110 a LID is an LBA, each LBA may correspond to a physical address that is equivalent to a physical block address ("PBA"). The logical space available to the data storage device may still accommodate allocation to other clients 110 and may still be thinly provisioned.

While it is common that logical identifiers are logical block addresses, in the apparatus 400 of FIG. 4 logical identifiers can be much more. A logical identifier can be a logical address ("LA"), a logical block address ("LBA"), a file name, a file address, an object identifier, an inode, an index, etc. Where the storage system 102, server 108, etc. uses a 64 or 128 bit address to represent LIDs, the possible logical identifiers for addressing this logical space (i.e. logical space) becomes enormous. Certain amount of bits in an address may be dedicated to a logical space and other bits in the address may carry other information, such as identification of a client, error correction information, attributes relating the data request such as the priority, data type, integrity requirements etc. Using only a portion of bits in an address, for example using 32 bits, provides a very large address space. In one embodiment, metadata hints (e.g. file types, data classes, etc.) are passed from client (e.g. FS) to the storage device. These metadata hints may be coded and passed via the address bits with the side effect of organizing the logical address space according to the meta information. For example, all system files could have the highest order bit in the address set to one, and therefore all be located in the top half of the logical address space.

The logical address space may exceed the physical storage capacity of the storage devices 106 in the storage system 102. It is common that data sent to a storage device 106 or storage system 102 has a minimum size so that data is sent in identifiable units. For example, data sent to a storage system 102 may be divided up into chunks. Data at the end may not match up with a minimum size chunk so the remainder of a data chunk, in addition to the tail-end data, may be NULL characters, zeros, ones, etc.

Assuming that there is some smallest chunk of data sent to a storage system 102 and all the possible logical identifiers each correspond to a chunk, the number of logical identifiers is huge and the logical storage capacity associated with the chunks is much larger than the physical storage capacity of a storage device 106 in the storage system 102. The available physical storage capacity in the data storage device is not correlated to available LIDs. Again this is contrasted with typical random access devices where the available logical block addresses have about a one-to-one correspondence with physical block addresses of the storage device 106.

In a particular embodiment, the storage device driver 118 is coupled to a file server 114/file system via the storage interface 116 and the storage interface 116 includes an interface to enable the file server 114/file system to interact with the storage interface 116. The interface may comprise an Application Program Interface (API), block storage interface, an enhanced block storage interface, a command interface, the like. A command interface according to one embodiment may include a bit in a write command (e.g. client request) to indicate that an allocation should be done in conjunction with the write. A second bit in a write may indicate that the requested LBA parameter is NULL or includes the ID of the client and that the apparatus 400 should allocate one or more LBAs. Or, the client request includes a specific physical allocation request (length of file) with optional timer, etc. Consequently, the interface permits many different features and functions.

The interface may be operational to communicate from the file server 114/file system an allocation request to allocate logical capacity of a data storage device and to communicate to the file server 114/file system an allocation reply. The allocation reply is in response to the allocation request and includes an indication of whether the logical space has sufficient logical space to satisfy the allocation request. The command interface may be implemented as a new input-output control ("IO-CTL") command or an extension of an existing IO-CTL command. The command interface may implement a new protocol or expand and existing protocol.

The logical capacity is for storing data on the data storage device. The storage device driver 118 and/or the data storage device determine if a logical space includes sufficient unallocated logical space to satisfy the allocation request where the determination includes search of the logical-to-physical map. The storage device driver 118 may be part of the data storage device. However, the determination of sufficient unallocated logical space is not made in the file server 114/file system. Instead, the file server 114/file system sends and allocation request and the data storage device/driver 118 replies to the allocation request after searching a logical-to-physical map corresponding to a storage device 106 that is part of the data storage System 102.

In one embodiment, a storage device interface 120 is operable to couple the storage device driver 118 to the data storage device sufficient to cause the data storage device to cooperate with the storage device driver 118 to determine if the logical space has sufficient logical capacity to satisfy the allocation request. The storage device driver 118, as mentioned above, may be PCI Express, serial ATA bus, parallel ATA bus, SCSI, FireWire, Fibre Channel, USB, PCIe-AS, etc.

The interface 116 may expose the index associating LIDs in the logical address space with respective storage locations on the non-volatile storage device directly to clients. The clients may call certain functions of the interface to identify available allocation space, physical capacity, health of the storage media, which LIDS are allocated, which LIDS are bound to physical storage locations, etc. In summary, the interface can expose all or a subset of the features and functionality of the apparatus 400 directly to clients which may be then use that information as desired.

Figure 5:
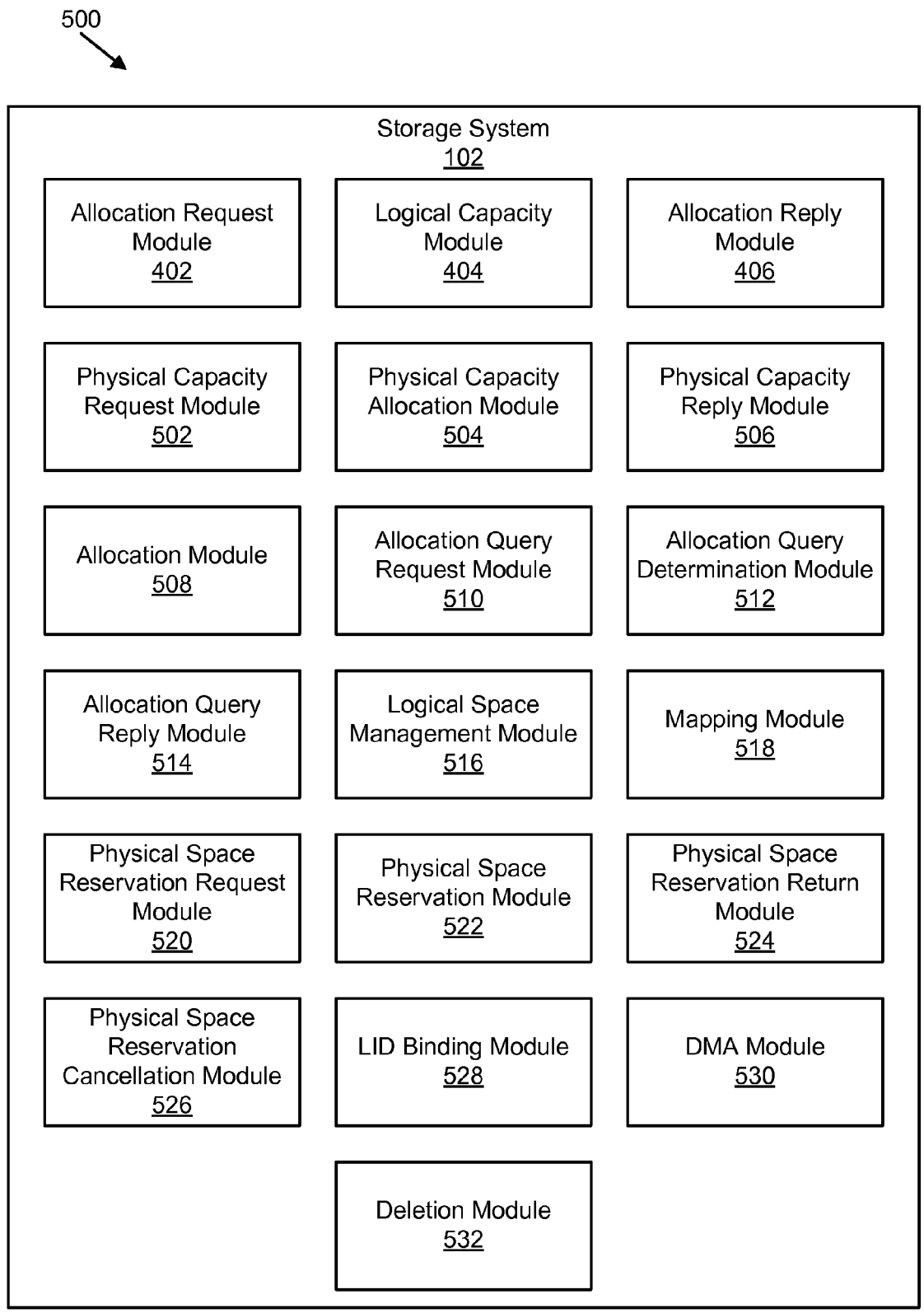
FIG. 5 is a schematic block diagram illustrating another embodiment of an apparatus to allocate data storage space in accordance with the present invention.

FIG. 5 is a schematic block diagram illustrating another embodiment of an apparatus 500 to allocate data storage space in accordance with the present invention. The apparatus 500 includes an allocation request module 402, a logical capacity module 404, and an allocation reply module 406, which are substantially similar to those described above in relation to the apparatus 400 of FIG. 4. In addition, the apparatus 500 includes a physical capacity request module 502, a physical capacity allocation module 504, a physical capacity reply module 506, an allocation module 508, an allocation query request module 510, an allocation query determination module 512, an allocation query reply module 514, a logical space management module 516, a mapping module 518, a physical space reservation request module 520, a physical space reservation module 522, a physical space reservation return module 524, a physical space reservation cancellation module 526, a LID binding module 528, a DMA module 530, and a deletion module 532, which are described below. The modules 402-406 and 502-532 of the apparatus 500 of FIG. 5 are depicted in the storage system 102, and all or a portion may be included in a driver 118, a storage controller 104 or any other appropriate location known to one of skill in the art.

The apparatus 500 includes, in one embodiment, a physical capacity request module 502, a physical capacity allocation module 504, and a physical capacity reply module 506. The physical capacity request module 502 receives from a requesting device a physical capacity request. The physical capacity request is received at the data storage device and includes a request of an amount of available physical storage capacity in the data storage device (and/or physical storage capacity allocated to the requesting device). The physical capacity request may include a quantity of physical capacity or may indirectly request physical storage capacity, for example by indicating a size of a data unit to be stored. Another indirect physical storage capacity request may include logical addresses of data to be stored which may correlate to a data size. One of skill in the art will recognize other forms of a physical capacity request.

The physical capacity allocation module 504 determines the amount of available physical storage capacity on the data storage device. The amount of available physical storage capacity includes a physical storage capacity of unbound physical storage locations in the data storage device. In some embodiments, amount of available physical storage capacity may be "budgeted," for example, only a portion of the physical storage capacity of the storage device may be available to the requesting device. In some embodiments, amount of available physical storage capacity may be "budgeted," based on a quota associated with each client or group of clients. The apparatus 500 may enforce these quotas. The allocation of available physical storage device may be determined by configuration parameter(s), may be dynamically adjusted according to performance and/or quality of service policies, or the like.

The physical capacity allocation module 504 may determine the amount of available physical storage capacity using an index (or other data structure), such as the logical-to-physical map discussed above. The logical-to-physical map may indicate storage locations comprising valid data (e.g., storage locations comprising valid data). The logical-to-physical map may be referenced to identify bound physical storage locations. The available storage capacity may be a total (or budgeted) physical capacity minus the capacity of the bound physical storage locations. Alternatively, or in addition, an allocation index (or other data structure) may maintain an indicator of the available physical storage capacity. The indicator may be updated responsive to storage operations performed on the storage device including, but not limited to: garbage collection operations, grooming operations, deallocations (e.g., TRIM), writing additional data, physical storage capacity reservations, physical storage capacity reservation cancellations, and so on. Accordingly, a "running total" of available physical storage capacity may be available on request.

The physical capacity reply module 506 that communicates a reply to the requesting device in response to the physical capacity allocation module 504 determining the amount of available physical storage capacity on the data storage device.

The physical capacity allocation module 504, in one embodiment, tracks bound physical storage locations, unbound physical storage locations, reserved physical storage capacity, unreserved physical storage capacity, and the like. The physical capacity allocation module 504 may track these parameters using a logical-to-physical map, a validity map, a free physical address pool, used physical address pool, a physical-to-logical map, or other means known to one of skill in the art.

The reply may take many forms. In one embodiment where the physical capacity request includes a request for available physical capacity, the reply may include an amount of available physical storage capacity. In another embodiment where the physical capacity request includes a specific amount of physical capacity, the reply may include an acknowledgement that the data storage device has the requested available physical storage capacity. One of skill in the art will recognize other forms of a reply in response to a physical capacity request.

The apparatus 500 with a physical capacity request module 502, a physical capacity allocation module 504, and a physical capacity reply module 506 is advantageous for storage devices 106 where a logical-to-physical mapping is not a one-to-one mapping. In a typical random access device where read and write requests include one or more LBAs, a file server 114/file system may track physical storage capacity of the storage device 106 by knowing LBAs that are bound to physical storage locations.

For a log structured file system or similar system where multiple physical addresses (and thus storage locations) can be mapped to a single logical identifier (i.e. multiple versions of data mapped to a logical identifier) tracking logical identifiers may not provide any indication of physical storage capacity. This many to one relationship between storage location and LID may be used to support snap shotting and/or backup. The apparatus 500 keeps track of available physical storage space and can communicate the amount of available physical storage space to the server 108 or other device. The apparatus 500 is advantageous because it allows file servers 114/file systems to query physical storage capacity. Offloading allocation management and physical capacity management to the data storage device is efficient for storage devices 106 that may store data sequentially, log structured storage devices, etc.

In some embodiments, physical storage locations are bound to corresponding LIDs. When data is stored in response to a write request, LIDs associated with the data are bound to the physical storage location where the data is stored. For a log-structured file system where data is stored sequentially, the location where the data is stored is not apparent from the logical identifier, even if the logical identifier is an LBA. Instead, the data is stored at an append point and the address where the data is stored is mapped to the logical identifier. If the data is a modification of data stored previously, the LID may be mapped to the current data as well as to a location where the old data is stored. There may be several versions of the data mapped to the same LID.

The apparatus 500, in one embodiment, includes an allocation module 508 that allocates the unallocated logical space sufficient to satisfy the allocation request of the requesting device. The allocation module 508 may allocate the unallocated logical space in response to the logical capacity module 404 determining that the logical space has sufficient unallocated logical space to satisfy the allocation request.

In one embodiment, the allocation request is part of a pre-allocation where logical space is not associated with a specific request to store data. For example, a client 110 may request, using an allocation request, logical space and then may proceed to store data over time to the allocated logical space. The allocation module 508 allocates LIDs to the client 110 in response to an allocation request and to the logical capacity module 404 determining that the logical space has sufficient unallocated logical space to satisfy the allocation request.

In various embodiments, the allocation module 508 may allocate a subset of a logical space, may allocate logical space based on an allocation request that includes certain criteria for the requested logical space, etc. For example, if an allocation request includes a request to allocate LIDs to a user, the LIDs may have already been allocated to a client 110 and may also be part of a subset allocated to the user, such as LIDs allocated to a group associated with the client 110. The allocation module 508 may associate the LIDs identified in an allocation request with the client 110 and the group.

The allocation module 508 may also allocate LIDs based on an allocation request associated with a specific storage request. For example, if a storage request includes specific LIDs and the logical capacity module 404 determines that the LIDs are available, the allocation module 508 may allocate the LIDs in conjunction with storing the data of the storage request. In another example, if the storage request does not include LIDs and the logical capacity module 404 determines that there are sufficient LIDs to for the storage request, the allocation module 508 may select and allocate LIDs for the data and the allocation reply module 406 may communicate the allocated LIDs.

The allocation module 508 typically locates unallocated LIDs for allocation. There are several ways in which the allocation module 508 may identify one or more unallocated LIDs. For example, the allocation module 508 may identify unallocated LIDs by receiving a list of requested LIDs to allocate from the client 110 and verify that these LIDs are available for allocation. In another example, the allocation module 508 may identify unallocated LIDs by searching for unallocated LIDs that meet criteria received in conjunction with the request. The criteria may be LIDs that are associated with a particular storage device 106, that are available in a RAID, that have some assigned metadata characteristic, etc.

In another example, the allocation module 508 may identify unallocated LIDs by creating a subset of LIDs that meet criteria received in conjunction with the request identified in a pool of available LIDs. In one instance, the LIDs may be a subset of LIDs that have already been allocated to the client 110. For example, if a set or group of LIDs is allocated to a particular user, group, employer, etc., a subset of the LIDs may be allocated. A specific example is if a set of LIDs is allocated to an organization and then a subset of the allocated LIDs is further allocated to a particular user in the organization. One of skill in the art will recognize other ways that the allocation module 508 can identify one or more unallocated LIDs.

The allocation module 508, in one embodiment, can expand the LIDs allocated to a client 110 by allocating LIDs to the client 110 in addition to LIDs already allocated to the client 110. In addition, LIDs allocated to a client 110 may be decreased by deallocating certain LIDs so that they return to a pool of unallocated LIDs. In other embodiments, subsets of allocated LIDs may be allocated, deallocated, increased, decreased, etc. For example, LIDs allocated to a user in an organization may be deallocated so that the LIDs allocate to the user are still allocated to the organization but not to the user.

The apparatus 500, in one embodiment, includes an allocation query request module 510, an allocation query determination module 512, an allocation query reply module 514. The allocation query request module 510 receives an allocation query the data storage device. The allocation query request module 510 receives an allocation query from some requesting device, such as a client 110, a file server 114/file system, a master allocation manager 124, etc. An allocation query may include a request for information about allocating logical space or associated management of the allocated logical space. For example, an allocation query may be a request to identify allocated LIDs, identify bound LIDs, identify allocated LIDs that are not bound to physical storage locations, unallocated LIDs or a range of LIDs, and the like.

The allocation query may include information about logical allocation, logical capacity, physical capacity, or other information meeting criteria in the allocation query. The information may include metadata, status, logical associations, historical usage, flags, control, etc. One of skill in the art will recognize other allocation queries and the type of information returned in response to the allocation query.

The allocation query includes some type of criteria that allows the allocation query determination module 512 to service the allocation request. The allocation query determination module 512, in one embodiment, identifies one or more LIDs that meet the criteria specified in the allocation query. The identified LIDs include allocated LIDs that are bound to physical storage locations, allocated LIDs that are unbound, unallocated LIDs, and the like.

The allocation query reply module 514 communicates to the client 110 the results of the query to the requesting device or to another device as directed in the allocation query. The results of the allocation query may include a list of the identified LIDs, an acknowledgement that LIDs meeting the criteria were found, an acknowledgement that LIDs meeting the criteria in the allocation query were not found, bound/unbound status of LIDs, logical storage capacity, or the like. Typically the allocation query reply module 514 returns status information and the information returned may include any information related to managing and allocating LIDs known to those of skill in the art.

The apparatus 500, in another embodiment, includes a logical space management module 516 that manages the logical space of the data storage device from within the data storage device. For example, the logical space management module 516 may manage the logical space from a storage controller 104 or driver 118 associated with a storage device 106 of the data storage device. The logical space management module 516 may track unbound LIDs and bound LIDs, for example, in the logical-to-physical map, in an index, or other data structure. As discussed above, a bound LID refers to a LID corresponding to data. As discussed above, a bound LID is a LID associated with valid data stored on a physical storage location of the storage device 106.

The logical space management module 516, in various embodiments, may service allocation requests and allocation queries as described above, and other functions related to allocation. The logical space management module 516 can also include receiving a deallocation request from a requesting device. The deallocation request typically includes a request to return one or more allocated LIDs to an unallocated state and then communicating to the requesting device, or other designated device, the successful deallocation. The deallocation request may include a request to return one or more storage locations which keeping the associated LIDS allocated then communicating to the requesting device, or other designated device, the successful deallocation. This might be transparent, or require that the deallocation request be extended to include an indication that a logical/physical deallocation should accompany the request. Note that deallocation request may be asynchonous and tied to the groomer. Thus, the deallocation request may is virtual (in time) until completed. The management of the allocations (logical and physical) may diverge from the actual available space at any point in time. The management module 516 is configured deal with these differences.

The logical space management module 516 may also receive a LID group command request from a requesting device and may communicate to the requesting device a reply indicating a response to the LID group command request. The LID group command request may include an action to take on, for example, two or more LIDs ("LID group"), metadata associated with the LID group, the data associated with the LID group, and the like. For example, if several users are each allocated LIDs and the users are part of a group, a LID group command may be to deallocate the LIDs for several of the users, allocate additional LIDs to each user, return usage information for each user, etc. The action taken in response to the LID group command may also include modifying the metadata, backing up the data, backing up the metadata, changing control parameters, changing access parameters, deleting data, copying the data, encrypting the data, deduplicating the data, compressing the data, decompressing the data, etc. One of skill in the art will recognize other logical space management functions that the logical space management module 516 may also perform.

The apparatus 500, in one embodiment, includes a mapping module 518 that binds, in a logical-to-physical map, bound LIDs to physical storage locations. The logical capacity module 404 determines if the logical space has sufficient unallocated logical space using the logical-to-physical map mapped by the mapping module 518. The logical-to-physical map may be used to track allocation of the bound LIDs, the unbound LIDs, the allocated LIDs, the unallocated LIDs, the allocated LID capacity, the unallocated LID capacity, and the like. In one embodiment, the mapping module 518 binds LIDs to corresponding physical storage locations addresses in multiple maps.

For example, a forward map may be used to quickly identify the physical storage location for a given bound LID. The forward map may include a B-tree, a content addressable memory ("CAM"), a binary tree, a hash table, etc. or other data structure that facilitates quickly searching a sparsely populated space or range. By using a forward map that quickly searches a sparsely populated virtual or logical namespace, the mapping module 518 provides an efficient way to determine one or more physical addresses from a logical identifier.

In addition, a reverse map may be used to quickly access information related to a physical address and to link to a logical identifier associated with the physical address. The reverse map may be used to identify a LID from a physical address. A reverse map may be used to map addresses in a data storage device 106 into erase regions, such as erase blocks, such that a portion of the reverse map spans an erase region of the data storage device 106 erased together during a storage space recovery operation. Organizing a reverse map by erase regions facilitates tracking information useful during a storage recovery operation. For example, the reverse map may include which physical addresses in an erase region have valid data and which have invalid data. When valid data is copied from an erase region and the erase region erased, the reverse map can easily be changed to indicate that the erase region does not include data and is ready for sequential storage of data.

A more detailed discussion of forward and reverse mapping is included in U.S. patent application Ser. No. 12/098,434, titled Apparatus, System, and Method for Efficient Mapping of Virtual and Physical Addresses, Non-Volatile Storage, to David Flynn, et al., and filed Apr. 8, 2008, which is incorporated herein by reference. By including powerful mapping of LIDs and corresponding physical addresses in the storage system 102, and even in a storage device 106, the mapping efficiently consolidates functions such as thin provisioning, allocation functions, etc. that have traditionally been done at higher levels. The mapping module 518 provides an efficient way to eliminate layers of mapping used in traditional systems.

In a thinly provisioned storage system, one potential problem is that a file server/file system or client may attempt to write data to a storage device only to have the write request fail because the storage device is out of available disk space. For random access devices where the file server/file system tracks available physical storage capacity relying on the one-to-one mapping of LBAs to PBAs, the likelihood of a storage device running out of storage space is very low. The file server/file system may, however, think that the storage device is a random access if the storage device is in fact a thinly provisioned system, a log structured file system, etc. For such a situation, it is desirable to reserve physical space prior to or in conjunction with a write request so that the write request does not fail. There are other situations as well where a file server/file system or client may wish to reserve physical storage space.

The apparatus 500 includes a physical space reservation request module 520, located in the storage system 102, that receives a request from a client 110 or file server 114/file system to reserve available physical storage capacity on the data storage device (i.e. the storage device 106 that is part of the data storage device) [hereinafter a "physical space reservation request"]. In one embodiment, the physical space reservation request includes an indication of an amount of physical storage capacity requested by the client 110 or file server 114/file system.

The indication of an amount of physical storage capacity requested may be expressed in terms of physical capacity of the storage device 106 or other direct measure of capacity of the storage device 106. The request to reserve physical storage capacity may also include a request to allocate the reserved physical storage capacity to a logical entity. The indication of an amount of physical storage capacity may be expressed indirectly as well. For example, a file server 114/file system may indicate a number of logical blocks and the data storage device may determine a particular fixed size for each logical block and then translate the number of logical blocks to a physical storage capacity. One of skill in the art will recognize other indicators of an amount of physical storage capacity in a physical space reservation request.

The physical space reservation request, in one embodiment, is associated with a write request. In one embodiment, the write request is a two-step process and the physical space reservation request and the write request are separate. In another embodiment, the physical space reservation request is part of the write request or the write request is recognized as having an implicit physical space reservation request. In another embodiment, the physical space reservation request is not associated with a specific write request, but may instead be associated with planned storage, reserving storage space for a critical operation, etc. where mere allocation of storage space is insufficient.

In certain embodiments, the data may be organized into atomic data units. For example, the atomic data unit may be a packet, a page, a logical page, a logical packet, a block, a logical block, a set of data associated with one or more logical block addresses (the logical block addresses may be contiguous or noncontiguous), a file, a document, or other grouping of related data.

In one embodiment, an atomic data unit is associated with a plurality of noncontiguous and/or out of order logical block addresses or other identifiers that the write data pipeline handles as a single atomic data unit. As used herein, writing noncontiguous and/or out of order logical blocks in a single write operation is referred to as an atomic write. In one embodiment, a hardware controller processes operations in the order received and a software driver of the client sends the operations to the hardware controller for a single atomic write together so that the write data pipeline can process the atomic write operation as normal. Because the hardware processes operations in order, this guarantees that the different logical block addresses or other identifiers for a given atomic write travel through the write data pipeline together to the nonvolatile memory. The client, in one embodiment, can back out, reprocess, or otherwise handle failed atomic writes and/or other failed or terminated operations upon recovery once power has been restored.

In one embodiment, apparatus 500 may mark blocks of an atomic write with a metadata flag indicating whether a particular block is part of an atomic write. One example metadata marking is to rely on the log write/append only protocol of the nonvolatile memory together with a metadata flag, or the like. The use of an append only log for storing data and prevention of any interleaving blocks enables the atomic write membership metadata to be a single bit. In one embodiment, the flag bit may be a 0, unless the block is a member of an atomic write, and then the bit may be a 1, or vice versa. If the block is a member of an atomic write and is the last block of the atomic write, in one embodiment, the metadata flag may be a 0 to indicate that the block is the last block of the atomic write. In another embodiment, different hardware commands may be sent to mark different headers for an atomic write, such as first block in an atomic write, middle member blocks of an atomic write, tail of an atomic write, or the like.

On recovery from a power loss or other failure of the client or of the storage device, in one embodiment, the apparatus 500 scans the log on the nonvolatile memory in a deterministic direction (for example, in one embodiment the start of the log is the tail and the end of the log is the head and data is always added at the head). In one embodiment, the power management apparatus scans from the head of the log toward the tail of the log. For atomic write recovery, in one embodiment, when scanning head to tail, if the metadata flag bit is a 0, then the block is either a single block atomic write or a non-atomic write block. In one embodiment, once the metadata flag bit changes from 0 to 1, the previous block scanned and potentially the current block scanned are members of an atomic write. The power management apparatus, in one embodiment, continues scanning the log until the metadata flag changes back to a 0, at that point in the log, the previous block scanned is the last member of the atomic write and the first block stored for the atomic write.

In one embodiment, the nonvolatile memory uses a log-based, append only write structured writing system where new writes go on the front of the log (i.e. at the head of the log). In a further embodiment, the storage controller reclaims deleted, stale, and/or invalid blocks of the log using a garbage collection system, a groomer, a cleaner agent, or the like. The storage controller, in a further embodiment, uses a forward map to map logical block addresses to physical addresses to facilitate use of the append only write structure and garbage collection.

The apparatus 500, in one embodiment, includes a physical space reservation module 522 that determines if the data storage device (i.e. storage device 106) has an amount of available physical storage capacity to satisfy the physical storage space request. If the physical space reservation module 522 determines that the amount of available physical storage capacity is adequate to satisfy the physical space reservation request, the physical space reservation module 522 reserves an amount of available physical storage capacity on the storage device 106 to satisfy the physical storage space request. The amount of available physical storage capacity reserved to satisfy the physical storage space request is the reserved physical capacity.

The amount of reserved physical capacity may or may not be equal to the amount of storage space requested in the physical space reservation request. For example, the storage system 102 may need to store additional information with data written to a storage device 106, such as metadata, index information, error correcting code, etc. In addition, the storage system 102 may encrypt data, which may affect storage size. The storage system 102 may also compress data, which may reduce the amount of physical storage capacity required to satisfy the requested amount in the physical space reservation request.

In one embodiment, the physical space reservation request includes an amount of logical space and the indication of an amount of physical storage capacity requested is derived from the requested logical space. In another embodiment, the physical space reservation request includes one or more LIDs and the indication of an amount of physical storage capacity requested is derived from an amount of data associated with the LIDs. In one example, the data associated with the LIDs is data that has been bound to the LIDs, such as in a write request. In another example, the data associated with the LIDs is a data capacity allocated to each LID, such as would be the case if a LID is an LBA and a logical block size could be used to derive the amount of requested physical storage capacity.

In another embodiment, the physical space reservation request is a request to store data. In this embodiment the physical space reservation request may be implied and the indication of an amount of physical storage capacity requested may be derived from the data and/or metadata associated with the data. In another embodiment, the physical space reservation request is associated with a request to store data. In this embodiment, the indication of an amount of physical storage capacity requested is indicated in the physical space reservation request and may be correlated to the data of the request to store data.

The physical space reservation module 522 may also then factor metadata, compression, encryption, etc. to determine an amount of required physical capacity to satisfy the physical space reservation request. The amount of physical capacity required to satisfy the physical space reservation request may be equal to, larger, or smaller than an amount indicated in the physical space reservation request.

Once the physical space reservation module 522 determines an amount of physical capacity required to satisfy the physical space reservation request, the physical space reservation module 522 determines if one or more storage devices 106a-n in the storage system 102, either individually or combined, have enough available physical storage capacity to satisfy the physical space reservation request. The request may be for space on a particular storage device (e.g. 106a), a combination of storage devices 106, such as would be the case if some of the storage devices 106 are in a RAID, or for available space generally in the storage system 102. The physical space reservation module 522 may tailor a determination of available capacity to specifics of the physical space reservation request.

Where the physical space reservation request is for space on more than one storage device, the physical space reservation module 522 will typically retrieve available physical storage capacity information from each logical-to-physical map of each storage device 106 or a combined logical-to-physical map of a group of storage devices 106. The physical space reservation module 522 typically surveys bound physical addresses. Note that the physical space reservation module 522 may not have enough information to determine available physical capacity by looking at bound LIDs, because there is typically not a one-to-one relationship between LIDs and physical storage locations.

The physical space reservation module 522 reserves physical storage capacity, in one embodiment, by maintaining enough available storage capacity to satisfy the amount of requested capacity in the physical space reservation request. Typically, in a log structured file system or other sequential storage device, the physical space reservation module 522 would not reserve a specific physical region or physical address range in the storage device 106, but would instead reserve physical storage capacity.

For example, a storage device 106 may have 500 gigabytes ("GB") of available physical storage capacity. The storage device 106 may be receiving data and storing the data at one or more append points, thus reducing the storage capacity. Meanwhile, a garbage collection or storage space recovery operation may be running in the background that would return recovered erase blocks to storage pool, thus increasing storage space. The locations where data is stored and freed are constantly changing so the physical space reservation module 522, in one embodiment, monitors storage capacity without reserving fixed physical storage locations.

The physical space reservation module 522 may reserve storage space in a number of ways. For example, the physical space reservation module 522 may halt storage of new data if the available physical storage capacity on the storage device 106 decreased to the reserved storage capacity, may send an alert if the physical storage capacity on the storage device 106 was reduced to some level above the reserved physical storage capacity, or some other action or combination of actions that would preserve an available storage capacity above the reserved physical storage capacity.

In another embodiment, the physical space reservation module 522 reserves a physical region, range of physical addresses, etc. on the data storage device. For example, if the physical space reservation module 522 reserved a certain quantity of erase blocks, data associated with the physical space reservation request may be stored in the reserved region or address range. The data may be stored sequentially in the reserved storage region or range. For example, it may be desirable to store certain data at a particular location. One of skill in the art will recognize reasons to reserve a particular region, address range, etc. in response to a physical space reservation request.

In one embodiment, the apparatus 500 includes a physical space reservation return module 524 that transmits to the client 110 or file server 114/file system an indication of availability or unavailability of the requested amount of physical storage capacity in response to the physical space reservation module 522 determining if the data storage device has an amount of available physical storage space that satisfies the physical space reservation request. For example, if the physical space reservation module 522 determines that the available storage space is adequate to satisfy the physical space reservation request, the physical space reservation return module 524 may transmit a notice that the physical space reservation module 522 has reserved the requested storage capacity or other appropriate notice.

If, on the other hand, the physical space reservation module 522 determines that the storage device 106 or storage system 102 does not have enough available physical storage capacity to satisfy the physical space reservation request, the physical space reservation return module 524 may transmit a failure notification or other indicator that the requested physical storage space was not reserved. The indication of availability or unavailability of the requested storage space, for example, may be used prior to writing data to reduce a likelihood of failure of a write operation.

The apparatus 500, in another embodiment, includes a physical space reservation cancellation module 526 that cancels all or a portion of reserved physical storage space in response to a cancellation triggering event. The cancellation triggering event may come in many different forms. For example, the cancellation triggering event may include determining that data to be written to the storage device 106 or storage system 102 and associated with available space reserved by the physical space reservation module 522 has been previously stored in the storage system 102.

For example, if a deduplication process determines that the data already exists in the storage system 102, the data may not need to be stored again since the previously stored data could be mapped to two or more LIDs. In a more basic example, if reserved physical storage space is associated with a write request and the write request is executed, the cancellation triggering event could be completion of storing data of the write request. In this example, the physical space reservation cancellation module 526 may reduce or cancel the reserved physical storage capacity.

If the data written is less than the reserved space, the physical space reservation cancellation module 526 may merely reduce the reserved amount, or may completely cancel the reserved physical storage capacity associated with the write request. Writing to less than the reserved physical space may be due to writing a portion of a data unit where the data unit is the basis of the request, where data associated with a physical space reservation request is written incrementally, etc. In one embodiment, physical storage space is reserved by the physical storage space reservation module 522 to match a request and then due to compression or similar procedure, the storage space of the data stored is less than the associated reserved physical storage capacity.

In another embodiment, the cancellation triggering event is a timeout. For example, if a physical space reservation request is associated with a write request and the physical space reservation module 522 reserves physical storage capacity, if the data associated with the write request is not written before the expiration of a certain amount of time the physical space reservation cancellation module 526 may cancel the reservation of physical storage space. One of skill in the art will recognize other reasons to cancel all or a portion of reserved physical capacity.

The physical space reservation module 522, in one embodiment, may increase or otherwise change the amount of reserved physical storage capacity. For example, the physical space reservation request module 520 may receive another physical space reservation request, which may or may not be associated with another physical space reservation request. Where the physical space reservation request is associated with previously reserved physical storage capacity, the physical space reservation module 522 may increase the reserved physical storage capacity. Where the physical space reservation request is not associated with previously reserved physical storage capacity, the physical space reservation module 522 may separately reserve physical storage capacity and track the additional storage capacity separately. One of skill in the art will recognize other ways to request and reserve available physical storage capacity and to change or cancel reserved capacity. Standard management should include some kind of thresholds, triggers, alarms and the like for managing the physical storage capacity, providing indicators to the user that action needs to be taken. Typically, this would be done in the management system. But, either the management system would have to pool the devices under management or said devices would have to be configured/programmed to interrupt the manger when a criteria was met (preferred).

The apparatus 500, in another embodiment, includes a LID binding module 528 that, in response to a request from a client 110 or file server 114/file system to write data, binds one or more unbound LIDs to physical storage locations comprising the data and transmits the LIDs to the client 110 or file server 114/file system. The LID assignment module 528, in one embodiment, allows on-the-fly allocation and binding of LIDs. The request to write data, in another embodiment, may be a two step process. The LID binding module 528 may allocate LIDs in a first step for data to be written and then in a second step the data may be written along with the allocated LIDs.

In one embodiment, the LID allocation module 402 allocates LIDs in a contiguous range. The LID binding module 528 may also allocate LIDs in a consecutive range. Where a logical space is large, the LID allocation module 402 may not need to fragment allocated LIDs but may be able to choose a range of LIDs that are consecutive. In another embodiment, the LID allocation module 402 binds LIDs that may not be contiguous and may use logical spaces that are interspersed with other allocated logical spaces.

The apparatus 500, in another embodiment, includes a DMA module 530 that pulls data from a client 110 in a direct memory access ("DMA") and/or a remote DMA ("RDMA") operation. The data is first identified in a request to store data, such as a write request, and then the storage controller 104 executes a DMA and/or RDMA to pull data from the client 110 to a storage device 106 in the storage system 102. In another embodiment, the write request does not use a DMA or RDMA, but instead the write request includes the data. Again the physical storage locations of the data are bound to the corresponding LIDs.

In one embodiment, the apparatus 500 includes a deletion module 532. In response to a request to delete data from the data storage device, in one embodiment, the deletion module 532 removes the mapping between storage space where the deleted data was stored and the corresponding LID. The deletion module 532 may also unbind the one or more physical storage locations of the deleted data and also may deallocate the one or more logical addresses associated with the deleted data.

Figure 6:
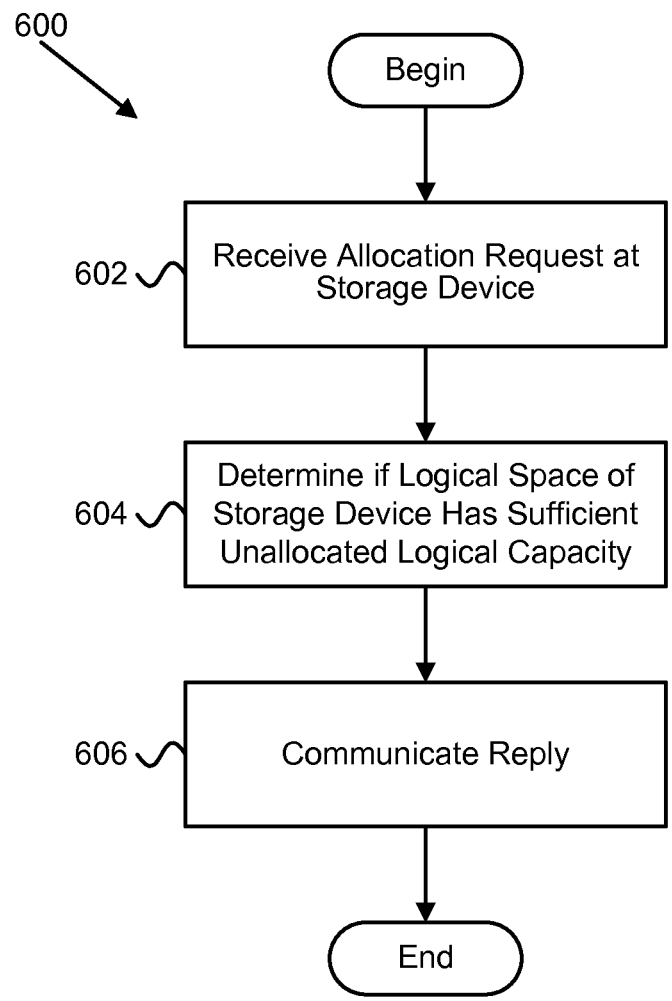
FIG. 6 is a schematic flow diagram illustrating one embodiment of a method for allocating data storage space in accordance with the present invention.

FIG. 6 is a schematic flow chart diagram illustrating one embodiment of a method 600 for allocating data storage space in accordance with the present invention. The method 600 begins and the allocation request module 402 receives 602 from a requesting device, such as a client 110, file server 114/file system, master allocation manager 124, etc., an allocation request to allocate logical capacity. The allocation request is received at a data storage device. Logical capacity is for storing data on the data storage device.

The logical capacity module 404 determines 604 if a logical space of the data storage device includes sufficient unallocated logical space to satisfy the allocation request where the determination includes a search of a logical-to-physical map. The logical-to-physical map includes bindings between LIDs of the logical space and corresponding physical storage locations comprising data of the bound LIDs, wherein a bound LID differs from the one or more physical storage locations addresses bound to the LID. The allocation reply module 406 communicates 606 a reply to the requesting device and the method 600 ends.

Figure 7:
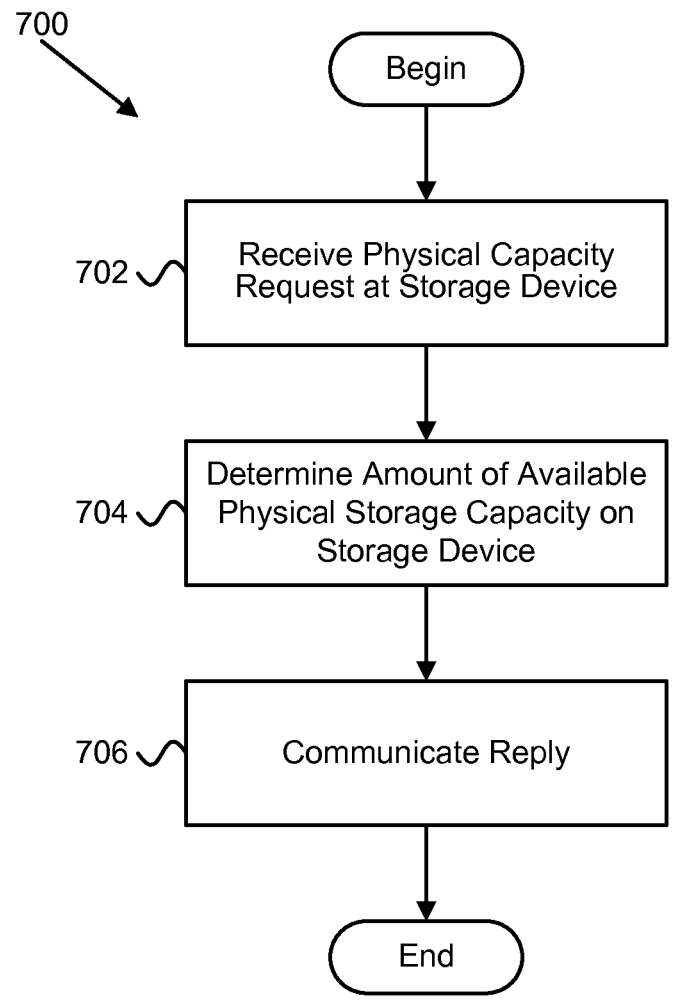
FIG. 7 is a flow diagram illustrating an embodiment of a method for servicing a physical capacity request at a storage device in accordance with the present invention.

FIG. 7 is a schematic flow chart diagram illustrating one embodiment of a method 700 for allocating data storage space in accordance with the present invention. The method 700 begins and the physical capacity request module 502 receives 702 from a requesting device a physical capacity request. The physical capacity request is received at the data storage device. The physical capacity request includes a request of an amount of available physical storage capacity in the data storage device. The physical capacity request, for example, may be a specific amount of physical capacity, may be derived from a request to store data, etc.

The physical capacity allocation module 504 determines 704 the amount of available physical storage capacity on the data storage device where the amount of available physical storage capacity includes a physical storage capacity of unbound storage locations in the data storage device. The physical capacity reply module 506 communicates 706 a reply to the requesting device in response to the physical capacity allocation module 504 determining the amount of available physical storage capacity on the data storage device, and the method 700 ends.

Figure 8:
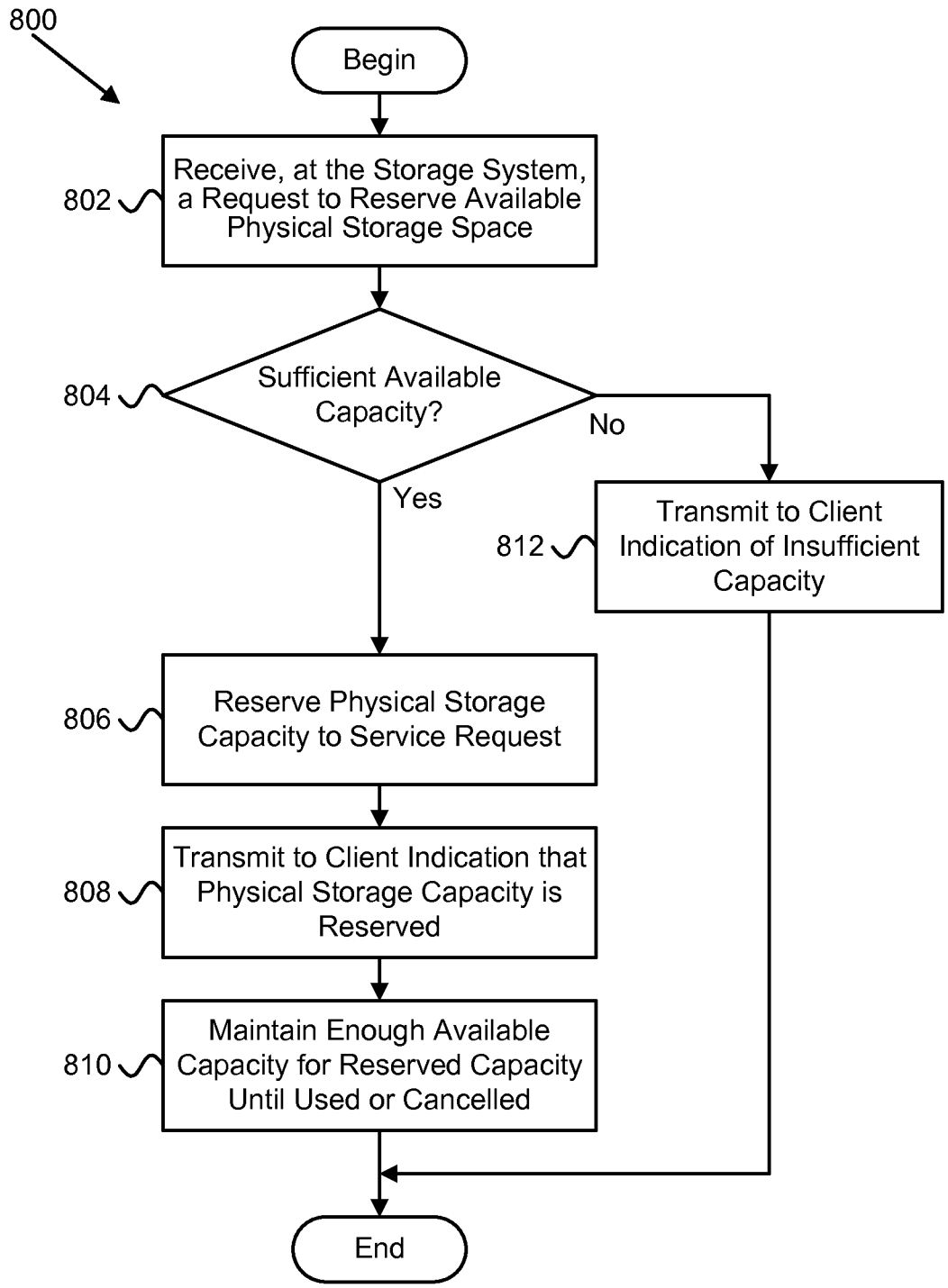
FIG. 8 is a flow diagram illustrating one embodiment of a method for reserving physical storage space in accordance with the present invention.

FIG. 8 is a schematic flow chart diagram illustrating one embodiment of a method 800 for reserving physical storage space in accordance with the present invention. The method 800 begins and the physical space reservation request module 520 receives 802 a physical space reservation request to reserve available physical storage space. The physical space reservation request includes an indication of an amount of physical storage capacity requested. The indication of an amount of physical storage capacity could take many forms, such as a number of bytes or a number of logical blocks, a request to store specific data, or other indirect indication where the indication of an amount of physical storage is derived from the request.

The physical space reservation module 522 determines 804 if the data storage device has available physical storage capacity to satisfy the physical storage space request. If the physical space reservation module 522 determines 804 that the data storage device has available physical storage capacity to satisfy the physical storage space request, the physical space reservation module 522 reserves 806 physical storage capacity adequate to service the physical space reservation request and the physical space reservation return module 524 transmits 808 to the requesting client 110 or file server 114/file system an indication that the requested physical storage space is reserved.

The physical allocation module 404 maintains 810 enough available physical storage capacity to maintain the reservation of physical storage capacity until the reservation is used by storing data associated with the reservation or until the reservation is cancelled, and the method 800 ends. If the physical space reservation module 522 determines 804 that the data storage device does not have available physical storage capacity to satisfy the physical storage space request, the physical space reservation return module 524 transmits 812 to the requesting client 110 or file server 114/file system an indication that the requested physical storage space is not reserved or an indication of insufficient capacity, and the method 800 ends.

Figure 9:
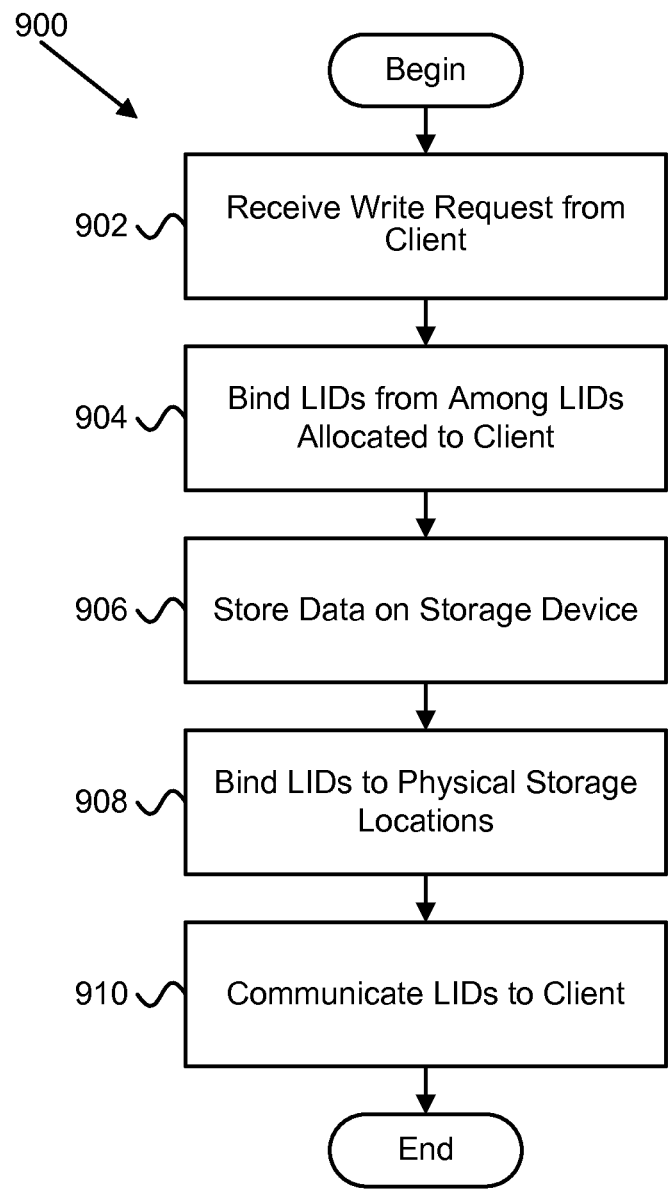
FIG. 9 is a flow chart diagram illustrating one embodiment of a method for binding allocated logical identifiers to physical storage locations.

FIG. 9 is a schematic flow chart diagram illustrating one embodiment of a method 900 for binding logical identifiers to physical storage locations. The method 900 begins and the LID binding module 528 receives 901 a write request from a client 110. In other embodiments, the request originates in a file server 114/file system or other component in the system 100, 101, 103. The write request is a request to write data to one or more storage devices 106 in the storage system 102 where the data has not been associated with any logical identifiers or logical identifiers have not been allocated for the data. The request may be received by the storage system 102 and the storage controller 104 or other component may recognize that LIDs have not been allocated for the data in the write request and the request is forwarded to the LID binding module 528.

The LID binding module 528 binds 904 one or more unbound LIDs to the data. The storage controller 104 stores the data on the storage device 106 and the mapping module 518 maps 908 one or more physical storage locations addresses where the data was stored to the corresponding LIDs. Where data is stored sequentially on the storage device 106, physical storage locations where the data is stored are typically not known prior to the write request but are determined after or just prior to storing the data. The LID binding module 528 communicates 910 the bound LIDs to the client 110, and the method 900 ends. The communication could be part of a confirmation that the data is stored successfully.

Figure 10:
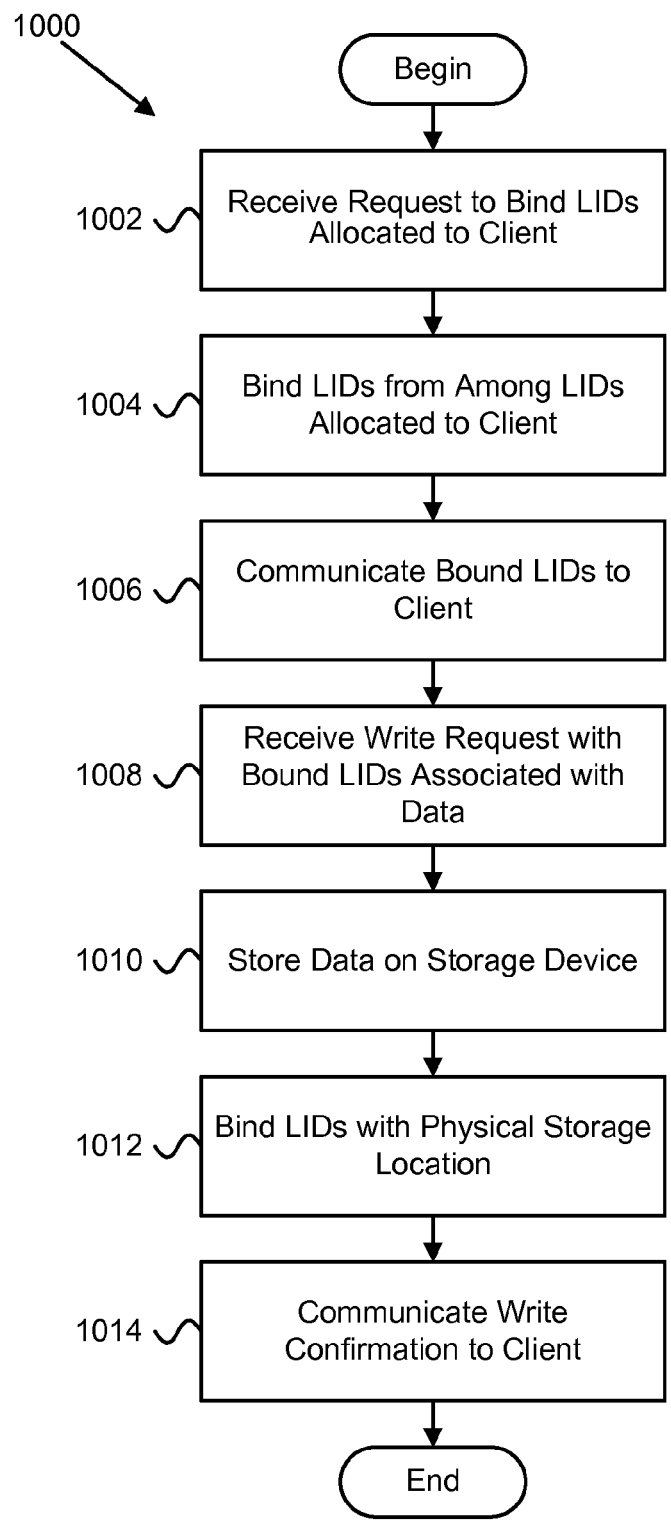
FIG. 10 is a flow diagram illustrating another embodiment of a method for binding allocated logical identifiers to physical storage locations.

FIG. 10 is a schematic flow chart diagram illustrating another embodiment of a method 1000 for binding allocated logical identifiers in data storage device 106 in accordance with the present invention. The method 1000 begins and the LID binding module 528 receives 1002 a request to bind LIDs to data where the LIDs are allocated to the client 110 making the request. In another embodiment, the request comes from a file server 114/file system or other device in the system 100, 101, 103. The LID binding module 528 binds 1004 LIDs to physical storage locations comprising the data. The LID binding module 528 communicates 1006 the bound LIDs to the client 110.

The storage system 102 receives 1006 a write request to write data to a storage device 106 in the storage system 102 where the data is already associated with bound LIDs. In other embodiments, the write request is to store the data on more than one storage device 106 in the storage system 103, such as would be the case if the storage devices 106 are RAIDed or if the data is written to a primary storage device 106 and to a mirror storage device 106. The storage controller 104 stores 1010 the data on the storage device 106 and the mapping module 518 maps 1012 one or more physical storage locations where the data is stored to the bound LIDs (e.g., updates the binding between the LIDs and physical storage locations). The storage controller 104 or other component in the storage system 102 communicates 1014 a write confirmation to the requesting client 110 and the method 1000 ends.

Figure 11:
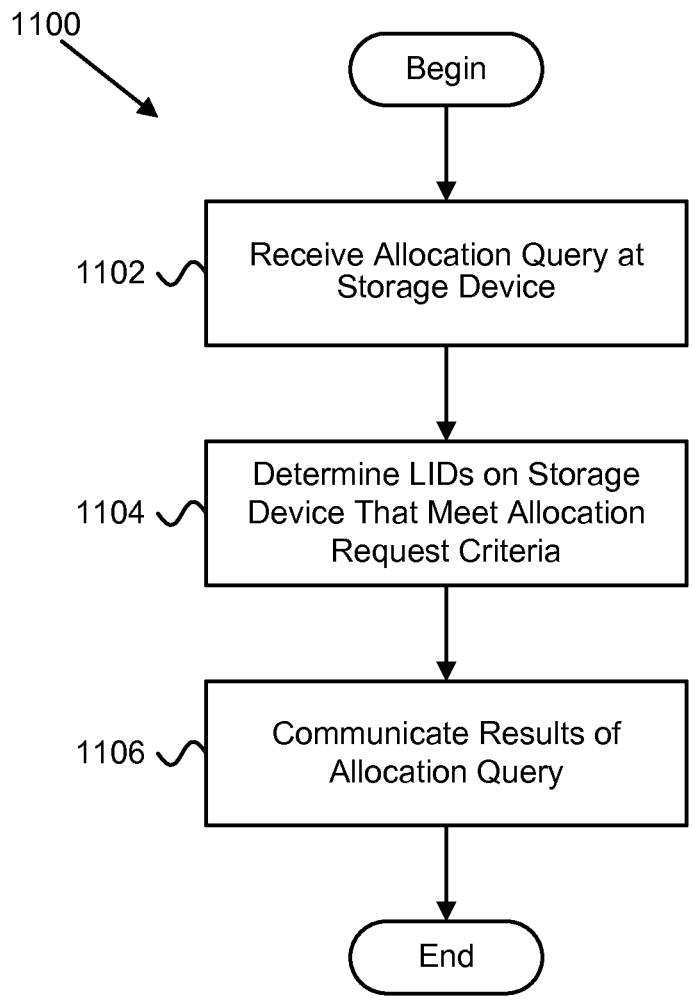
FIG. 11 is a flow diagram illustrating an embodiment of a method for servicing an allocation query at a storage device in accordance with the present invention.

FIG. 11 is a schematic flow chart diagram illustrating an embodiment of a method 1100 for servicing an allocation query at a storage device in accordance with the present invention. The allocation query request module 510 receives 1102 an allocation query at the data storage device. The allocation query determination module 512 identifies 1104 one or more LIDs that meet a criteria specified in the allocation query. The identified LIDs include allocated LIDs that are bound, allocated LIDs that are unbound, and/or unallocated LIDs. The allocation query reply module 514 communicates 1106 the results of the allocation query to a requesting device or other designated device and the method 1100 ends. The results may include a list of the identified LIDs, an acknowledgement that LIDs meeting the criteria were found, an acknowledgement that LIDs meeting the criteria in the allocation query were not found, etc.

Figure 12:
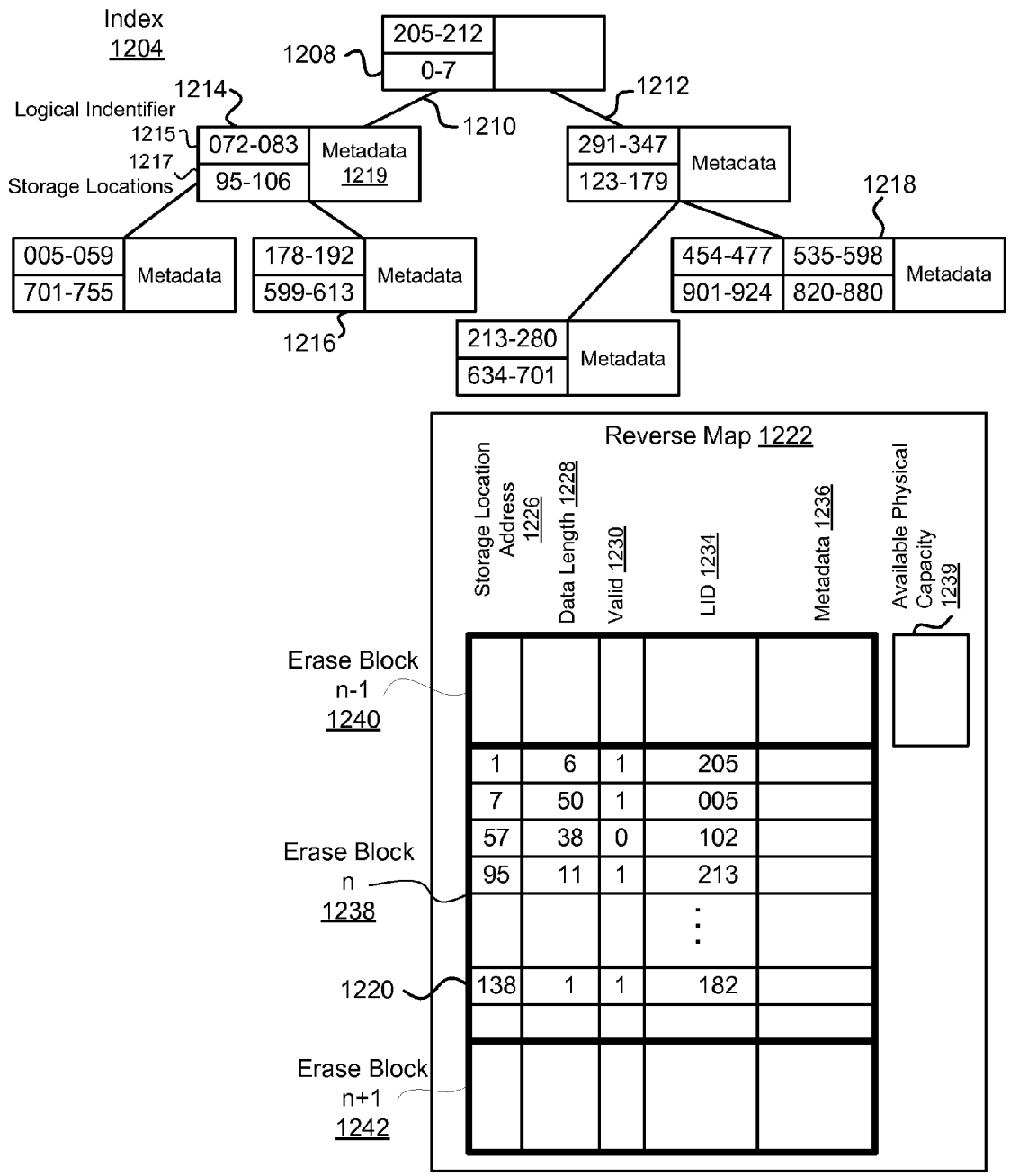
FIG. 12 is a schematic diagram of exemplary embodiments of indexes to associate logical identifiers with storage locations of a non-volatile storage device.

FIG. 12 is a schematic block diagram of exemplary datastructures for associating LIDs with storage locations on a non-volatile storage device (e.g., storage device 106). An index 1204 may comprise a tree (or other data structure) comprising a plurality of storage entries (e.g., entries 1208, 1214, 1216, and so on). Each storage entry in the index 1204 may associate a LID (or LID range or set) with one or more storage locations of the non-volatile storage device 106. The storage locations may be identified and/or indexed by LID 1217 (e.g., as depicted in entry 1214), a LID range, set, or the like. The storage entries in the index 1204 may be of variable size or length, such that a single storage entry (e.g., entry 1214) may reference a set of LIDs, a LID range, or the like. The LIDs of a storage entry may be contiguous (e.g. 072-083). Other entries, such as 1218, may comprise a discontinuous set of LIDs (e.g., LID 454-477 and 535-598). Accordingly, the index 1204 may be used to represent variable sized storage entries (e.g., storage entries corresponding to one or more storage locations of the non-volatile storage device 106 comprising data of an arbitrary set or range of LIDs).

As shown in FIG. 12, the storage entries may be indexed by LID (using edges, such as edge 1210), which may enable fast and efficient storage entry lookups. A exemplary search for a storage entry comprising the LID "182" may proceed as follows. The search may initiate at a root storage entry, which, in the FIG. 12 example, is storage entry 1208. Where a single LID (or address range) is included at a particular storage entry, such as the root storage entry 1208, if a LID being searched ("182") is lower than the LID of the storage entry 1208, the search may continue down a directed edge 1210 to the left of the storage entry 1208. If the searched LID ("182") matches the current storage entry 1208 (e.g., is located within the range of the storage entry 1208), the search successfully terminates with the current storage entry 1208 being identified. If the searched LID 1206 is greater than the range of the current entry 1208, the search continues down directed edge 1212 to the right of the current storage entry 1208. Where an storage entry includes two LIDs or address ranges (e.g., a discontinuous set as shown in entry 1218) and a searched LID ("182") falls between the listed virtual addresses, the search continues down a center directed edge (not shown) to entries with LIDs that fall between the two LIDs of the current entry 1208. A search continues down the index 1204 until an storage entry is identified or a leaf storage entry is reached and the search fails. In the FIG. 12 example, the search successfully terminates at the matching storage entry 1216 (e.g., the storage entry 1216 comprises the searched LID ("182")).

Although in the FIG. 12 example the index 1204 is implemented using a B-Tree datastructure indexed by LID, in other embodiments, the index 1204 may be implemented using a content addressable memory ("CAM"), a binary tree, a hash table, or other datastructure known in the art, and may comprise other types of indexing, such as size indexing, storage location indexing (e.g., as in the reverse map 1222 described below), and so on.

Each storage entry in the index 1204 may associate one or more LIDs with respective storage locations(s) of the non-volatile storage device 106. For example, the entry 1214 may associate the LID range 072-083 with storage locations 95-106. In some embodiments, the storage locations may be identified by a physical address. Those of skill in the art will recognize that the physical addresses of the storage locations may be stored in the index 1204 or an offset into one or more storage structures of the solid-state storage media. As discussed above, the storage locations of the storage entry 1214 may change due to modifications to the underlying data (e.g., due to modify, recovery operations, or the like).

The storage entries may further comprise and/or reference metadata 1219, which may comprise metadata pertaining to the LIDs, such as age, size, LID attributes (e.g., client identifier, data identifier, file name, group identifier), and so on. Since the metadata 1219 is associated with the storage entries, which are indexed by LID (e.g., address 1215), the metadata 1219 may remain associated with the storage entry 1214 regardless of changes to the location of the underlying storage locations on the non-volatile storage device 106 (e.g., changes to the storage locations 1217).

The index 1204 may be used to efficiently determine whether the non-volatile storage device 106 comprises a storage entry referenced in a client request and/or to identify a storage location of data on the device 106. For example, the non-volatile storage device 106 may receive a client request 1202 to allocate a particular LID. The request 1202 may specify a particular LID, a LID and a length or offset (e.g., request 3 units of data starting from LID 074), a set of LIDs or the like. Alternatively, or in addition, the client request 1202 may comprise a set of LIDs, LID ranges (continuous or discontinuous), or the like.

The non-volatile storage device 106 may determine whether a storage entry corresponding to the requested LIDs is in the index 1204 using a search operation as described above. If a storage entry comprising the requested LIDs is found in the index 1204, the LID(s) associated with the request 1202 may be identified as being allocated and bound. Accordingly, data corresponding to the LID(s) may be stored on the non-volatile storage device 106. If the LID(s) are not found in the index 1204, the LID(s) may be identified as unbound (but may be allocated). Since the storage entries may represent sets of LIDS and/or LID ranges, a client request may result in partial allocation. For example, a request to allocate 068-073 may successfully allocate LIDs 068 to 071, but may fail to allocate 072 and 073 since these are included in the storage entry 1214. In the event of a partial allocation, the entire allocation request may fail, the available LIDs may be allocated and other LIDs may be substituted for the failed LIDs, or the like.

In the example depicted in FIG. 12, the storage entry corresponding to the storage request 1202 is in the index 1204 (storage entry 1214), and, as such, the LIDs associated with the request 1202 are identified as allocated and bound. Therefore, if the client request 1202 is to read data at the specified LIDs; data may be read from the storage locations 1217 identified in the storage entry 1214 and returned to the originator or the request. If the client request 1202 is to allocate the identified LIDs, the allocation request may fail (and/or substitute LIDs may be allocated as described above).

When new storage entries are added to the index 1204, a merge operation may occur. In a merge operation, an existing storage entry may be "merged" with one or more other storage entries. For instance, a new storage entry for LIDs 084-088 may be merged with entry 1214. The merge may comprise modifying the LID 1215 of the storage entry to include the new addresses (e.g., 072-088) and/or to reference the storage locations 1217 to include the storage location on which the data was stored.

Although the storage entries in the index 1204 are shown as comprising references to storage locations (e.g., addresses 1217), the disclosure is not limited in this regard. In other embodiments, the storage entries comprise reference or indirect links to the storage locations. For example, the storage entries may include a storage location identifier (or reference to the reverse map 1222).

FIG. 12 depicts another example of an index comprising a reverse map 1222, which may associate storage locations of the non-volatile storage device 106 with LIDs in the logical address space. The reverse map 1222 may also associate a storage location with metadata, such as a validity indicator 1230, and/or other metadata 1236 (described below). In some embodiments, the storage location address 1226 and/or length 1228 may be explicitly included in the reverse map 1222. Alternatively, the storage location address 1226 and/or data length 1228 may be inferred from a location and/or arrangement of an entry in the reverse map 1222 and, as such, the address 1226 and/or data length 1228 may be omitted. In some embodiments, the reverse map 1222 may include references to LIDs 1234.

As discussed above, the reverse map 1222 may comprise metadata 1236, which may include metadata pertaining to sequential storage operations performed on the storage locations, such as sequence indicators (e.g., timestamp) to indicate a ordered sequence of storage operations performed on the storage device (e.g., as well as an "age" of the storage locations and so on). The metadata 1236 may further include metadata pertaining to the storage media, such as wear level, reliability, error rate, disturb status, and so on. The metadata 1236 may be used to identify unreliable and/or unusable storage locations, which may reduce the physical storage capacity of the non-volatile storage device 106.

The reverse map 1222 may be organized according to storage divisions (e.g., erase blocks) of the non-volatile storage device 106. In this example, the entry 1220 that corresponds to storage entry 1218 is located in erase block n 1238. Erase block n 1238 is preceded by erase block n−1 1240 and followed by erase block n+1 1242 (the contents of erase blocks n−1 and n+1 are not shown). An erase block may comprise a predetermined number of storage locations. An erase block may refer to an area in the non-volatile storage device 106 that is erased together in a storage recovery operation.

The validity metadata 1230 may be used to determine an available physical storage capacity of the non-volatile storage device 106 (e.g., a difference between physical capacity (or budgeted capacity) and the storage locations comprising valid data). The reverse map 1222 may be arranged by storage division (e.g. erase blocks) or erase region to enable efficient traversal of the physical storage space (e.g., to perform grooming operations, determine physical storage capacity, and so on). Accordingly, in some embodiments, the available physical capacity may be determined by traversing the storage locations and/or erase blocks in the reverse map 1222 to identify the available physical storage capacity (and/or is being used to store valid data).

Alternatively, or in addition, the reverse map 1222 (or other datastructure) may comprise an indicator 1239 to track the available physical capacity of the non-volatile storage device 106. The available physical capacity indicator 1239 may be initialized to the physical storage capacity (or budgeted capacity) of the storage device 106, and may be updated as storage operations are performed. The storage operations resulting in an update to the available physical storage capacity indicator 1238 may include, but are not limited to: storing data on the storage device 106, reserving physical capacity on the storage device 106, canceling a physical capacity reservation, storing data associated with a reservation where the size of the stored data differs from the reservation, detecting unreliable and/or unusable storage locations and/or storage division (e.g., taking storage locations out of service), and so on.

In some embodiments, the metadata 1204 and/or 1222 may be configured to reflect reservations of physical storage capacity. As described above in conjunction with FIG. 8, a storage client may reserve physical storage capacity for an operation that is to take place over time. Without a reservation, the storage client may begin the operation, but other clients may exhaust the physical capacity before the operation is complete. In some embodiments, the storage client issues a request to reserve physical capacity before beginning the storage operation. The storage system 102 updates storage metadata (e.g., the indexes 1204 and/or 1222), the indicate that the requested portion has been reserved. The reserved portion may not be associated with any particular physical storage locations; rather, the reservation may indicate that the storage system 102 is to maintain at least enough physical storage capacity to satisfy the reservation. For example, the indicator 1239 of remaining physical storage capacity may be reduced by the amount of reserved physical storage capacity. Requests subsequent to the reservation may be denied if satisfying the requests would exhaust the remaining physical storage capacity in the updated indicator 1239. In some embodiments, a reservation of physical storage capacity may be valid for a pre-determined time, until released by the storage client, until another, higher-priority request is received, or the like. The reservation may expire once the storage client that reserved the physical capacity users the reserved physical storage capacity in subsequent storage operations. If the storage operations occur over a series of storage operations (as opposed to a single operation), the reservation may be incrementally reduced accordingly.

Figure 13:
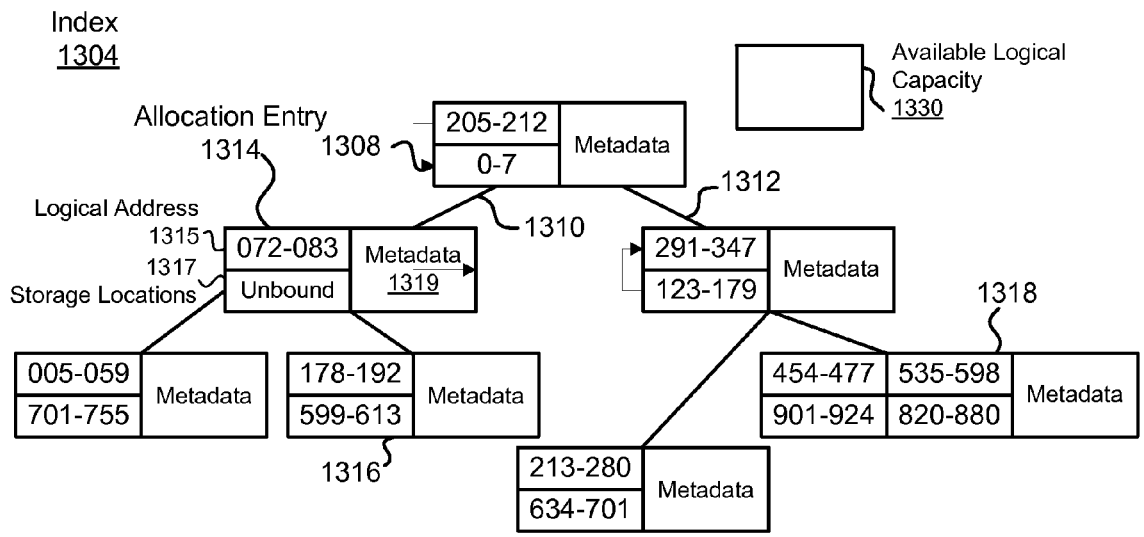
FIG. 13 is a schematic diagram of exemplary embodiments of indexes to associate logical identifiers with storage locations of a non-volatile storage device.

FIG. 13 depicts another example of an index 1304 for managing storage allocation of a non-volatile storage device. In the FIG. 13 example, the index 1304 may be modified to include one or more allocation entries (e.g., allocated entry 1314). An allocation entry may be used to track LIDs that are allocated to a client, but are not yet bound (e.g., are not associated with data stored on the non-volatile storage device 106). Therefore, unlike the storage entries (e.g., entries 1308, 1316, and 1318), an allocation entry 1314 may not include references to storage locations 1317; these references may be set to "unbound," NULL, or may be omitted. Similarly, metadata 1319 associated with the allocation entry 1314 may indicate that the entry is not bound and/or associated with data.

The index 1304 may be used to determine an available logical capacity of the logical address space (e.g., by traversing the index 1304). The available logical capacity may consider LIDs that are bound (using the storage entries), as well as LIDs that are allocated, but not yet bound (using the allocation entries, such as 1314).

As shown in FIG. 13, in some embodiments, the allocation entries 1314 may be maintained in the index 1304 with the storage entries. Alternatively, allocation entries may be maintained in a separate index (or other datastructure). When an allocation entry becomes associated with data on the non-volatile storage device 106 (e.g., as associated with storage locations), the allocation entry may be modified and/or replaced by a storage entry.

In some embodiments, the index 1304 (or index 1204) may comprise an indicator 1330 to track the available logical capacity of the logical address space. The available logical capacity may be initialized according to the logical address space presented by the storage device 106. Changes to the index 1304 may cause the available logical capacity indicator 1330 to be updated. The changes may include, but are not limited to: addition of new allocation entries, removal of allocation entries, addition of storage entries, removal of allocation entries, or the like.

Figure 14:
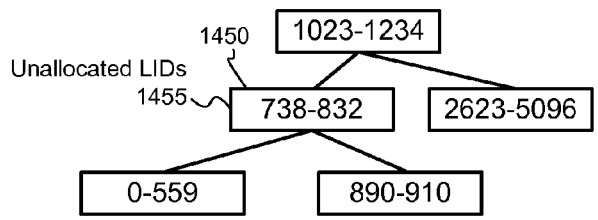
FIG. 14 depicts an example of an index for maintaining unallocated logical capacity.

FIG. 14 depicts an example of an unallocated index 1444, which may be used to allocate storage in a non-volatile storage device. The index 1444 may comprise entires 1450, which may correspond to "holes" in the LIDs indexes 1204 and/or 1304 described above. Accordingly an entry 1450 in the available index 1444 may correspond to a LID (and/or LID range, set, or the like) that is available (e.g., is not allocated nor bound). The index 1444 may be used to quickly determine the logical storage capacity of a logical storage space and/or to identify LIDs to allocate in response to client requests. In the FIG. 14 example, the entries in the index 1444 are shown as being indexed by LID. In some embodiments, however, the index 1444 may indexed in other (or additional) ways. For example, the unallocated index 1444 may be indexed by LID range (e.g., by the size of the LID range) as well as LID. This indexing may be used to identify unallocated LIDs sized according to client requests (e.g., to efficiently fill "holes" in the logical address space).

Figure 15:
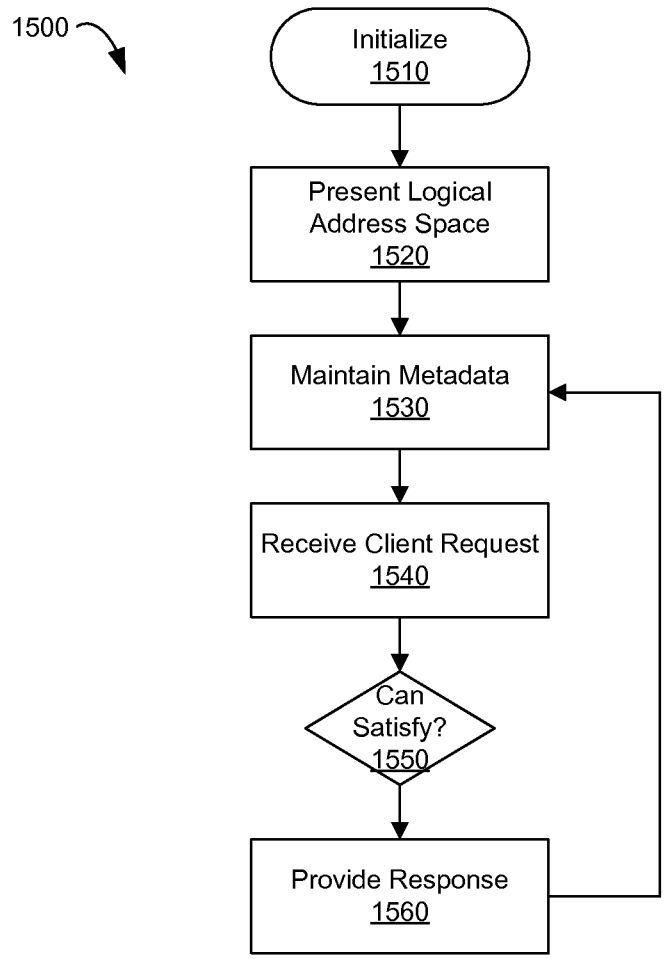
FIG. 15 is a flow diagram of one embodiment of a method for allocating a non-volatile storage device.

FIG. 15 is a flow diagram of one embodiment of a method 1500 for allocating storage. As described above, steps of the method 1500 may be tied to particular machine components and/or may be implemented using machine-readable instructions stored on a non-transitory machine-readable storage medium.

At step 1510 a non-volatile storage device may be initialized for use. The initialization may comprise allocating resources for the non-volatile storage device (e.g., solid-state storage device 106), such as communications interfaces (e.g., bus, network, and so on), allocating volatile memory, accessing solid-state storage media, and so on. The initialization may further comprise presenting a logical address space to storage clients, initializing one or more indexes (e.g., the indexes described above in conjunction with FIGS. 12-14), and so on.

At step 1520, the non-volatile storage device may present a logical space to one or more clients. Step 1520 may comprise implementing and/or providing an interface (e.g., API) accessible to one or more clients, or the like.

At step 1530, the non-volatile storage device may maintain metadata pertaining to logical allocation operations performed by the method 1500. The logical allocation operations may pertain to operations in the logical address space presented at step 1520, and may include, but are not limited to: allocating logical capacity, binding logical capacity to physical storage locations, and so on. The metadata may include, but is not limited to: indexes associating LIDs in the logical address space with storage locations on the non-volatile storage device; indexes associating storage locations with LIDs (e.g., index 1204 of FIG. 12), allocation entries indicating allocated LIDs having no associated storage location (e.g., index 1304 of FIG. 13), an unallocated index (e.g. index 1444 of FIG. 14), maintaining an indicator of unallocated logical address space (e.g., indicator 1330 of FIG. 13), and so on.

At step 1540, a client request pertaining to a LID in the logical address space may be received. The client request may comprise a query to determine if a particular LID and/or logical capacity can be allocated, a request to allocate a LID and/or logical capacity, a request to store data on the non-volatile storage device, or the like.

At step 1550, the metadata maintained at step 1530 may be referenced to determine whether the client request can be satisfied. Step 1550 may comprise referencing the metadata (e.g., indexes and/or indicators) maintained at step 1530 to determine an available logical capacity of the logical address space and/or to identify available LIDs (or LID range) as described above.

At step 1560, the method 1500 may provide a response to the client request, which if the request cannot be satisfied may comprise providing a response to indicate such. If the client request can be satisfied, the providing the response may comprise one or more of: an indicator that the allocation can be satisfied, allocating LIDs satisfying the request, providing allocated LIDs satisfying the request, providing one or more requested LIDs and/or one or more additional LIDs, (e.g., if a portion of a requested set of LIDs can be allocated), or the like.

Following step 1560, the flow may return to step 1530, where the method 1500 may update the metadata (e.g., indexes, indicators, and so on) according to the allocation operation (if any) performed at step 1560.

Figure 16:
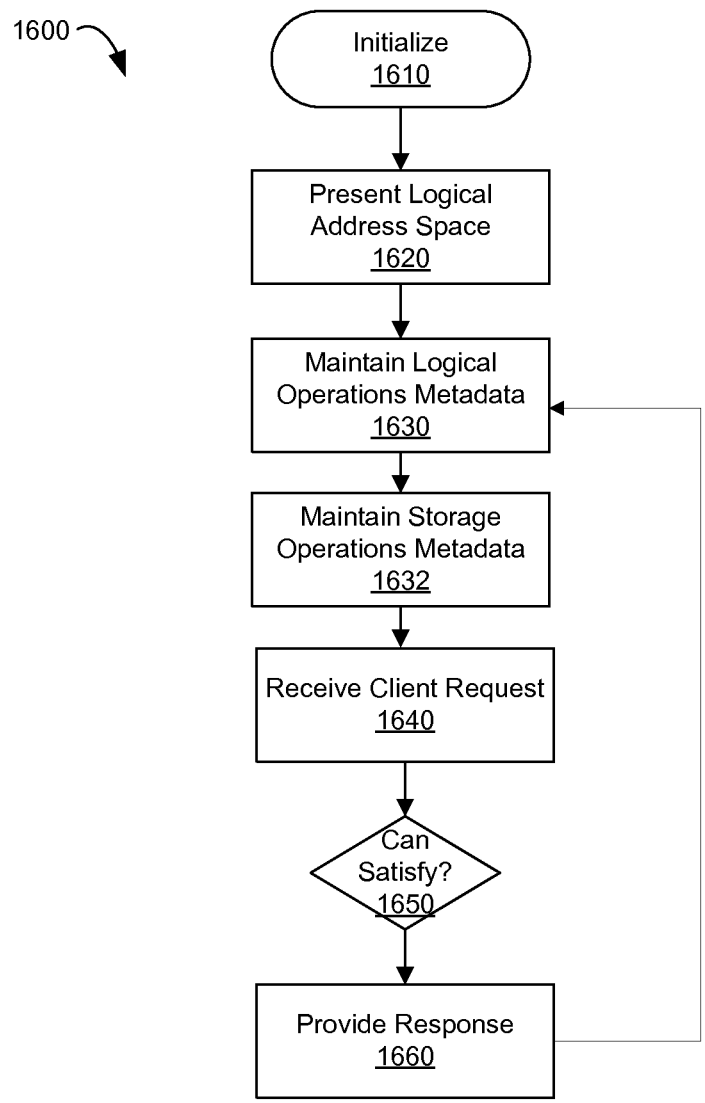
FIG. 16 is a flow diagram of one embodiment of a method for allocating a non-volatile storage device.

FIG. 16 is a flow diagram depicting an embodiment of a method 1600 for allocating storage. As described above, steps of the method 1600 may be tied to particular machine components and/or may be implemented using machine-readable instructions stored on a non-transitory machine-readable storage medium.

At steps 1610, 1620, and 1630, the method 1600 may be initialized, present a logical storage space to one or more clients, and/or maintain metadata pertaining to logical operations performed by the method 1600.

At step 1632, the method 1602 may maintain metadata pertaining to physical storage operations performed by the method 1600. The storage operations may include, but are not limited to: reserving physical storage capacity, canceling physical storage capacity reservations, storing data on the non-volatile storage device, deallocating physical storage capacity, grooming operations (e.g., garbage collection, error handling, and so on), physical storage space budgeting, and so on. As discussed above, metadata maintained at step 1632 may include, but is not limited to: indexes associating LIDs in the logical address space with storage locations on the non-volatile storage device; indexes associating storage locations with LIDs (e.g., index 1204 of FIG. 12), allocation entries indicating allocated LIDs having no associated storage location (e.g., index 1304 of FIG. 13), an unallocated index (e.g. index 1444 of FIG. 14), maintaining an indicator of unallocated logical address space (e.g., indicator 1330 of FIG. 13), and so on.

At step 1642, a client request pertaining to physical storage capacity of the non-volatile storage device may be received. The client request may comprise a query to determine if a physical storage capacity is available, a request to reserve physical storage capacity, a request to store data, a request to deallocate data (e.g., TRIM), or the like.

At step 1650, the metadata maintained at steps 1630 and/or 1632 may be referenced to determine whether the client request can be satisfied. Step 1650 may comprise referencing the metadata at steps 1630 and/or 1632 to determine an available physical storage capacity of the non-volatile storage device and/or to identify storage locations associated with particular LIDs (e.g., in a deallocation request or TRIM) as described above.

At step 1660, the method 1600 may provide a response to the client request, which if the request cannot be satisfied may comprise providing a response to indicate such. If the client request can be satisfied, the providing the response may comprise one or more of: indicating that the client request can and/or was satisfied, reserving physical storage capacity for the client; cancelling a physical storage capacity reservation, storing data on the non-volatile storage device, deallocating physical storage capacity, or the like.

Figure 17:
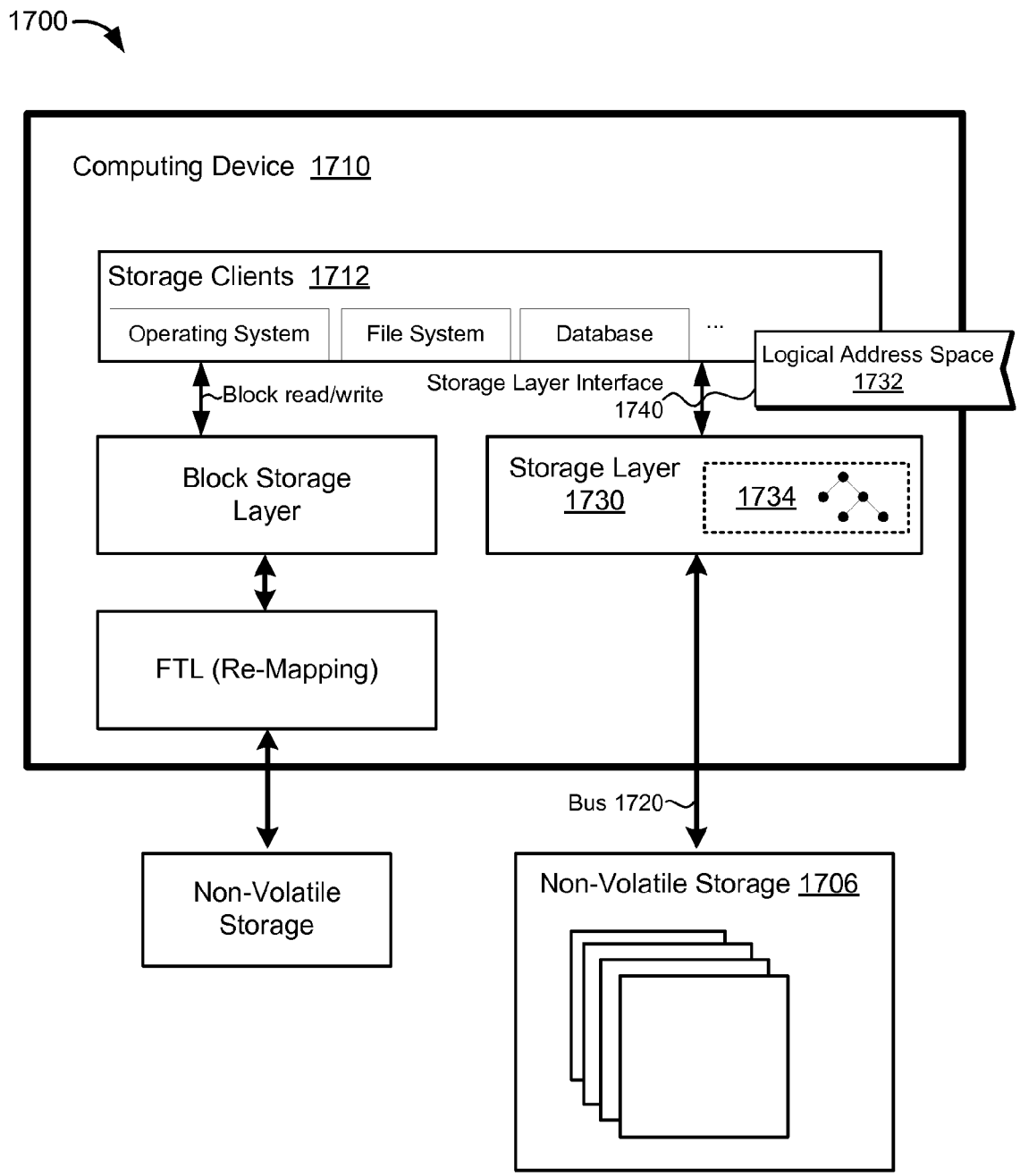
FIG. 17 is a block diagram of an exemplary embodiment of a computing device comprising a storage layer.

In some embodiments, a storage layer provides an interface through which storage clients perform persistent operations. The storage layer may simplify data storage operations for storage clients. Referring to FIG. 17, a storage layer 1730 presents a logical address space 1732 of the non-volatile storage device 1706 to storage client applications 1712 operating on a computing device 1710. The non-volatile storage device 1706 may comprise a single non-volatile storage device, may comprise a plurality of non-volatile storage devices, a cluster of storage devices, or the like. The storage layer 1730 may comprise a driver, a user-space application, or the like. In some embodiments, the storage layer 1730 is implemented in conjunction with the driver 118 described above.

The logical address space 1732 may be accessible to the storage clients 1712 via an application-programming interface provided by the storage layer 1730 (storage layer interface 1740). The storage clients 1712 may include, but are not limited to: operating systems, virtual operating systems (e.g., guest operating systems, hypervisors, etc.), file systems, database applications, server applications, general-purpose applications, and the like.

The storage layer 1730 is configured to perform storage operations on the non-volatile storage device 1706, which may comprise a solid-state storage device as described above. The storage layer 1730 communicates with the non-volatile storage device 1706 via a communication bus 1720, which may include, but is not limited to: a PCE-e bus, a network connection (e.g., Infiniband), a storage network, Fibre Channel Protocol (FCP) network, HyperSCSI, or the like. The storage layer 1730 uses the communication bus 1720 to implement storage operations, such as delete, erase, read, write, discard, and the like. The storage operations may be configured according to the capabilities and/or configuration of the non-volatile storage device 1706. For example, if the non-volatile storage device 1706 comprises a write-once, block-erasable device, the storage layer 1730 may be configured to perform storage operations accordingly (e.g., storage data on initialized or erased storage locations, etc.).

The storage layer 1730 uses storage metadata 1734 to maintain associations between logical identifiers (e.g., blocks) in the logical address space 1732 and physical storage locations on the non-volatile storage device 1706. As used herein, a physical storage location may refer to any storage location provided by the non-volatile storage device 1706, which may include, but are not limited to: storage divisions, erase blocks, storage units, pages, and the like. A physical storage location may refer to a collection of storage locations, such as logical erase block, a logical page, or the like as described above.

The storage layer 1730 implements "any-to-any" bindings between LIDs in the logical address space 1732 and physical storage locations on the non-volatile storage device 1706. As described above, the storage layer 1730 may cause data to be written or updated "out-of-place" on the non-volatile storage device 1706. Storing data "out-of-place" provides wear-leveling benefits and addresses "erase-and-program-once" properties of many non-volatile storage devices. Associations between LIDs in the logical address space 1732 and physical storage locations on the non-volatile storage device 1706 are maintained in the storage metadata 1734.

In some embodiments, the storage layer 1730 causes data to be persisted on the non-volatile storage 1706 in a sequential, log-based format. As described above, sequential writing may comprise persisting the order of storage operations performed on the non-volatile storage device 1706. The sequential ordering metadata may be persisted on the non-volatile storage device 1706 itself. For example, the sequence order of storage operations may be maintained using sequence indicators (e.g., timestamps, sequence numbers, or other indicators) that are stored on the non-volatile storage device 1706. Persisting data in a log-based format may comprise persisting metadata on the non-volatile storage device 1706 that describes the data stored thereon. The metadata may indicate the LID in the logical address space to which the data pertains. For example, and as described above, data may be persisted on the non-volatile storage device 1706 in a container format (e.g., a "packet" or the like). Each container may comprise a header (or other field) that indicates the LID corresponding to the data, an offset within a LID corresponding to the data, or the like. Accordingly, the storage layer 1730 may be capable of replaying a sequence of storage operations performed on the non-volatile storage device 1706 by sequentially reading data therefrom. The sequence of storage operations (and the log-based format) enables the storage layer 1730 to reconstruct the storage metadata 1734, as well as other data, in the event of an invalid shutdown. Examples of apparatus, systems, and methods for crash recovery and/or data integrity despite invalid shutdown conditions are described in U.S. Provisional Patent Application No. 61/424,585, entitled, "Apparatus, System, and Method for Persistent Management of Data in a Cache Device," filed Dec. 17, 2010, and in U.S. Provisional Patent Application No. 61/425,167, entitled, "Apparatus, System, and Method for Persistent Management of Data in a Cache Device," filed Dec. 20, 2010, which are hereby incorporated by reference in their entireties.

The sequential, log-based storage format implemented by the storage layer 1730 provides crash-recovery and/or data integrity for the data stored on the non-volatile storage 1706 as well as the storage metadata 1734. After an invalid shutdown and reconstruction operation, the storage layer 1730 may expose the reconstructed storage metadata 1734 to storage clients 1712. The storage clients 1712 may, therefore, delegate crash-recovery and/or data integrity to the storage layer 1730, which may significantly simply the storage clients 1712 and/or allow the storage clients 1712 to operate more efficiently. For example, a file system storage client 1712 may require crash-recovery and/or data integrity services for some of its metadata, such as I-node tables, file allocation tables, and so on. The storage client 1712 may have to implement these services itself, which may impose significant overhead and/or complexity on the storage client 1712. The storage client 1712 may be relieved from this overhead by delegating crash recovery and/or data integrity to the storage layer 1730. As described above, the storage layer 1730 stores data in a sequential, log-based format. As such, in the event of an invalid shutdown, the storage layer 1730 is capable of reconstructing the storage metadata 1734 and/or identifying the "current" version of data using the sequential, log-based formatted data on the non-volatile storage device 1706. The storage layer 1730 provides access to the reconstructed storage metadata 1734 and/or data via the storage layer interface 1740. Accordingly, after an invalid shutdown, a file system storage client 1712 may access crash-recovered file system metadata and/or may ensure the integrity of file data accessed through the storage layer 1730.

The logical address space 1732 may be "sparse" and, as such, may comprise a logical capacity that exceeds the physical storage capacity of the non-volatile storage device 1706. Accordingly, the logical address space 1732 may be defined independent of the non-volatile storage device 1706; the logical address space 1732 may present a larger address space than the physical storage capacity of the non-volatile storage device 1706, may present different storage location partitions and/or block sizes than provided by the non-volatile storage device 1706, and so on. Associations between the logical address space 1732 and the non-volatile storage 1706 are managed by the storage layer 1730 (using the storage metadata 1734). As such, the storage clients 1712 may be implemented using the storage layer interface 1740, as opposed to a more limited block-storage layer and/or the other storage interface provided by a particular non-volatile storage device 1706.

In some embodiments, the logical address space 1732 comprises a 64-bit address space referenced by 64-bit logical identifiers (LIDs). Each 64-bit logical identifier in the logical address space 1732 (e.g., 64-bit address) references a respective virtual storage location. As used herein, a virtual storage location refers to a block of logical storage capacity (e.g., an allocation block). The storage layer 1730 may be configured to implement arbitrarily sized virtual storage locations; typical sizes range from 512 to 4086 bytes (or even 8 kb to 16 kb depending on the needs of the storage clients 1712); the disclosure, however, is not limited in this regard. Since the logical address space 1732 (and the virtual storage locations therein) is independent of the physical storage capacity and/or storage partitioning of the non-volatile storage device 1706, the logical address space 1732 may be tailored to the requirements of the storage clients 1712.

The storage layer 1730 may manage allocations within the logical address space using storage metadata 1734. In some embodiments, the storage layer 1730 maintains storage metadata 1734 that tracks allocations of the logical address space 1732 using an index, such as the indexes described in conjunction with FIGS. 12-14. As described above, the storage layer 1730 may allocate ranges within the logical address space 1732 (e.g., LIDs) for use by particular storage clients 1712. LIDs may be allocated for a particular storage client 1712 to persist a storage entity. As used herein, a storage entity refers to any data or data structure in the logical address space 1712 that is capable of being persisted to the non-volatile storage device 1706; accordingly, a storage entity may include, but is not limited to: file system objects (e.g., files, streams, I-nodes, etc.), a database primitive (e.g., database table, extent, or the like), streams, persistent memory space, memory mapped files, or the like. A file system object refers to any data structure used by a file system including, but not limited to: a file, a stream, file attributes, file index, volume index, node table, or the like.

As described above, allocating a LID refers to reserving a LID for a particular use. A LID may refer to a set or range of the logical address space 1732 (e.g., a set or range of virtual storage locations). The logical capacity of an allocated LID may be determined by the size of the virtual storage locations of the logical address space 1732. As described above, the logical address space 1732 may be configured to present virtual storage locations of any predetermined size. The size of the virtual storage locations may be configured by one or more storage clients 1712, the storage layer 1730, or the like.

An allocated LID, however, may not necessarily be associated with and/or bound to a physical storage location on the non-volatile storage device 1706 until required. In some embodiments, the storage layer 1730 allocates LIDs comprising large, contiguous ranges in the logical address space 1732. The availability of large, contiguous ranges in the logical address space is enabled by the large address space (e.g., 64-bit address space) presented by the storage layer 1730. For example, a LID allocated for a file may be associated by the storage layer 1730 with an address range of 2^32 contiguous virtual storage locations in the logical address space 1732 for data of the file. If the virtual storage locations (e.g., allocation blocks) are 512 bytes each, the allocated LID may represent a logical capacity of two (2) terabytes. The physical storage capacity of the non-volatile storage device 1706 may be smaller than two (2) terabytes and/or may be sufficient to store only a small number of such files, such that if LID allocations were to cause equivalent bindings in physical storage space, the storage layer 1730 would quickly exhaust the capacity of the non-volatile storage device 1706. Advantageously, however, the storage layer 1730 is configured to allocate large, contiguous ranges within the logical address space 1732, and to defer binding physical storage locations on the non-volatile storage device 1706 to the LIDs until necessary. Similarly, the storage layer 1730 may support the use of "sparse" allocated logical ranges. For example, a storage client 1712 may request that a first data segment be persisted at the "head" of an allocated LID and a second data segment be persisted at the "tail" of an allocated LID. The storage layer 1730 may bind only those physical storage locations on the non-volatile storage device 1706 that are needed to persist the first and second data segments. The storage layer 1730 may not bind or reserve physical storage locations on the non-volatile storage device 1706 for allocated LIDs that are not being used to persist data.

The storage layer 1730 maintains storage metadata 1734 to track allocations in the logical address space and to track bindings between LIDs in the logical address space 1732 and physical storage locations on the non-volatile storage media 1706. In some embodiments, the storage layer 1730 track both logical allocations and physical storage location bindings using a single metadata structure (e.g., a single index, such as the indexes described above in conjunction with FIGS. 12-14). Alternatively, or in addition, the storage layer 1730 may be configured to track logical allocations in logical allocation metadata and to track bound physical storage locations on the non-volatile storage media 1706 using separate, physical reservation metadata.

Storage clients 1712 may access the storage layer 1730 via the storage layer interface 1740. In some embodiments, storage clients 1712 may delegate certain functions to the storage layer 1730. For example, and as described above, storage clients 1712 may leverage the sequential, log-based data format of the storage layer 1730 to delegate crash recovery and/or data integrity functions to the storage layer 1730. In some embodiments, storage clients may also delegate allocations in the logical address space 1732 and/or physical storage reservations to the storage layer 1730.

Typically, storage client 1712, such as a file system, tracks the logical addresses and/or physical storage locations that are available for use. The logical storage locations available to the storage client 1712 may be limited to the physical storage capacity of the underlying non-volatile storage device (or partition thereof). Accordingly, the storage client 1712 may maintain a set of logical addresses that "mirrors" the physical storage locations of the non-volatile storage device. For example, and as shown in FIG. 17, a storage client 1712 may identify one or more available logical block addresses (LBAs) for a new file. Since the LBAs map directly to physical storage locations in conventional implementations, the LBAs are unlikely to be contiguous; the availability of contiguous LBAs may depend upon the capacity of the underlying block storage device and/or whether the device is "fragmented." The storage client 1712 then performs block-level operations to store the file through, inter alia, a block storage layer (e.g., a block-deice interface). If the underlying storage device provides a one-to-one mapping between logical block address and physical storage locations, as with conventional storage devices, the block storage layer performs appropriate LBA-to-physical address translations and implements the requested storage operations. If, however, the underlying non-volatile storage device does not support one-to-one mappings (e.g., the underlying storage device is a sequential, or write-out-of-place device, such as a solid-state storage device, in accordance with embodiments of this disclosure), another redundant set of translations is needed (e.g., a Flash Translation Layer, or other mapping). The redundant set of translations and the requirement that the storage client 1712 maintain logical address allocations may represent a significant overhead for storage operations performed by the storage client 1712 and may make allocating contiguous LBA ranges difficult or impossible without time-consuming "defragmentation" operations.

In some embodiments, storage clients 1712 delegate allocation functionality to the storage layer 1730. Storage clients 1712 may access the storage layer interface 1740 to request logical ranges in the logical address space 1732. The storage layer 1730 tracks the allocation status of the logical address space 1732 using the storage metadata 1734. If the storage layer 1730 determines that the requested logical address range is unallocated, the storage layer 1730 allocates the requested logical address range for the storage client 1712. If the requested range is allocated (or only a portion of the range is unallocated), the storage layer 1730 may return an alternative range in the logical address space 1730 and/or may return a failure. In some embodiments, the storage layer 1730 may return an alternative range in the logical address space 1730 that includes contiguous range of logical addresses. Having a contiguous range of logical addresses often simplifies the management of the storage entity associated with this range of logical addresses. Since the storage layer 1730 uses the storage metadata 1734 to maintain associations between the logical address space 1732 and physical storage locations on the non-volatile storage device 1706, no redundant set of address translations is needed. Moreover, the storage layer 1730 uses the storage metadata 1734 to identify unallocated LIDs, which frees the storage client 1712 from this overhead.

In some embodiments, the storage layer 1730 makes allocations within the logical address space 1732 as described above. The storage layer 1730 may access an index comprising allocated logical address ranges (e.g., indexes of FIGS. 12-14) to identify unallocated LIDs, which are allocated to storage clients 1712 upon request. For example, the storage layer 1730 may maintain storage metadata 1734 comprising a range-encoded tree data structure, as described above; entries in the tree may represent allocated LIDs in the logical address space 1732, and "holes" in the tree represent unallocated LIDs. Alternatively, or in addition, the storage layer 1730 maintains an index of unallocated logical identifiers as described above in conjunction with FIG. 14 (e.g., unallocated index 1444).

Figure 18A:
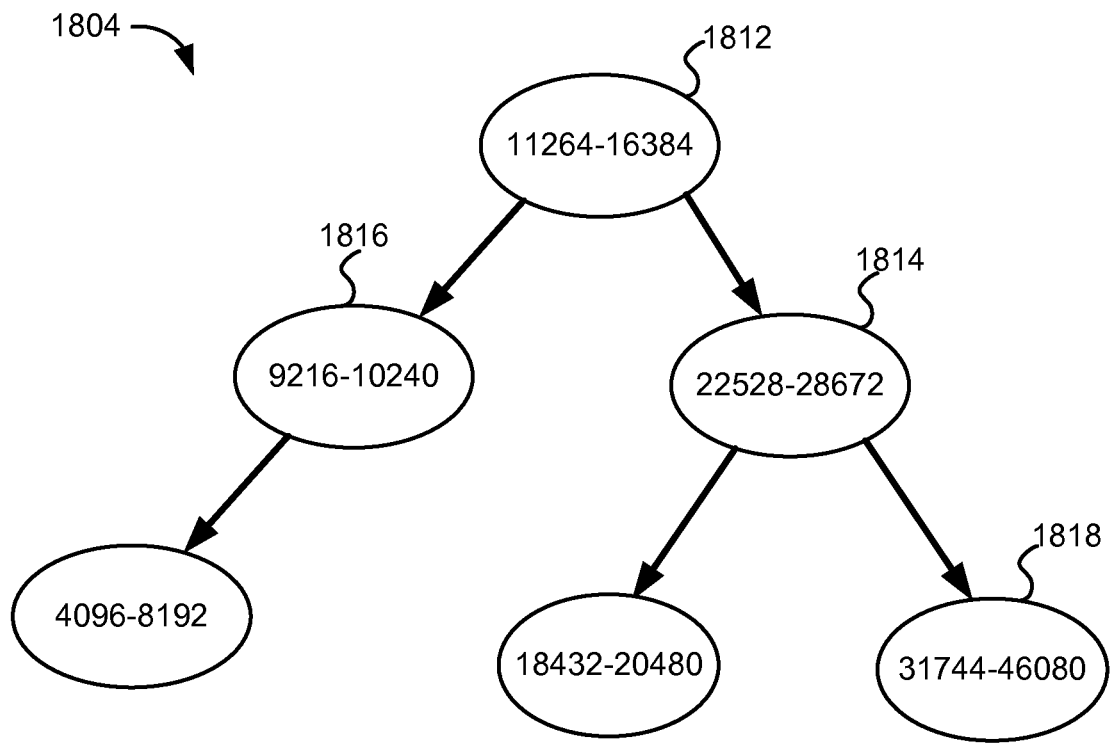
FIG. 18A is a schematic diagram of exemplary embodiments of storage metadata.

FIG. 18A depicts one exemplary embodiment of storage metadata 1804 for maintaining allocations within a logical address space, such as the logical address space 1732 of FIG. 17. The index 1804 comprises an entry for each allocated range of LIDs in the logical address space. The allocated LIDs may or may not be associated with physical storage locations on the non-volatile storage device (e.g., non-volatile storage device 1706). The entries may be indexed by LID in a range-encoded tree structure. Entries may be linked to one other in the index 1804. Links depicted to the left of an entry may reference a next lowest entry in the index 1804, whereas links depicted to the right of an entry may reference a next highest entry in the index 184. As shown in FIG. 18, the LID of entry 1816 is less than the LID of the entry 1812, and the LID of entry 1814 is greater than the LID of entry 1812. Successive entries (e.g., entry 1818) are linked within the index 1804 accordingly. The indexing allows for fast lookups of allocated LIDs (e.g., order log n) and/or similarly efficient lookups of holes in the logical address space. As discussed above, in some embodiments, the storage metadata (e.g., metadata 1734) may comprise a separate index to track unallocated LIDs in the logical address space.

The entries in the index 1804 may include LIDs that are allocated, but that are not associated with physical storage locations on a non-volatile storage device. Like the index 1204 described above, inclusion in the index 1804 may indicate that a LID is both allocated and associated with valid data on the non-volatile storage device. Alternatively, the index 1804 may be implemented similarly to the index 1304 of FIG. 13. In this case, the index 1804 may comprise entries that are associated with valid data on the non-volatile storage device along with entries that are allocated but are not associated with valid data stored on a physical storage location. The entries that are associated with valid data may identify the physical storage location of the data on the non-volatile storage device (e.g., using a physical address or other physical storage location identifier). Entries that are not associated with valid data on the non-volatile storage device (e.g., "allocation entries," such as the entry 1314 of FIG. 13) have a "NULL" physical storage location indicator or some other suitable indicator.

In some embodiments, the storage metadata 1834 may comprise security-related metadata, such as access control metadata, or the like. The security related metadata may be associated with each respective entry (e.g., entry 1812) in the index 1804. When storage requests pertaining to a particular LID are received by the storage layer 1730, the storage layer 1730 may access and/or enforce the security-related metadata (if any) in the corresponding entry. In some embodiments, the storage layer 1730 delegates enforcement of security-related policy enforcement to another device or service, such as an operating system, access control system, or the like. Accordingly, when implementing storage operations, the storage layer 1730 may access security-related metadata and verify that the requester is authorized to perform the operating using a delegate. If the delegate indicates that the requester is authorized, the storage layer 1730 implements the requested storage operations; if not, the storage layer 1730 returns a failure condition.

The storage layer 1730 may access the storage metadata 1734, such as the index 1804, to allocate LIDs in the logical address space 1732, to determine a remaining logical capacity of the logical address space 1732, to determine the remaining physical storage capacity of the non-volatile storage device 1706, and so on. The storage layer 1730 may respond to queries for the remaining logical capacity, remaining physical storage capacity, and the like via the storage layer interface 1740. Similarly, the storage layer 1730 may service requests to reserve physical storage capacity on the non-volatile storage device 1706. As described above, a storage client 1712 may wish to perform a sequence of storage operations that occur over time (e.g., receive a data stream, perform a DMA transfer, or the like). The storage client 1712 may reserve sufficient logical and/or physical storage capacity to perform the sequence of storage operations up-front to ensure that the operations can be completed. Reserving logical capacity may comprise allocating LIDs through the storage layer 1730 (using the storage layer interface 1740). Physical capacity may be similarly allocated. The storage client 1712 may request to reserve physical capacity through the storage layer interface 1740. If a sufficient amount of physical capacity is available, the storage layer 1730 acknowledges the request and updates the storage metadata accordingly (and as described above in conjunction with FIGS. 8 and 12).

The storage layer 1730 and/or storage metadata 1834 is not limited to the particular, exemplary data structures described above. The storage metadata 1734 may comprise any suitable data structure (or data structure combination) for efficiently tracking logical address space allocations and/or associations between LIDs and physical storage locations. For example, the index 1804 may be adapted such that entries in the index 1804 comprise and/or are linked to respective physical binding metadata. The physical binding metadata may comprise a "sub-index" of associations between LIDs in a particular allocated range and corresponding physical storage locations on the non-volatile storage medium. Each "sub-range" within the allocated LID comprises an entry associating the sub-range with a corresponding physical storage location (if any).

Figure 18B:
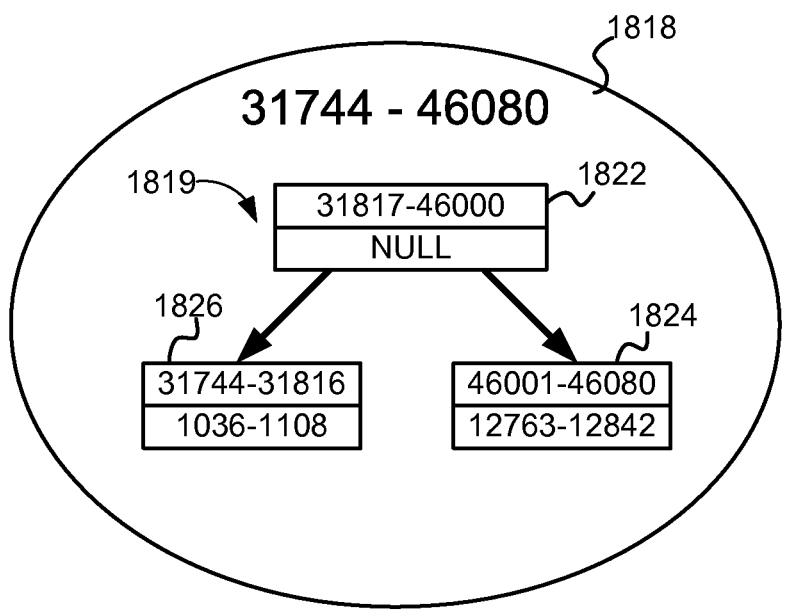
FIG. 18B is a schematic diagram of exemplary embodiments of physical reservation metadata.

FIG. 18B depicts one example of an index entry comprising physical binding metadata. The entry 1818 represents an allocated LID having a range from 31744 through 46080 in the logical address space. The entries of the physical binding metadata associate sub-ranges of the LID with corresponding physical storage locations (if any). The physical binding metadata 1819 may be indexed by LID as described above. In the FIG. 18B example, the LID sub-range comprising 31817 to 46000 of entry 1822 is not associated with valid data on the non-volatile storage device and, as such, is associated with a "NULL" physical storage location. The entry 1824 for the sub-range 46001 to 46080 is associated with valid data. The entry 1824 identifies the physical storage location of the data on the non-volatile storage device (locations 12763 through 12842). The entry 1826 identifies the physical storage location of the valid data associated with the sub-range for 31744-31816.

Figure 19A:
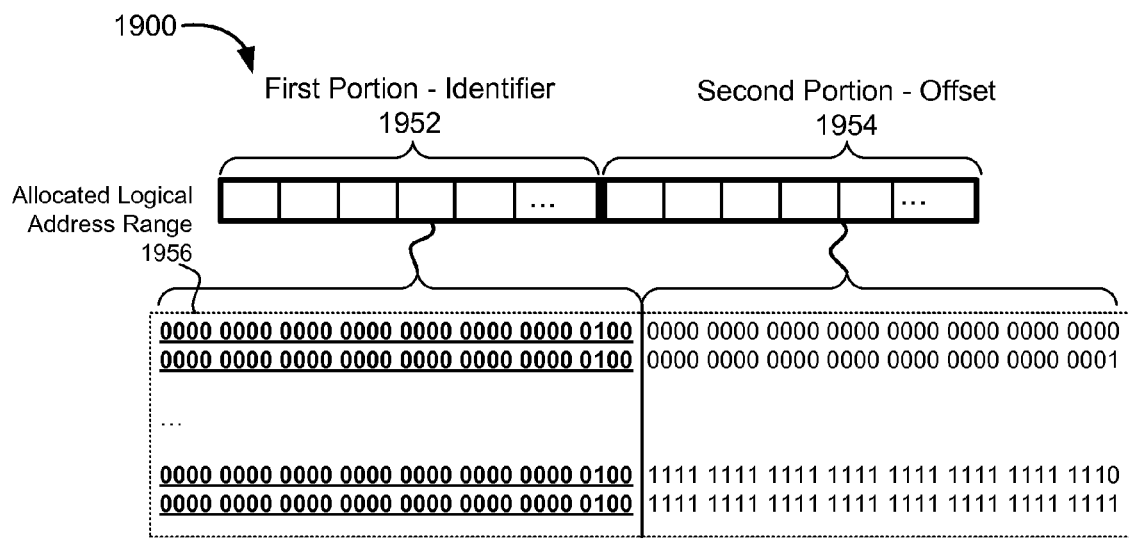
FIG. 19A depicts a logical identifier that has been segmented into a first portion and a second portion.

In some embodiments, the storage layer 1730 is configured to segment the LIDs in the logical address space into two or more portions. As shown in FIG. 19A, a LID 1900 is segmented into a first portion 1952 and a second portion 1954. In some embodiments, the first portion 1952 comprises "high-order" bits of the LID 1900, and the second portion comprises "low-order" bits. However, the disclosure is not limited in this regard and could segment LIDs using any suitable segmentation scheme.

The first portion 1952 may serve as a reference or identifier for a storage entity. The second portion 1954 may represent an offset into the storage entity. For example, the storage layer 1730 may reference the logical address space 1732 comprising 64-bit LIDs (the logical address space 1732 may comprise $2^{64}$ unique LIDs). The storage layer 1730 may partition the LIDs into a first portion 1952 comprising the high-order 32 bits of the 64-bit LID and a second portion 1954 comprising the low-order 32 bits of the LID. The resulting logical address space 1732 may be capable of representing $2^{32}-1$ unique storage entities (e.g., using the first portion of the LIDs), each having a maximum size (or offset) of $2^{32}$ virtual storage locations (e.g., 2 TB for a virtual storage location size of 512 bytes). The disclosure is not limited in this regard, however, and could be adapted to use any suitable segmentation scheme. For example, in implementations that require a large number of small storage entities (e.g., database applications, messaging applications, or the like), the first portion 1952 may comprise a larger proportion of the LID. For instance, the first portion 1952 may comprise 42 bits (providing $2^{42}-1$ unique identifiers), and the second portion may comprise 22 bits (providing a maximum offset of 4 GB). Alternatively, where larger files are required, the segmentation scheme may be similarly modified. Furthermore, the storage layer 1730 may present larger logical address spaces (e.g., 128 bits and so on) in accordance with the requirements of the storage clients 1712, configuration of the computing device 1710, and/or configuration of the non-volatile storage device 1706. In some embodiments, the storage layer 1730 segments the logical address space 1732 in response to a request from a storage client 1712 or other entity.

The storage layer 1730 may allocate LIDs based on the first portion 1952. For example, in a 64 bit address space, when the storage layer 1730 allocates a LID comprising a first portion 1952 [0000 0000 0000 0000 0000 0000 0000 0100] (e.g., first portion 1952 logical address 4), the storage layer 1730 is effectively allocating a logical address range comprising $2^{32}$ unique LIDs 1956 (4,294,967,296 unique LIDS) ranging from:
[0000 0000 0000 0000 0000 0000 0000 0100 0000 0000 0000 0000 0000 0000 0000 0000]
to,
[0000 0000 0000 0000 0000 0000 0000 0100 1111 1111 1111 1111 1111 1111 1111 1111]

In some embodiments, the storage layer 1730 uses the segmentation of the LIDs to simplify the storage metadata 1734. In one example, the number of bits in the first portion 1952 is X, and the number of bits in the second portion 1954 is Y. The storage layer 1730 may determine that the maximum number of uniquely LID that can be uniquely allocated is $2^X$, and that the allocated LIDs can be referenced using only the first portion of the LID (e.g., the set of X bits). Therefore, the storage layer 1730 may simplify the storage metadata index to use entries comprising only the first portion of a LID. Moreover, the storage layer 1730 may determine that the LIDs are allocated in fixed-sized ranges of $2^Y$. Accordingly, each entry in the storage metadata 1734 (e.g., index 1804) may be of the same extent. Therefore, the range portion of the metadata entries may be omitted.

Figure 19B:
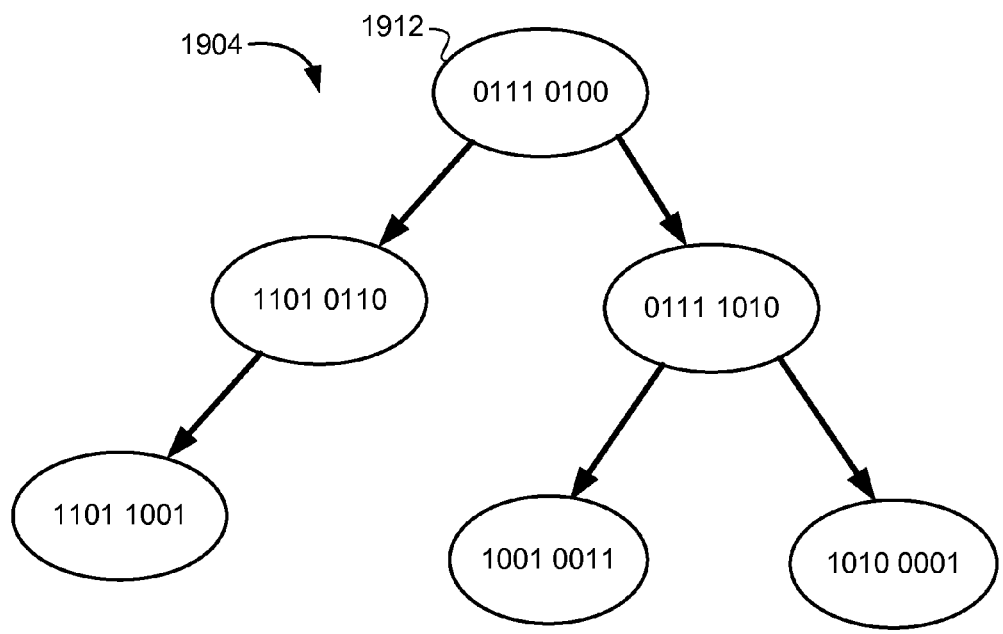
FIG. 19B is a schematic diagram of exemplary embodiments of storage metadata for segmented logical identifiers.

FIG. 19B depicts one example of an allocation index 1904 that has been simplified by segmenting the logical address space (e.g., logical address space 1732). For clarity, the first portion 1952 of the LIDs in the logical address space managed by the index 1904 is depicted using eight (8) bits. The remaining portion of the LID (e.g., remaining 54 bits) may be used as the second portion 1954. Alternatively, other portions of the LID may be used for other logical address space segmentation schemes, such as logical volume identifiers, partition identifiers, and so on.

Each entry 1912 in the index 1904 may be uniquely identified using the first portion (eight bits) of a LID. Accordingly, the entries 1904 may be indexed using only the first portion 1954 (e.g., 8 bits). This simplification may reduce the amount of data required to identify an entry 1912 from 64 bits to 8 bits (assuming a 64-bit LID with an 8-bit first portion). Moreover, the LIDs may be allocated in fixed sized logical ranges (e.g., in accordance with the second portion 1956). Therefore, each entry 1912 may represent the same range of allocated LIDs. As such, the entries 1912 may omit explicit range identifiers, which may save an additional 64 bits per entry 1912.

The storage layer 1730 may use the simplified index 1904 to maintain LID allocations in the logical address space 1732 and/or identify LIDs to allocate in response to requests from storage clients 1712. In some embodiments, the storage layer 1730 maintains a listing of "first portions" that are unallocated. Since, in some embodiments, allocations occur in a pre-determined way (e.g., using only the first portion 1954, and within a fixed range 1956), the unallocated LIDs may be expressed in a simple list or map as opposed to an index or other data structure. As LIDs are allocated, they are removed from the data structure and are replaced when they are deallocated.

Figure 19C:
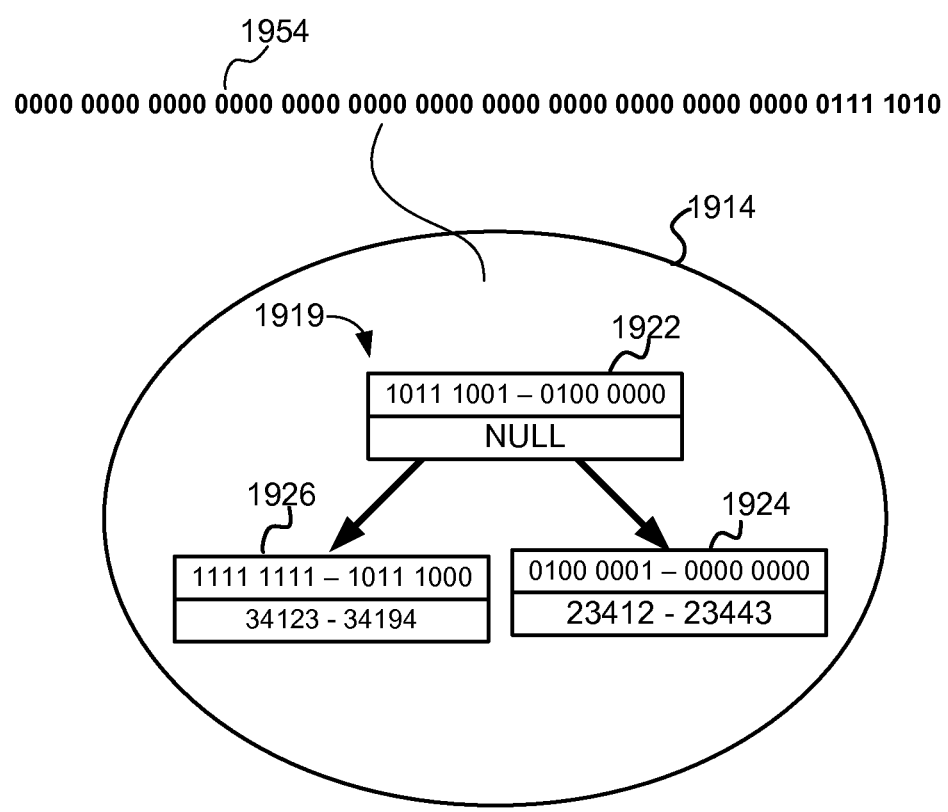
FIG. 19C is a schematic diagram of exemplary embodiments of physical reservation metadata for segmented logical identifiers.

Associations between portions of the entry and valid data on the non-volatile storage device may be maintained in the index 1904 (using physical binding metadata as described above). FIG. 19C depicts an example of physical binding metadata for use in a segmented logical addressing scheme. For clarity, in the FIG. 19C example, LIDs are segmented such that the first portion 1954 comprises 56 bits, and the second portion 1956 comprises 8 bits (the reverse of FIG. 19B). The entry 1914 is identified using the first portion 0000 0000 0000 0000 0000 0000 0000 0000 0000 0000 0000 0000 0111 1010. The entries 1922 of the index 1919 may be simplified to reference only offsets within the entry 1914 (e.g., within the second portion, which comprises 8 bits in the FIG. 19C example). Moreover, the head entry 1926 may omit the top-end of the second portion (e.g., may omit 1111 1111 since it can be determined that the top-most entry will necessarily include the maximal extent of the range defined by the second portion). Similarly, the tail entry 1924 may omit the bottom-end of the second portion 1956 (e.g., may omit 0000 000 since it can be determined that the bottom-most entry will necessarily include the beginning of the range defined by the second portion 1956). Each entry 1914 associates a range within the second portion with valid data on the non-volatile storage device (if any), as described above.

Referring to FIG. 17, and as described above, storage clients 1712 may delegate LID allocation to the storage layer 1730 using the storage layer interface 1740. The delegation may occur in a number of different ways. For example, a storage client 1712 may query the storage layer 1730 (via the storage layer interface 1940) for any available LID. If a LID is available, the storage layer 1730 returns an allocated LID to the storage client 1712. Alternatively, the storage client 1712 may request a particular LID for allocation. The request may comprise the first portion of the LID or an entire LID (with an offset). The storage layer 1730 may determine if the LID is unallocated and, if so, may allocate the LID for the client and return an acknowledgement. If the LID is allocated (or the LID falls within an allocated range), the storage layer 1730 may allocate an alternative LID and/or may return an error condition. The storage layer 1730 may indicate whether particular LIDs are allocated and/or whether particular LIDs are bound to physical storage locations on the non-volatile storage device 1706. The queries may be serviced via the storage layer interface 1740.

In embodiments in which the storage layer 1730 implements segmented LIDs, the storage layer 1730 may expose the segmentation scheme to the storage clients 1712. For example, storage clients 1712 may query the storage layer 1730 to determine the segmentation scheme currently in use. The storage clients 1712 may also configure the storage layer 1730 to use a particular LID segmentation scheme adapted to the needs of the storage client 1712.

The storage layer 1730 may allocate LIDs using only the first portion 1954 of a LID. If the LID is unallocated, the storage layer 1730 acknowledges the request, and the storage client 1712 is allocated a range of LIDs in the logical address space 1732 corresponding to the first portion 1954 and comprising the range defined by the second portion 1956. Similarly, when allocating a "nameless LID" (e.g., any available LID selected by the storage layer 1730), the storage layer 1730 may return only the first portion of the allocated LID. In some embodiments, when a client requests a LID using the first portion and the second portion, the storage layer 1730 extracts the first portion from the requested LID, and allocates a LID corresponding to the first portion to the client (if possible). Advantageously, embodiments of the present invention support such a large number of addresses for the second portion over such a high number of contiguous addresses that storage requests that cross a LID boundary are anticipated to be very rare. In certain embodiments, the storage layer 1730 may even prevent allocations that cross LID boundaries (as used herein a LID boundary is between two contiguous LIDs, the first being the last addressable LID in a second portion of a LID and the second being the first addressable LID in a next successive first portion of a LID). If the request crosses a boundary between pre-determined LID ranges, the storage layer 1730 may return an alternative LID range that is properly aligned to the LID segmentation scheme, return an error, or the like. In other embodiments, if the request crosses a boundary between pre-determined LID ranges, the storage layer 1730 may allocate both LIDs (if available).

Figure 20A:
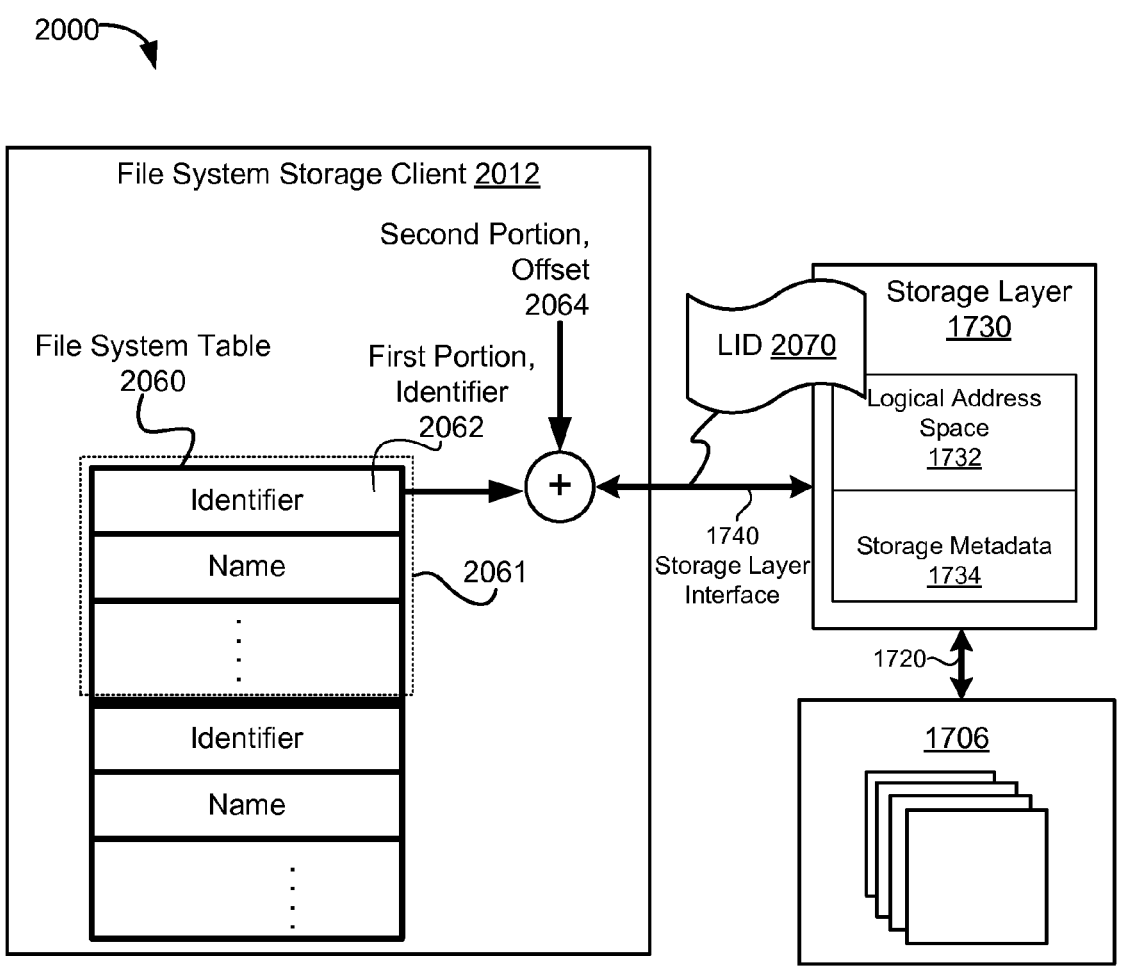
FIG. 20A is a schematic diagram of exemplary embodiments of a file system storage client accessing a storage layer using segmented logical identifiers.

As described above, the storage layer 1730 may be leveraged by the storage clients 1712 for logical allocations, physical storage bindings, physical storage reservations, crash-recovery, data integrity, and the like. FIG. 20A is a block diagram depicting a file system storage client 2012 leveraging the storage layer 1730 to perform file system operations.

The file system client application 1730 accesses the storage layer 1730 via the storage layer interface 1740 to allocate LIDs for storage entities, such as file system objects (e.g., files). In some embodiments, when a new file is created, the file system storage client 2012 queries the storage layer 1730 for a LID. The allocation request may be implemented as described above. If the requested LIDs can be allocated, the storage layer 1730 returns an allocated LID to the file system storage client 2012. The LID may be returned as a LID and an offset (indicating an initial size for the file), a LID range, a first portion of a LID, or the like. The FIG. 20A example shows the storage layer 1730 implementing a segmented LID range and, as such, the storage layer 1730 may return the first portion of a LID 2062 in response to an allocation request.

In some embodiments, the storage client 2012 may implement a fast and efficient mapping between LIDs and storage entities. For example, when the first portion of the LID is sufficiently large, the file system storage client 2012 may hash file names into LID identifiers (into hash codes of the same length as the first portion of the LID 2062). When a new file is created, the file system storage client 2012 hashes the file name to generate the first portion of the LID 2062 and issues a request to the storage layer 1730 to allocate the LID. If the LID is unallocated (e.g., no hash collisions have occurred), the storage layer may grant the request. The file system storage client 2012 may not need to maintain an entry in the file system table 2060 for the new file (or may only be required to maintain an abbreviated version of a table entry 2061), since the LID 2062 can be derived from the file name. If a name collision occurs, the storage layer 1730 may return an alternative LID, which may be derived from the hash code (or file name), which may obviate the need for the file system table 2060 to maintain the entire identifier.

The file system storage client 2012 may maintain a file system table 2060 to associate file system objects (e.g., files) with corresponding LIDs in the logical address space 1732 of the storage layer 1730. In some embodiments, the file system table 2060 is persisted on the non-volatile storage device 1706 at a pre-determined LID. Accordingly, the file system storage client 2012 may delegate crash recovery and/or data integrity for the file system table 2060 (as well as the file system objects themselves) to the storage layer 1730.

The file system storage client 2012 may reference files using the file system table 2060. To perform storage operations on a particular file, the file system storage application 2012 may access a file system entry 2061 corresponding to the file (e.g., using a file name lookup or another identifier, such as an I-node, or the like). The entry 2061 comprises a LID of the file, which, in the FIG. 20A example, is a first portion of a LID 2062. The file system storage client 2012 performs storage operations using the first portion 2062 of the LID along with an offset (the second portion 2064). The file system storage client 2012 may combine the file identifier (first portion 2062) with an offset 2064 to generate a full LID 2070. The LID 2070 may be sent to the storage layer 1730 in connection with requests to perform storage operations within the logical address space 1732.

The storage layer 1730 performs storage operations using the storage metadata 1734. Storage requests to persist data in the logical address space 1732 comprise the storage layer 1730 causing the data to be stored on the non-volatile storage device 1706 in a sequential, log-based format as described above. The storage layer 1730 updates the storage metadata 1734 to associate LIDs in the logical address space 1732 with physical storage locations on the non-volatile storage comprising data stored in the storage operation.

Storage operations to access persisted data on the non-volatile storage device may comprise the storage client, such as the file system storage client 2012 requesting the data associated with one or more LIDs 2070 in the logical address space. The file system storage client 2012 may identify the LIDs using the file system table 2060 or another data structure. In response to the request, the storage layer 1730 determines the physical storage location of the LIDs 2070 on the non-volatile storage device 1706 using the storage metadata 1734, which is used to access the data.

In some embodiments, storage clients, such as the file system storage client 2012 may deallocate a storage entity. Deallocating a storage entity may comprise issuing a deallocation request to the storage layer 1730 via the storage layer interface 1740. In response to a deallocation request, the storage layer 1730 removes the deallocated LIDs from the storage metadata 1734 and/or may mark the deallocated LIDs as unallocated. The storage layer 1730 may also invalidate the physical storage locations corresponding to the deallocated LIDs in the storage metadata 1734 and/or the non-volatile storage device 1706 (e.g., using a reverse map as described above). A deallocation may be a "hint" to a groomer of the non-volatile storage device 1706 that the physical storage locations associated with the deallocated LIDs are available for recovery.

The groomer, however, may not actually remove the data for some time after the deallocation request issued. Accordingly, in some embodiments, the storage layer interface 1740 may provide an interface through which storage clients may issue a deallocation "directive" (as opposed to a hint). The deallocation directive may configure the storage layer 1730 to return a pre-determined value (e.g., "0" or "NULL") for subsequent accesses to the deallocated LIDs (or the physical storage locations associated therewith), even if the data is still available on the non-volatile storage device 1706. The pre-determined value may continue to be returned until the LIDs are reallocated for another purpose.

In some embodiments, the storage layer 1730 implements a deallocation directive by removing the deallocated LIDs from the storage metadata and returning a pre-determined value in response to requests for LIDs that are not allocated in the storage metadata 1734 and/or are not bound (e.g., are not associated with valid data on the non-volatile storage device). Alternatively, or in addition, in response to a deallocation directive the storage layer 1730 may cause the corresponding physical storage locations on the non-volatile storage device 1706 to be erased. The storage layer 1730 may provide the storage client 2012 with an acknowledgement when the erasure is complete. Since erasures make take a significant amount of time to complete relative to other storage operations, the acknowledgement may be issued asynchronously.

Figure 20B:
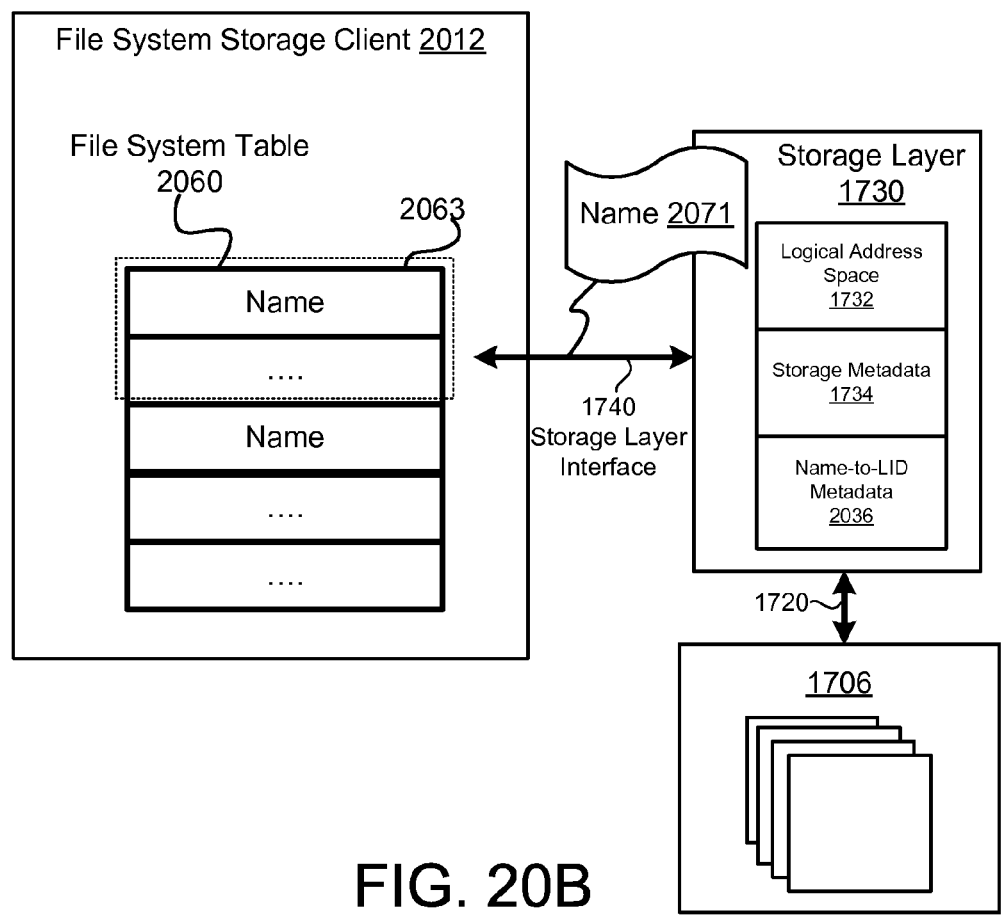
FIG. 20B is a schematic diagram of exemplary embodiments of a file system storage client accessing a storage layer using segmented logical identifiers.

FIG. 20B is a block diagram depicting another embodiment 2001 of storage client leveraging the storage layer 1730. In the FIG. 20B example, the storage layer 1730 presents a logical address space 1732 to the storage client 2012 and maintains storage metadata 1734 as described above. In addition, the storage layer 1730 maintains name-to-LID association metadata 2036. This metadata 2036 may comprise associations between LIDs in the logical address space 1732 and storage entity identifiers of storage clients 1732. Storage clients, such as a file system client 2012, may request LID allocations using a storage entity identifier or name 2071 (e.g., file name) as opposed to a LID. The storage client 2012 relies on the storage layer 1730 to select an available LID (as opposed to specifying a particular LID), is referred to as a "nameless write" or "nameless allocation." In response, the storage layer 1730 allocates a LID for the file system storage client 2012 within the logical address space 1732. In addition, the storage layer 1730 may maintain an association between the allocated LID and the name 2071 in name-to-LID metadata 2036. Storage clients 2012 may request subsequent storage operations on the storage entity using the name 2071 (along with an offset, if needed). The file system table 2060 of the client 2012 may be simplified since entries 2063 need only maintain the name of a file as opposed to the name and LID. In response to storage requests comprising a name 2071, the storage layer 1730 accesses the name-to-LID metadata 2036 to determine the LID associated with the name 2071 and implements the storage request as described above.

In some embodiments, the name-to-LID metadata 2036 may be included with the storage metadata 1734. For example, entries in the index 1804 of FIG. 18 may be indexed by name in addition to (or in place of) a logical identifier. The storage layer 1730 may persist the name-to-LID metadata 2036 on the non-volatile storage device 1706, such that the integrity of the metadata 2036 is maintained despite invalid shutdown conditions. Alternatively, or in addition, the name-to-LID metadata 2036 may be reconstructed using the sequential, log-based data format of the non-volatile storage device 1706.

Figure 21:
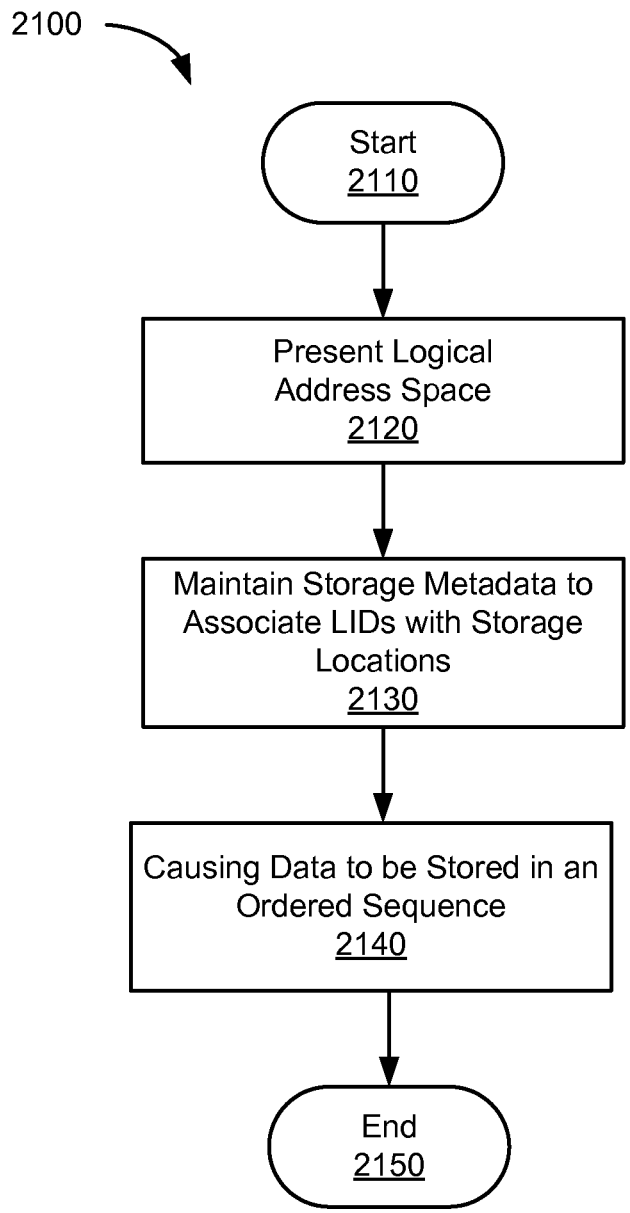
FIG. 21 is a flow diagram of one embodiment of a method for providing a storage layer.

FIG. 21 is a flow diagram of one embodiment of a method for providing a storage layer. At step 2110, the method starts and is initialized. Step 2110 may comprise initializing a storage layer, such as the storage layer 1730 described above, which may comprise initializing access to a non-volatile storage device (via a communication bus), initializing storage metadata, and so on.

At step 2120, the method 2100 presents a logical address space for the non-volatile device to storage clients. The logical address space may be defined independently of the non-volatile storage device. Accordingly, the logical capacity of the logical address space (e.g., the size of the logical address space and/or the size of the virtual storage blocks thereof) may exceed the physical storage capacity of the non-volatile storage device. In some embodiments, the logical address space is presented via an application-programming interface (API) that is accessible to storage clients, such as operating systems, file systems, database applications, and the like.

At step 2130, storage metadata is maintained. The storage metadata may track allocations of LIDs within the logical address space, as well as bindings between LIDs and physical storage locations of the non-volatile storage device. The metadata may further comprise indications of the remaining logical capacity of the logical address space, the remaining physical storage capacity of the non-volatile storage device, the status of particular LIDs, and so on.

In some embodiments, the metadata is maintained in response to storage operations performed within the logical address space. The storage metadata is updated to reflect allocations of LIDs by storage clients. When storage clients persist data to allocated LIDs, bindings between the LIDs and the physical storage locations comprising the data are updated.

At step 2140, storage operations are performed using an ordered sequence data format. As described above, the storage layer (and non-volatile storage device) may be configured to store data sequentially, such that an ordered sequence of storage operations performed on the storage device can be reconstructed in the event of an invalid shutdown. The ordered sequence of storage operations allows storage clients to delegate crash recovery, data integrity, and other functionality to the storage layer.

At step 2150, the method terminates, until additional storage operations are performed, at which point the flow continues at step 2120.

Figure 22:
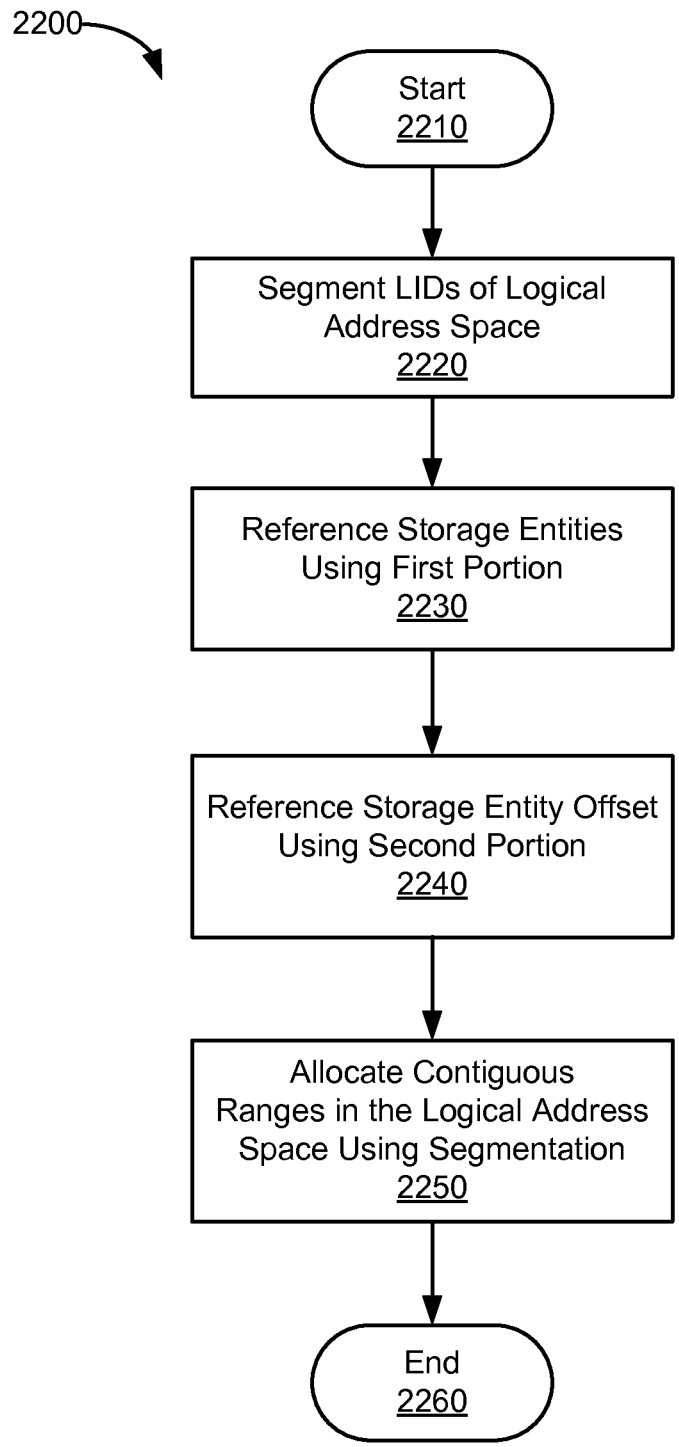
FIG. 22 is a flow diagram of one embodiment of a method for segmenting logical identifiers of a logical address space.

FIG. 22 is a flow diagram of one embodiment of a method for segmenting logical identifiers of a logical address space. At step 2210, the method 2200 starts and is initialized as described above.

At step 2220, the method 2200 segments logical identifiers of a logical address space into at least a first portion and a second portion. The segmentation of step 2230 may be performed as part of a configuration process of the storage layer and/or non-volatile storage device (e.g., when the device is initialized). Alternatively, or in addition, the segmentation of step 2220 may be performed in response to a request from a storage client. The storage client may request a particular type of LID segmentation according to the storage requirements thereof. For example, if the storage client has a need to store a large number of relatively small storage entities, the storage client may configure the LID segmentation to dedicate a larger proportion of the LID to identification bits and a smaller proportion to offset bits. Alternatively, a storage client who requires a relatively small number of very large storage entities may configure the method 2220 to implement a different type of segmentation that uses a larger proportion of the LID for offset bits (allowing for larger storage entities).

At step 2230, the storage layer uses the first portion of the LID to reference storage client allocations (e.g., as a reference for storage entities). Step 2230 may comprise reconfiguring the storage metadata to allocate LIDs using only the first portion of the LID (e.g., the upper X bits of a LID). The size of the first portion may determine the number of unique storage entities that can be expressed in the storage metadata (e.g., as $2^X-1$, where X is the number of bits in the first portion). Accordingly, a first portion comprising 32 bits may support approximately $2^{32}$ unique storage entities. The reconfiguration may simplify the storage metadata, since each entry may be identified using a smaller amount of data (only the first portion of the LID as opposed to the entire LID).

At step 2240, the storage layer uses the second portion of the LID as an offset into a storage entity. The size of the second portion may define the maximum size of a storage entity (under the current segmentation scheme). The size of a LID may be defined as the virtual block size times $2^Y$, where Y is the number of bits in the second portion. As discussed above, a virtual block size of 512 and second portion comprise thirty two (32) bits results in a maximum storage entity size of 2 TB. Step 2240 may comprise reconfiguring the storage metadata to reference LID to physical storage location bindings using only the second portion of the LID. This may allow the storage metadata entries (e.g., entries in physical binding metadata) to be simplified, since the bindings can be expressed using a smaller number of bits.

At step 2250, the storage layer uses the LID segmentation of step 2220 to allocate LIDs comprising contiguous logical address ranges in the logical address space. Step 2250 may comprise the storage layer allocating LIDs using only the first portion of the LID (e.g., the upper X bits). The allocated LID may comprise a contiguous logical address range corresponding to the number of bits in the second portion as described above.

In some embodiments, allocating a LID at step 2250 does not cause corresponding logical storage locations to be reserved of "bound" thereto. The bindings between allocated LIDs and physical storage locations may not occur until the storage client actually performs storage operations on the LIDs (e.g., stores data in the LIDs). The delayed binding prevents the large, contiguous LID allocations from exhausting the physical storage capacity of the non-volatile storage device.

At step 2260, the flow ends until a next storage operation is requested, at which point the flow continues at step 2240.

Figure 23:
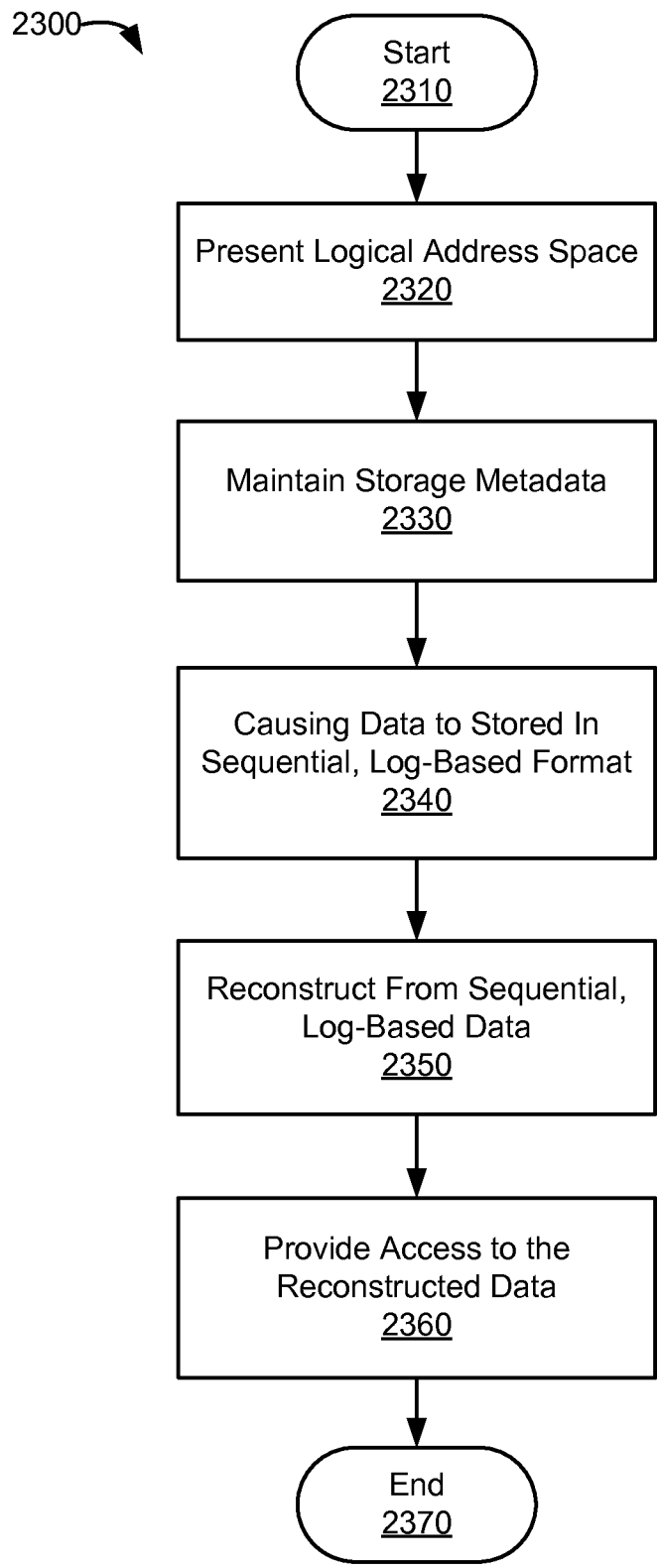
FIG. 23 is a flow diagram of one embodiment of a method for providing crash recovery and data integrity in a storage layer.

FIG. 23 is a flow diagram of one embodiment of a method for providing crash recovery and data integrity in a storage layer. At step 2310, the method starts and is initialized as described above.

At step 2320, the storage layer presents a logical address space, and at step 2330, metadata is maintained to associate LIDs in the logical address space with physical storage locations on the non-volatile storage device.

At step 2340, the storage layer causes data to be stored on the non-volatile storage device in a sequential, log-based format. As described above, the sequential, log-based formatting of the data is configured such that, in the event of an invalid shutdown, the data (and metadata pertaining thereto) can be reconstructed.

At step 2350, the storage layer reconstructs data stored on the non-volatile storage device using the data formatted in the sequential, log-based format. As described above, the log-based format may comprise storing LID identifiers with data on the non-volatile storage device. The LID identifiers may be used to associate the data with LIDs in the logical address space (e.g., reconstruct the storage metadata). Sequence indicators stored with the data on the non-volatile storage device are used to determine the most current version of data associated with the same LID; since data is written out-of-place, updated data may be stored on the non-volatile storage device along with previous, obsolete versions. The sequence indicators allow the storage layer to distinguish older versions from the current version. The reconstruction of step 2350 may comprise reconstructing the storage metadata, determining the most current version of data for a particular LID (e.g., identifying the physical storage location that comprises the current version of the data), and so on.

At step 2360, the storage layer provides access to the reconstructed data to storage clients. Accordingly, the storage clients may delegate crash recovery and/or data integrity functionality to the storage layer, which relieves the storage clients from implementing these features themselves. Accordingly, the storage clients can be simpler and more efficient.

At step 2370, the flow ends until subsequent storage operations are performed, at which point the flow continues at step 2320.

Figure 24:
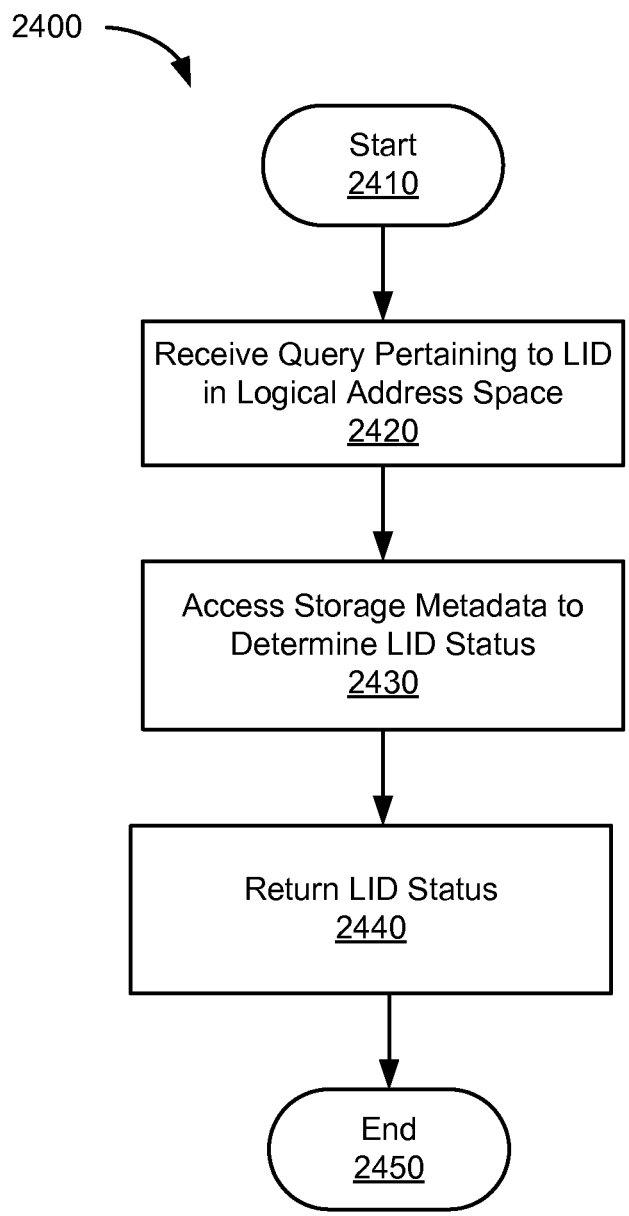
FIG. 24 is a flow diagram of one embodiment of a method for servicing queries pertaining to the status of a logical identifier.

FIG. 24 is a flow diagram of one embodiment of a method for servicing queries pertaining to the status of a logical identifier. At step 2410, the method 2400 starts and is initialized as described above.

At step 2420, the storage layer receives a request pertaining to the status of a particular LID in the logical address space presented by the storage layer. Alternatively, the query may pertain to the logical address space as a whole (e.g., a query for the remaining logical capacity of the logical address space, or the like). Similarly, the query may pertain to the physical storage capacity of the non-volatile storage device, such as a query regarding the physical storage capacity that is bound to LIDs in the logical address space (e.g., currently occupied), available physical storage capacity, and so on.

At step 2430, the storage layer accesses storage metadata to determine the status of the requested LID, logical capacity, physical storage capacity, or the like. The access may comprise identifying an entry for the LID in a logical-tophysical map, in an allocation index, or the like. If the particular LID falls within an entry in an allocation index and/or logical to physical index, the storage layer may determine that the LID is allocated and/or may determine whether the LID is bound to a physical storage location. The access may further comprise, traversing a metadata index to identify unallocated LIDs, unused physical storage locations, and so on. The traversal may further comprise identifying allocated (or unallocated) LIDs to determine current LID allocation (or unallocated LID capacity), to determine bound physical storage capacity, determine remaining physical storage capacity, or the like.

At step 2440, the storage layer returns the status determined at step 2430 to the storage client, and the flow end at step 2450 until a next query is received, at which point the flow continues at step 2520.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    presenting a logical address space of a non-volatile storage device;
    maintaining storage metadata that associates storage entities with respective sets of two or more logical identifiers of the logical address space, and associates respective logical identifiers with physical storage locations on the non-volatile storage device comprising stored data of respective storage entities; and
    in response to a request to persist data of a particular storage entity to the non-volatile storage device,
        selecting a logical identifier of the logical address space to associate with the data of the particular storage entity by use of the storage metadata,
        persisting the data of the particular storage entity at a physical storage location of the non-volatile storage medium, and
        updating the storage metadata such that the selected logical identifier is associated with the particular storage entity and with the physical storage location of the persisted data of the particular storage entity on the non-volatile storage medium.

2. The method of claim 1, further comprising returning the selected logical identifier in response to the request.

3. The method of claim 1, wherein the request to persist the data of the particular storage entity includes a logical identifier provided by a storage client, the method further comprising selecting the logical identifier included in the request to allocate to the particular storage entity.

4. The method of claim 1,
    wherein the request to persist the particular storage entity references a logical identifier to allocate to the particular storage entity, the method further comprising:
        selecting an alternative logical identifier to allocate to the particular storage entity in response to determining that the logical identifier referenced in the request is allocated, and
        returning the alternate logical identifier in response to the request.

5. The method of claim 1, further comprising:
    in response to an allocation query for a specified logical identifier,
        determining whether the specified logical identifier is allocated, and
        responding to the allocation query with an indication of whether the specified logical identifier is allocated.

6. The method of claim 1, further comprising:
    in response to a query for a status of a particular logical identifier provided by a storage client,
        determining a status of the particular logical identifier using the storage metadata, the status indicating one of whether the particular logical identifier is allocated and whether the particular logical identifier is bound to a physical storage location on the non-volatile storage device, and
        notifying the storage client of the determined status of the particular logical identifier.

7. The method of claim 1, wherein the request to persist the data of the particular storage entity comprises a request to allocate a specified logical identifier to a storage client, the method further comprising:
    determining that the specified logical identifier is available to be allocated to the storage client based on the storage metadata,
    allocating the specified logical identifier to the storage client, and
    selecting the specified logical identifier to allocate for the data of the particular storage entity.

8. The method of claim 1, wherein the request to persist the data of the particular storage entity comprises a request to modify the data of the particular storage entity, and wherein selecting the logical identifier to associate with the data of the particular storage entity comprises selecting a logical identifier allocated for the particular storage entity.

9. The method of claim 1, the method further comprising:
    determining whether the logical address space has sufficient logical capacity to persist the data of the particular storage entity,
    determining whether the non-volatile storage device has sufficient physical storage capacity to persist the data of the particular storage entity, and
    acknowledging persisting the particular storage entity in response to determining that the logical address space has sufficient logical capacity and the non-volatile storage device has sufficient storage capacity.

10. The method of claim 1, further comprising:
    segmenting logical identifiers of the logical address space into a first portion and a second portion, wherein the first portion of the logical identifiers comprise a plurality of unique identifiers, and wherein the second portion of the logical identifiers define respective ranges of logical identifiers corresponding to the respective unique identifiers; and
    allocating a range of logical identifiers for the particular storage entity, wherein allocating the range of logical identifiers comprises allocating one of the plurality of unique identifiers defined by the first portion of the logical identifiers for the particular storage entity.

11. The method of claim 10, wherein the first portion comprises high-order bits of the logical identifiers of the logical address space and the second portion comprises low-order bits of the logical identifiers,
    the method further comprising determining a logical identifier corresponding to a specified offset within the particular storage entity, wherein high-order bits of the determined logical identifier correspond to the unique identifier allocated for the particular storage entity, and wherein low-order bits of the determined logical identifier correspond to the specified offset.

12. The method of claim 1, the method further comprising:
segmenting logical identifiers of the logical address space into a first portion and a second portion, the first portion representing a storage entity identifier and the second portion representing offsets;
wherein maintaining the storage metadata comprises maintaining an index comprising entries to represent storage entities in the logical address space, wherein the entries of the index are identified by a respective first portion of a logical identifier.

13. The method of claim 1, further comprising:
storing data on the non-volatile storage device in a sequential, log-based storage format;
reconstructing the storage metadata from sequential, log-based formatted data on the non-volatile storage device; and
providing an interface through which a storage client accesses the reconstructed storage metadata.

14. The method of claim 1, wherein the storage metadata comprises entries representing contiguous allocated ranges within the logical address space, each entry further representing bindings between sub-ranges in the contiguous allocated range and physical storage locations on the non-volatile storage device.

15. The method of claim 1, wherein the request to persist data of the particular storage entity comprises a request to modify data of the particular storage entity at a designated offset, wherein selecting the logical identifier comprises determining a logical identifier for the request by combining a unique identifier allocated for the particular storage entity with the designated offset.

16. A non-transitory computer-readable storage medium comprising instructions to cause a computing device to perform operations comprising:
presenting a logical address space of a non-volatile storage device to storage clients through a storage driver;
segmenting the logical address space into logical identifiers comprising a first portion and a second portion, the first portion referencing respective storage entities, and the second portion referencing storage entity offsets;
persisting storage entities addressable within the logical address space in response to requests from the storage clients;
maintaining storage metadata entries, each representing a respective storage entity using a respective first portion of a logical identifier in the logical address space; and
in response to persisting data of a particular storage entity at a specified logical identifier in the logical address space,
identifying a storage metadata entry corresponding to the first portion of the specified logical identifier, and
binding an offset in the identified storage metadata entry to a physical storage location on the non-volatile storage device comprising the persisted data of the particular storage entity using the second portion of the specified logical identifier.

17. The non-transitory computer-readable storage medium of claim 16, the operations further comprising creating an entry in the storage metadata for the particular storage entity in response to a request to persist data of the particular storage entity on the non-volatile storage device.

18. The non-transitory computer-readable storage medium of claim 16, the operations further comprising:
allocating a plurality of logical identifiers for the particular storage entity in response to a request to persist the data of the particular storage entity on the non-volatile storage device; and
persisting the data of the particular storage entity at the specified logical identifier in the logical address space in response to allocating the plurality of logical identifiers.

19. A storage system, comprising:
a non-volatile storage device;
a storage layer comprising an interface to present a logical address space of the non-volatile storage device to storage clients, the logical address space comprising a plurality of logical identifiers, the logical identifiers being segmented into a first portion referencing storage entities, and a second portion referencing storage entity offsets,
wherein the interface provides for persisting storage entities in the logical address space, wherein in response to a request to persist a particular storage entity, the storage layer binds logical identifiers in a contiguous range of logical identifiers allocated to the particular storage entity to an ordered, log-based sequence of storage operations on the non-volatile storage device comprising data of the particular storage entity.

20. The system of claim 19, wherein the first portions of the logical identifiers define a plurality of unique entity identifiers within the logical address space, and wherein allocating a unique entity identifier for the particular storage entity comprises allocating a plurality of logical identifiers for the particular storage entity, the allocated plurality of logical identifiers comprising logical identifiers having a first portion corresponding to the unique entity identifier allocated for the particular storage entity.

* * * * *